United States Patent
Thomas et al.

(10) Patent No.: US 10,657,451 B2
(45) Date of Patent: May 19, 2020

(54) PATTERN RECOGNITION SYSTEM

(71) Applicant: Rokio, Inc., Kentfield, CA (US)

(72) Inventors: Tyson J. Thomas, San Francisco, CA (US); Kristopher Robert Buschelman, San Francisco, CA (US); Frank G. Evans, Portland, OR (US); Karl P. Geiger, Redwood City, CA (US); Michael P. Kelley, Lake Oswego, OR (US); Eric C. Schneider, Redwood City, CA (US); Timothy J. Carruthers, San Carlos, CA (US); Jeffrey Brian Adams, Belmont, CA (US)

(73) Assignee: Rokio, Inc., Kentfield, CA (US)

( * ) Notice: Subject to any disclaimer, the term of this patent is extended or adjusted under 35 U.S.C. 154(b) by 725 days.

(21) Appl. No.: 14/472,247

(22) Filed: Aug. 28, 2014

(65) Prior Publication Data

US 2015/0178631 A1 Jun. 25, 2015

Related U.S. Application Data

(60) Provisional application No. 61/873,793, filed on Sep. 4, 2013.

(51) Int. Cl.
*G06N 5/04* (2006.01)
*G06N 20/00* (2019.01)
(Continued)

(52) U.S. Cl.
CPC ........... *G06N 5/047* (2013.01); *G06K 9/0053* (2013.01); *G06K 9/6255* (2013.01); *G06N 20/00* (2019.01)

(58) Field of Classification Search
None
See application file for complete search history.

(56) References Cited

U.S. PATENT DOCUMENTS

| 5,293,457 A | 3/1994 | Arima et al. |
| 5,621,863 A | 4/1997 | Boulet et al. |

(Continued)

FOREIGN PATENT DOCUMENTS

| WO | WO 2008/022156 | 2/2008 |
| WO | WO 2015/034759 | 3/2015 |

OTHER PUBLICATIONS

Schroeder et al. "HEART: an automated beat-to-beat cardiovascular analysis package using MATLAB" Comp. Bio and medicine vol. 34. Is. 5 [Published 2004] [Retrieved online Jun. 2019] <URL:https://www.sciencedirect.com/science/article/pii/S0010482503000878> (Year: 2004).*

(Continued)

*Primary Examiner* — Ann J Lo
*Assistant Examiner* — Fen Christopher Tamulonis
(74) *Attorney, Agent, or Firm* — Weaver Austin Villeneuve & Sampson LLP

(57) ABSTRACT

Methods, apparatuses and systems directed to pattern learning, recognition, and metrology. In some particular implementations, the invention provides a flexible pattern recognition platform including pattern recognition engines that can be dynamically adjusted to implement specific pattern recognition configurations for individual pattern recognition applications. In certain implementations, the present invention provides for methods and systems suitable for analyzing and recognizing patterns in biological signals such as multi-electrode array waveform data. In other implementations, the present invention also provides for a partition configuration where knowledge elements can be grouped and pattern recognition operations can be individually configured and arranged to allow for multi-level pattern recognition schemes. In other implementations, the present invention (Continued)

provides methods and systems for dynamic learning of patterns in supervised and unsupervised manners.

30 Claims, 46 Drawing Sheets

(51) Int. Cl.
*G06K 9/00* (2006.01)
*G06K 9/62* (2006.01)

(56) References Cited

U.S. PATENT DOCUMENTS

| | | | |
|---|---|---|---|
| 5,701,397 A | 12/1997 | Steimle et al. | |
| 5,710,869 A | 1/1998 | Godefroy et al. | |
| 5,717,832 A | 2/1998 | Steimle et al. | |
| 5,740,326 A | 4/1998 | Boulet et al. | |
| 6,233,361 B1* | 5/2001 | Downs | G01S 7/4802 348/E5.064 |
| 6,778,704 B1* | 8/2004 | Kawatani | G06K 9/6807 382/159 |
| 6,892,193 B2 | 10/2005 | Bolle et al. | |
| 7,242,988 B1* | 7/2007 | Hoffberg | G05B 19/0426 700/28 |
| 7,966,274 B2 | 6/2011 | Adams | |
| 7,966,277 B2 | 6/2011 | Adams | |
| 8,214,311 B2* | 7/2012 | Adams | G06K 9/6253 382/159 |
| 8,340,746 B2* | 12/2012 | Syed | A61B 5/0452 600/509 |
| 9,684,838 B2 | 6/2017 | Adams | |
| 2002/0152069 A1 | 10/2002 | Gao et al. | |
| 2005/0005266 A1* | 1/2005 | Datig | G06F 17/279 717/136 |
| 2008/0071136 A1* | 3/2008 | Oohashi | A61M 21/02 600/27 |
| 2008/0120108 A1* | 5/2008 | Soong | G06K 9/00 704/254 |
| 2008/0270338 A1* | 10/2008 | Adams | G06K 9/6253 706/48 |
| 2009/0144212 A1 | 6/2009 | Adams | |
| 2011/0157599 A1* | 6/2011 | Weaver | G01D 5/266 356/496 |
| 2011/0251981 A1 | 10/2011 | Adams | |
| 2012/0226643 A1 | 9/2012 | Adams | |
| 2014/0176963 A1* | 6/2014 | Kemp | G01B 9/02004 356/497 |
| 2015/0178631 A1* | 6/2015 | Thomas | G06K 9/0053 706/12 |
| 2017/0323168 A1 | 11/2017 | Adams | |
| 2017/0323169 A1 | 11/2017 | Adams | |

OTHER PUBLICATIONS

Hartmann et al. "Authoring sensor-based interactions by demonstration with direct manipulation and pattern recognition" CHI '07 pp. 145-154 [Published 2007] [Retrieved Jun. 2019] <URL: https://dl.acm.org/citation.cfm?id=1240646> (Year: 2007).*

Zhang, YingPeng et al "A New Nearest Neighbor Searching Algorithm based on M2M Model" IMECS 2007. [Published 2007] [ Retrieved Jun. 2019] <URL: http://people.csail.mit.edu/zhizhuo/undergrad/project/m2m/A_New_Nearest_Neighbour_Searching_Algorithm_based_on_M2M_Model.pdf> (Year: 2007).*

U.S. Office Action dated Jul. 27, 2010, U.S. Appl. No. 11/838,832 .
U.S. Notice of Allowance dated Feb. 16, 2011, U.S. Appl. No. 11/838,832.
U.S. Office Action dated Aug. 18, 2011, U.S. Appl. No. 13/164,032.
U.S. Notice of Allowance dated Mar. 8, 2012, U.S. Appl. No. 13/164,032.
U.S. Office Action dated Jul. 23, 2010, U.S. Appl. No. 11/838,839.
U.S. Notice of Allowance dated Feb. 14, 2011, U.S. Appl. No. 11/838,839.
PCT International Search Report dated Nov. 3, 2008 issued in PCT/US2007/075938.
PCT International Preliminary Report on Patentability dated Feb. 17, 2009 issued in PCT/US2007/075938.
Abdi, Herve 1994, "A Neural Network Prime," *Journal of Biological Systems* 2(3):247-283.
Roberts, et al. 1992, "New method of automated sleep quantification," *Med. Biol. Eng. & Comput.* 30:509-517.
Zboril, Frantisek 1998, "Sparse Distributed Memory and Restricted Coulomb Energy Classifier," Proceedings of the MOSIS'98, MARQ, Ostrava, Sv. Hostyn-Bystrice pod Hostynem, pp. 171-176.
Zemouri, et al. 2003, "Recurrent radial basis function network for time-series prediction," *Engineering Applications of Artificial Intelligence* 16: 453-463.
PCT International Search Report and Written Opinion dated Jan. 29, 2015 issued in PCT/US2014/053292.
U.S. Notice of Allowance dated Mar. 3, 2017 in U.S. Appl. No. 13/474,580.
U.S. Office Action dated Jun. 30, 2016 in U.S. Appl. No. 13/474,580.
U.S. Office Action dated Aug. 19, 2015 in U.S. Appl. No. 13/474,580.
PCT International Preliminary Report on Patentability dated Mar. 17, 2016 issued in PCT/US2014/053292.
Charalampous, K., et al. "Bio-inspired deep learning model for object recognition," 2013 IEEE Intl. Conf. on Imaging Systems and Techniques (IST), Beijing, 2013, pp. 51-55. [doi: 10.1109/IST.2013.6729661].
Chen, Y., et al. "Unsupervised induction and filling of semantic slots for spoken dialogue systems using frame-semantic parsing," 2013 IEEE Workshop on Automatic Speech Recognition and Understanding, Olomouc, 2013, pp. 120-125. [doi: 10.1109/ASRU.2013.6707716].
Kamper, H., et al. "Unsupervised word segmentation and lexicon discovery using acoustic word embeddings," IEEE/ACM Transactions on Audio, Speech and Language Processing (TASLP), vol. 24, No. 4, Apr. 2016, pp. 669-679.
Terstyánszky, G., et al. "Diagnosing a priori unknown faults by modified supervised-unsupervised learning algorithm," 2001 European Control Conference (ECC), Porto, Portugal, 2001, pp. 1637-1641.
Guillaume, S., "Designing fuzzy inference systems from data: an interpretability-oriented review," IEEE Transactions on Fuzzy Systems, vol. 9, No. 3, Jun. 2001, pp. 426-443. [doi: 10.1109/91.928739].
Goh, L., et al. "A novel feature selection method to improve classification of gene expression data," In Proceedings of the Second Conference on Asia-Pacific Bioinformatics (APBC '04), Yi-Ping Phoebe Chen (Ed.), vol. 29. Australian Computer Society, Inc., Darlinghurst, Australia, 2004, 161-166. <URL: http://dl.acm.org/citation.cfm?id=976520.976542>.
EPO Search Report dated Jul. 21, 2017 issued in Application No. 14842180.3.
EPO Invitation Pursuant to Rule 63(1) EPC dated Apr. 4, 2017 issued in Application No. 14842180.3.

* cited by examiner

PATTERN RECOGNITION SYSTEM

CROSS-REFERENCE TO RELATED APPLICATIONS

This application claims benefit under 35 U.S.C. § 119(e) to U.S. Provisional Patent Application No. 61/873,793, entitled: PATTERN RECOGNITION SYSTEM, filed Sep. 4, 2013, which is herein incorporated by reference in its entirety for all purposes.

FIELD OF THE INVENTION

The present disclosure relates to pattern identification and pattern recognition, including, for example, automated analyses of waveform signals and biological system related signals, machine vision, and surveillance using computer vision.

BACKGROUND

Pattern recognition involves classification of data (patterns) based on either a priori knowledge or on statistical information extracted from the patterns. The patterns to be classified are usually groups of measurements or observations (vectors), defining points in a multidimensional space. A pattern recognition system may include a sensor that gathers the observations to be classified or described; a feature extraction mechanism that computes numeric or symbolic information from the observations; and a classification or description scheme that performs the actual function of classifying or describing observations, relying on the extracted features.

The classification or description scheme is usually based on the availability of a set of patterns that have already been classified or described. This set of patterns is termed the training set and the resulting learning strategy is characterized as supervised learning. Learning can also be unsupervised, in the sense that the system is not given an a priori labeling of patterns, instead it establishes the classes itself based on statistical regularities of the patterns.

A wide range of algorithms can be applied for pattern recognition, from very simple Bayesian classifiers to neural networks. An artificial neural network (ANN), often just called a "neural network" (NN), is an interconnected group of artificial neurons that uses a mathematical model or computational model for information processing based on a connectionist approach to computation. An ANN can be an adaptive system that changes its structure based on external or internal information that flows through the network. Artificial neural networks can be used to model complex relationships between inputs and outputs or to find patterns in data. For many years, academia and industry have been researching pattern recognition based on artificial neural networks. However, this research has yielded few practical real-world applications.

Typical applications for pattern recognition are automatic speech recognition, classification of text into several categories (e.g. spam/non-spam email messages), the automatic recognition of handwritten postal codes on postal envelopes, or the automatic recognition of images of human faces. The last two examples form the subtopic image analysis of pattern recognition that deals with digital images as input to pattern recognition systems.

Biological information, e.g., electrocardiogram (ECG), electroencephalogram (EEG), electromyography (EMG) and multielectrode array data, is a new area in which pattern recognition has useful applications, including automatic monitoring, diagnosis, and prognosis in healthcare.

Programmable logic devices (PLDs) are a type of digital integrated circuit that can be programmed to perform specified logic functions. One type of PLD, the field programmable gate array (FPGA), typically includes an array of configurable logic blocks (CLBS) surrounded by a ring of programmable input/output blocks (IOBs). Some FPGAs also include additional logic blocks with special purposes (Digital Signal Processing (DSP) blocks, Random Access Memory (RAM) blocks, Phase Lock Loops (PLL), and so forth). FPGA logic blocks typically include programmable logic elements such as lookup tables (LUTs), flip flops, memory elements, multiplexers, and so forth. The LUTs are typically implemented as RAM arrays in which values are stored during configuration (i.e., programming) of the FPGA. The flip-flops, multiplexers, and other components may also be programmed by writing configuration data to configuration memory cells included in the logic block. For example, the configuration data bits can enable or disable elements, alter the aspect ratios of memory arrays, select latch or flip-flop functionality for a memory element, and so forth. The configuration data bits can also select interconnection between the logic elements in various ways within a logic block by programmably selecting multiplexers inserted in the interconnect paths within CLB and between CLBs and IOBs.

SUMMARY

The present invention provides methods, apparatuses and systems directed to pattern identification and pattern recognition. In some particular implementations, the invention provides a flexible pattern recognition platform including pattern recognition engines that can be dynamically adjusted to implement specific pattern recognition configurations for individual pattern recognition applications. In some implementations, the present invention also provides for a partition configuration where knowledge elements (KEs) can be grouped and pattern recognition operations can be individually configured and arranged to allow for multi-level pattern recognition schemes.

In some embodiments, the present invention provides pattern recognition systems for analyzing biological signals or signals related to biological systems. In some embodiments, the signal recognition systems are suitable for analyzing, recognizing, and learning waveform patterns. The systems store information about one or more waveform patterns as one or more knowledge elements and compare an input vector to the knowledge elements in the pattern recognition operation. In some embodiments, the pattern recognition systems employ a region of search in searching data for pattern recognition. In other embodiments, the pattern recognition systems use one or more markers in searching data for pattern recognition. In certain embodiments, the systems use a combination of regions of search and markers for efficient and effective recognition of a pattern provided by a pattern definition. In some implementations, the system is also data-agnostic and can handle any type of data (image, video, audio, chemical, text, binary, etc.).

Some embodiments provide methods to optimize the influence fields of knowledge elements during learning and recognition operations to enhance the functions of the recognition engine. Other embodiments provide mechanisms to optimize the knowledge map through learning and recognition operations to improve the efficiency of the recognition engine. Some embodiments implement versatile and diverse learning mechanisms for the recognition engine, including but not limited to supervised learning, half-learning and unlearning, as well as unsupervised dynamic learning. In some embodiments, the pattern recognition system can provide quantitative measurements of one or more patterns recognized by the system. In some embodiments, the pattern recognition system can generate workflows to process training data to generate input vectors for pattern recognition operations. The workflows include processing chains that can be used to process data different from the training data.

Some embodiments of the systems methods disclosed herein recognize patterns before taking specific measurements of the patterns, instead of the other way around as implemented in conventional pattern recognition tools. The systems and methods can learn patterns of interest existing in data identified by users without requiring the users to enter parameter values of the patterns. In some embodiments, after a pattern, multiple instances of the same pattern, or instances of different patterns are found, the system then takes measurements of the detected patterns, as well as relations and patterns among multiple patterns.

In some embodiments, a pattern recognition system is provided, which includes: logic and one or more memories configured to maintain a knowledge element array. The logic of the system is configured to: create a pattern definition comprising a first set of one or more waveform characteristics representing a pattern of interest; generate one or more knowledge elements with reference to the pattern definition for inclusion in the knowledge element array, each knowledge element comprising i) one or more operands collectively defining a data vector representing the pattern of interest and ii) a category identifier; define a region of search relative to at least one of the waveform characteristics representing the pattern of interest, each occurrence of the region of search representing a data range in which to search for the pattern of interest; perform a pattern recognition operation on input vectors derived from waveform data at least partially in an occurrence of the region of search by comparing the input vectors to the one or more knowledge elements of the knowledge element array.

In some embodiments, the pattern recognition system's logic is further configured to define the region of search by: creating one or more marker definitions for one or more markers, wherein an occurrence of each of the one or more markers provides a reference for a corresponding occurrence of the region of search. In some embodiments, each of the one or more marker definitions includes a second set of one or more waveform characteristics representing a marker.

In some embodiments, the one or more markers include a single marker, and each occurrence of the single marker is associated with an occurrence of the region of search. In some embodiments, the range of waveform data represented by each occurrence of the region of search is defined by two consecutive occurrences of the single marker. In some embodiments, the range of waveform data represented by each occurrence of the region of search is defined relative to a nominal position; and each occurrence of the nominal position is defined relative to an occurrence of the single marker.

In some embodiments, the one or more markers include a first dual marker and a second dual marker, where each occurrence of each dual marker is associated with an occurrence of the region of search. In some embodiments, the range of waveform data represented by each occurrence of the region of search is between an occurrence of the first dual marker and an occurrence of the second dual marker. In some embodiments, the range of waveform data represented by each occurrence of the region of search is defined relative to a nominal position and is a portion of the distance between an occurrence of the first dual marker and an occurrence of the second dual marker that are associated with that occurrence of the region of search. In some embodiments, the first and second dual markers are a left marker and a right marker on a sequential or temporal dimension, the left marker being earlier in the sequence or time than the right marker.

In some embodiments involving marker(s) and nominal position, each occurrence of the region of search is centered on an occurrence of the nominal position.

In some embodiments, the pattern recognition system's logic is further configured to create the pattern definition by receiving a segment of data comprising the pattern of interest and extracting the one or more waveform characteristics from the segment of data. In some embodiments, the segment of data including the pattern of interest is provided through a graphical user interface. In some embodiments, the segment of data including the pattern of interest is provided by a user selection of a range of data displayed in the graphical user interface.

In some embodiments, any of the pattern recognition systems described above has logic that is furthered configured to perform the pattern recognition operation on a plurality of input vectors derived from the waveform data at least partially in occurrences of the region of search by comparing the input vectors to the one or more knowledge elements of the knowledge element array.

In some embodiments, the pattern recognition systems described above is configured to define one or more markers, and the logic of the system is furthered configured to process waveform data including a first data channel and a second data channel, and the one or more markers include a cross-channel marker that uses a portion of the waveform data from the first data channel to provide the reference for the corresponding occurrence of the region of search in the second data channel. In some embodiments, the pattern recognition system has logic that is furthered configured to prevent detection of an occurrence of the one or more markers in a user definable suppression interval. In some embodiments, the pattern recognition system's logic is configured to prevent detection of a new occurrence of the one or more markers with reference to a user definable hysteresis threshold.

In some embodiments, the pattern recognition system's logic is configured to terminate searching for the pattern of interest in a first occurrence of the region of search if the pattern of interest has been encountered in the first occurrence of the region of search, and to start searching for the pattern of interest in a second occurrence of the region of search following the first occurrence of the region of search.

In various embodiments, any one of the above pattern recognition systems can be implemented with logic that is further configured to: (a) divide each occurrence of the region of search into two or more sub-regions; and (b) perform the pattern recognition operation on each of a plurality of input vectors derived from the waveform data at boundaries of the sub-regions by comparing each of the input vectors to the one or more knowledge elements of the knowledge element array. In some embodiments, the pattern recognition system has logic that is further configured to: (c) if a preliminary occurrence of the pattern of interest is detected at one or more boundary positions of a sub-region, determine a match score for the preliminary occurrence detected at each of the boundary positions; (d) divide at least one of the sub-regions into new sub-regions; (e) repeat (b)-(d) for the new sub-regions until a sub-region data range is reduced to a specified step size; and (f) recognize the preliminary occurrence having a best match score as an occurrence of the pattern of interest. In some embodiments, the pattern recognition system's logic is configured to: (c) if a preliminary occurrence of the pattern of interest is detected at one or more boundary positions of a sub-region, mark the sub-region as active and determine a match score for the preliminary occurrence detected at each of the boundary positions; (d) perform in a current iteration one of the following: (i) if no sub-regions are marked active, divide all sub-regions into new sub-regions; (ii) if one or more sub-regions, but not all, are marked active, divide the marked active sub-regions into new sub-regions; and (iii) if all sub-regions are newly marked active, divide the sub-region with the best match score into new sub-regions; (e) repeat (b)-(d) on all of the new sub-regions until a sub-region data range is reduced to a specified step size; and (f) recognize the preliminary occurrence having a best match score as an occurrence of the pattern of interest.

Some embodiments provide a pattern recognition system including logic and one or more memories configured to maintain a knowledge element array, the logic being configured to: receive information regarding one or more measurements of a pattern of interest; create a pattern definition comprising characteristics representing the pattern of interest; generate one or more knowledge elements with reference to the pattern definition for inclusion in the knowledge element array, each knowledge element including one or more operands collectively defining a data vector representing the pattern of interest; perform a pattern recognition operation to recognize an occurrence of the pattern of interest in input data by comparing input vectors derived from the input data to the one or more knowledge elements of the knowledge element array; obtain the one or more measurements from the recognized occurrence of the pattern of interest. In some embodiments, the pattern recognition's logic is further configured to present the obtained measurements to a user.

Some embodiments provide a pattern recognition system including logic and one or more memories configured to maintain a knowledge element array, the logic being configured to: receive user input specifying a portion of training data having a pattern of interest; extract one or more pattern characteristics from the portion of the training data; create a pattern definition including the one or more pattern characteristics; generate one or more knowledge elements with reference to the pattern definition for inclusion in the knowledge element array, each knowledge element including one or more operands collectively defining a data vector representing the pattern of interest; and perform a pattern recognition operation on input vectors derived from test data by comparing the input vectors to the one or more knowledge elements of the knowledge element array. In some embodiments, the logic is further configured to present the training data using a graphical user interface. In some embodiments, the portion of training data having the pattern of interest is specified by the user using a graphical user interface.

Some embodiments provide a pattern recognition system including logic and one or more memories configured to maintain a knowledge element array, the logic being configured to: store a first knowledge element representing a pattern of interest in training data; store one or more additional knowledge elements representing one or more patterns near the pattern of interest in the training data; perform a pattern recognition operation by detecting the pattern of interest in test data by comparing input vectors derived from the test data to both the first knowledge element and the one or more additional knowledge elements. In some embodiments, the logic is further configured to perform the pattern recognition operation by: initially performing a macro-search that compares macro-search input vectors to both the first knowledge element and the one or more additional knowledge elements; and if a first one of the macro-search input vectors matches one of the additional knowledge elements, performing a micro-search that compares micro-search input vectors to only the first knowledge element; wherein the micro-search input vectors are derived from a range of the test data near a range from which the first one of the macro-search input vector is derived, and the micro-search uses a smaller step size than the macro-search.

In various embodiments, any one of the above pattern recognition systems can be implemented with logic that is configured to: perform the pattern recognition operation by computing an aggregate distance between each of the input vectors and the one or more knowledge elements.

In various embodiments, any one of the above pattern recognition systems can be implemented with logic that is further configured to: perform the pattern recognition operation by determining a match between each of the input vectors and the one or more knowledge elements of the knowledge element array if the input vector falls in any influence fields of the one or more knowledge elements.

In various embodiments, any one of the above pattern recognition systems can be implemented with logic that is configured to: generate a new knowledge element corresponding to an input vector, store the new knowledge element in the knowledge element array, and adjust one or more influence fields of other knowledge elements where the input vector is not recognized by the recognition operation.

In various embodiments, any one of the above pattern recognition systems can be implemented with logic that is further configured to: adjust one or more influence fields of the knowledge elements, where the input vector does not represent the pattern of interest.

In various embodiments, any one of the above pattern recognition systems can be implemented with logic that is configured to: process the input vectors for recognition operations by masking or weighting one or more operands of the input vectors or knowledge vectors.

In various embodiments, any one of the above pattern recognition systems can be implemented with logic that is configured to process input vectors that are derived from previously computed and stored information or information generated by one or more sensors. In some embodiments, the one or more sensors include one or more multichannel sensors. In some embodiments, the one or more multichannel sensors include one or more multielectrode array sensors.

In some embodiments, a pattern recognition system including: logic and one or more memories configured to store knowledge elements, each knowledge element including a knowledge vector representing a pattern. The logic is configured to: select a plurality of macro-search segments of data from a range of data, the macro-search segments being characterized by a first step size; derive a macro-search input vector from each of the macro-search segments; identify one of the macro-search segments as a preliminarily matched segment, wherein the distance between a first one of the plurality of knowledge vectors and the macro-search input vector corresponding to the preliminarily matched segment is smaller than a first threshold; select a plurality of micro-search segments of data from a portion of the range of data near the preliminarily matched segment, the micro-search segments being characterized by a second step size smaller than the first step size; derive a micro-search input vector from each of the micro-search segments; perform a pattern recognition operation by identifying one of the micro-search segments as corresponding to a pattern of interest, wherein the distance between a second one of the knowledge vectors and the micro-search input vector is smaller than a second threshold that is lower than the first threshold, and wherein the second knowledge vector represents the pattern of interest.

In some embodiments, the macro-search input vector corresponding to the preliminary matched segment input vector is closest to the first knowledge vector among the macro-search input vectors. In some embodiments, the micro-search input vector corresponding to the pattern of interest is closest to the second knowledge vector among the micro-search input vectors. In some embodiments, the pattern recognition system's logic is configured to perform the pattern recognition operation by computing an aggregate distance between each of the micro-search input vector and the one or more knowledge elements. In some embodiments, the pattern recognition system's logic is configured to perform the pattern recognition operation by determining a match between the one of the micro-search input vectors and the knowledge element corresponding to the second knowledge vector where the one of the micro-search input vectors falls in an influence fields of the knowledge element corresponding to the second knowledge vector. In some embodiments, the pattern of interest is based on one or more waveform characteristics of a training waveform.

In some embodiments implementing micro-search and/or macro-search, the pattern recognition system's logic is configured to perform the pattern recognition operation by recognizing an occurrence of the pattern of interest where the one of the micro-search input vector falls within an influence field of the one or more knowledge elements. In some embodiments, the pattern recognition system's logic is configured to generate a new knowledge element corresponding to a first one of the micro-search input vectors into the knowledge element array as a knowledge element and adjust one or more influence fields of one or more other knowledge elements where the first micro-search input vector is not recognized by the pattern recognition operation. In some embodiments, the pattern recognition system's logic is configured to adjust one or more influence fields of one or more of the knowledge elements where a first one of the micro-search input vectors does not represent the pattern of interest. In some embodiments, the input vectors are derived from previously computed and stored information or information generated by one or more sensors. In some embodiments, the one or more sensors include one or more multichannel sensors. In some embodiments, the one or more multichannel sensors include one or more multielectrode array sensors.

In various embodiments, any one of the above pattern recognition systems can be implemented with logic that is configured to process data corresponding to data of one or more of the following types: biological, financial, marketing, machine control, industrial control system, software system, economic, epidemiological, audio, sonographic, electro-magnetic, radiographic, radiological, chromatographic, agricultural, astronomic, atmospheric, oceanographic, geologic, and geophysical data.

In various embodiments, any one of the above pattern recognition systems can be implemented with logic that is configured to measure one or more properties of an occurrence of the pattern of interest. In some embodiments, the one or more properties include one or more of the following: QT interval, RR interval, RT interval, field potential, depolarization, repolarization, T wave peak amplitude, R wave peak amplitude, total spike amplitude. In some embodiments, the logic is further configured to measure one or more relations among a plurality of patterns of interest. In some embodiments, the logic is configured for processing data corresponding to different data types. In some embodiments, the different data types are derived from a plurality of different sensor types. In some embodiments, the plurality of different data types include any of image data, video data, audio data, waveform data, chemical data, text data, temperature data, or biological data.

In various embodiments, any one of the above pattern recognition systems can be implemented with logic that is configured to process input vectors corresponding to biological data including one or more of the following: electrocardiogram (ECG), electroencephalogram (EEG), multi-electrode array data, and electromyogram (EMG), mechanomyogram (MMG), muscle tonus, muscle spasimus, electrooculograph (EOG), pressure and volume change (plethysmography), galvanic skin response, magnetoencephalogram (MEG), gas exchange, nutrient absorption, salt and chemical concentrations inside/outside cells, chemical exchange in media/reagents, temperature, blood pressure, hydraulic pressure and water concentration, cell adhesion, cytometry, fluorescent signals, optogenetic signals, radionucleotide marker uptake/decay, functional and structural magnetic resonance imaging, and patterns of signals based on sensing diffusion in media (solid, liquid, gas, and plasma) and across osmotic membranes.

In some embodiments, a pattern recognition system is provided, which includes logic and one or more memories configured to maintain a knowledge element array including a plurality of knowledge elements, the logic being configured to: (a) partition the knowledge element array into a plurality of knowledge maps, each knowledge map having an associated partition identifier and including one or more of the knowledge elements, each knowledge element including one or more operands collectively defining a data vector and a category identifier; (b) receive a plurality of input vectors each having an associated one of the partition identifiers; (c) receive one or more partition configurations each corresponding to one or more of the plurality of partition identifiers, each partition configuration identifying a comparison technique for comparing the input vectors and the data vectors of the one or more knowledge elements of the knowledge maps associated with the one or more partition identifiers corresponding to the partition configuration; (d) process each input vector by applying the input vector to the knowledge map for the partition identifier associated with the input vector for a recognition operation using the comparison technique; and (e) combine a plurality of measurements of a plurality of occurrences of one or more patterns recognized in the recognition operations of (d) to achieve a higher level recognition result. In some embodiments, the logic is configured to iteratively repeat (b)-(e) to achieve a higher level recognition result by providing the combined plurality of measurements of the plurality of occurrences of the one or more patterns of (e) as input vectors to (b).

In various embodiments, any one of the above pattern recognition systems can be implemented with logic that is configured to process an input vector for a learning operation that enters the input vector into the knowledge element array, wherein the learning operation involves: matching the input vector to at least one of the knowledge elements of the knowledge element array, wherein the input vector lies in the influence field of the at least one of the knowledge elements; and maintaining a count for each knowledge element, the count representing the number of data vectors, including the input vector, corresponding to that knowledge element, the counts collectively representing statistical regularities of patterns represented by the data vectors. In some embodiments, the logic is configured to generate the knowledge elements in unsupervised operations.

Some embodiments provide a pattern recognition system including one or more memories configured to maintain a knowledge element array including a plurality of knowledge elements and logic configured to: (a) partition the knowledge element array into one or more knowledge maps, each knowledge map having an associated partition identifier and including one or more of the knowledge elements, each knowledge element including one or more operands collectively defining a data vector and a category identifier; (b) receive an input vector; (c) apply the input vector to one of the knowledge maps for a learning operation by comparing the input vector and data vectors in the knowledge map using a comparison technique; (d) modify the one of the knowledge maps based on the learning operation associated with the input vector, and keep a record of the modification; (e) iteratively repeat (b)-(d) to learn a plurality of input vectors; (f) reverse the modification in step (d) for at least one unlearned vector based on the record of the modification, the unlearned vector being one of the plurality of input vectors learned in (e), thereby unlearning the at least one unlearned vector. In some embodiments, (d) further involves: (i) determining whether an input vector falls within an influence field of an existing knowledge element of the knowledge map; (ii) if so, initially rejecting the input vector; (iii) if not, entering the input vector into the knowledge map as a knowledge element and conditionally adjusting one or more influence fields of other knowledge elements; and (iv) further computing the knowledge map by processing one or more of the initially rejected input vectors. In some embodiments, step (f) involves; removing from the knowledge map the knowledge element corresponding to the unlearned vector, and conditionally reversing the adjustment of the one or more influence fields associated with the unlearned vector.

Some embodiments provide a pattern recognition system including one or more memories configured to maintain one or more knowledge maps, wherein each knowledge map includes a plurality of knowledge elements and is associated with a partition identifier; and logic configured to: (a) create a processing template including a processing chain; (b) apply the processing template by using at least part of the processing chain to process input data to derive an input vector; (c) receive a partition configuration corresponding to a particular partition identifier; (d) identify a comparison technique for comparing the input vector and the data vectors of one or more knowledge elements of the one or more knowledge maps associated with the particular partition identifier; and (e) apply the input vector to the particular knowledge map for a recognition operation or a learning operation using the comparison technique. In some embodiments, the logic is configured to apply the processing template by using at least part of the processing chain to process input data to derive a second input vector. In some embodiments, the system is configured to store and reuse the processing template. In some embodiments, the processing template comprises a channel filter for filtering data from one or more channels of multichannel data. In some embodiments, the processing template includes a global filter for filtering data from all channels of multichannel data including multielectrode array data. In some embodiments, the processing template includes one or more feature extraction processes to extract features from the input data.

In various embodiments, any one of the above pattern recognition systems can have two or more memories distributed over a computer network or a plurality of processing units distributed over a computer network.

In various embodiments, any one of the above pattern recognition systems can be implemented to have logic including one or more proxy servers on a LAN for interactive operations, and one or more servers connected through a real-time communication network for computationally intensive operations. In some embodiments, the real-time communication network is the Internet or an intranet. In some embodiments, the system includes one or more job routers that are configured to route jobs submitted to the proxy server on a LAN to another server on the Internet or an intranet.

In various embodiments, any one of the above pattern recognition systems can be implemented to process data from sensors distributed over a computer network.

In various embodiments, any one of the above pattern recognition systems can be implemented to channelize data by sending multichannel data to a plurality of processing units, the data of each channel being sent along with a processing template to an individual processing unit for recognition or learning operations. In some embodiments, the system can include a plurality of processing units distributed over a computer network, and the logic is configured to: detect milestones in input data from which an input vector is derived; divide the input data at the milestones into multiple files; send the multiple files along with a processing template including a processing chain to multiple processing units distributed over a computer network for a pattern recognition operation.

In various embodiments, any one of the above pattern recognition systems can be implemented to includes logic operable to cause the one or more processors to: extract features and/or properties of one or more patterns of interest; search the extracted features and/or properties in two or more channels of data of a multichannel system; select at least one channel in which the extracted features and/or properties are found; perform a recognition or learning operation on the data of the selected channel.

Some embodiments provide a pattern recognition system including logic and one or more memories configured to maintain a knowledge element array including a plurality of knowledge elements. The logic is configured to: extract features and/or properties of one or more patterns of interest; search the extracted features and/or properties in two or more channels of data of a multichannel system; select at least one channel in which the extracted features and/or properties are found; perform a recognition or learning operation on the data of the selected channel.

Some embodiments provide a pattern recognition system including one or more memories configured to maintain a knowledge element array including a plurality of knowledge elements, and logic configured to: determine one or more characteristics of waveform as features and/or properties of one or more patterns of interest from training examples; select one or more channels of a multichannel system in which the determined characteristics are found; perform a recognition or learning operation on data from the selected channels.

Some embodiments provide a pattern recognition system including one or more memories configured to maintain a knowledge element array including a plurality of knowledge elements, and logic configured to: determine that both a first input vector and a second input vector fall in a same influence field of a knowledge element of a pattern of interest, wherein the first input vector is derived from data of a first channel of a multichannel system, and the second input vector is derived from data of a second channel of the multichannel system, determine that the first input vector and the second input vector would not have been in the same influence field but for a quantitative difference between the first channel and the second channel, and provide a notice to a user based on the determination that the first and second input vectors would not have been in the same influence field but for the quantitative difference.

Some embodiment provide a pattern recognition system including: (a) one or more memories configured to maintain a knowledge element array including a plurality of common knowledge elements, wherein each common knowledge element includes one or more operands collectively defining a data vector representing a pattern common in a population, and wherein each common knowledge element has an influence field; and (b) logic configured to enter the data of an individual input vector representing a pattern specific to a member of the population, the individual input vector representing statistical irregularities, into the knowledge element array as a knowledge element, and conditionally adjust one or more influence fields of other knowledge elements if the individual input vector is not in any influence fields of the other knowledge elements and the individual input vector is to be learned.

Some embodiment provide a pattern recognition system including: (a) one or more memories configured to maintain a knowledge element array including a plurality of common knowledge elements, wherein each common knowledge element includes one or more operands collectively defining a data vector representing a pattern common in a population, and wherein each common knowledge element has an influence field; and (b) logic configured to enter the data of an individual input vector representing a pattern specific to a member of the population into the knowledge element array as a knowledge element and conditionally adjust one or more influence fields of other knowledge elements upon receiving information indicating that the individual input vector does not represent the pattern common in a population and the input vector is to be learned.

DESCRIPTION OF EXAMPLE EMBODIMENT(S)

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

The pattern recognition methods and systems disclosed herein are user friendly, easy to train and refine, and flexible in learning and detecting patterns. Some embodiments of the systems disclosed herein recognize patterns before taking specific measurements of the patterns, instead of the other way around as implemented in conventional pattern recognition tools. That is, various conventional tools require defining and measuring quantities of various aspects of the patterns in order to recognize the patterns. For instance, some conventional methods for detecting patterns involve first defining parameters or metrics of a pattern of interest, then attempting to fit data to curves defined by the parameters, and finding patterns if data can be fitted to these curves. Such approaches are time consuming in training the system and result in rigid recognition ability.

Figure 1:
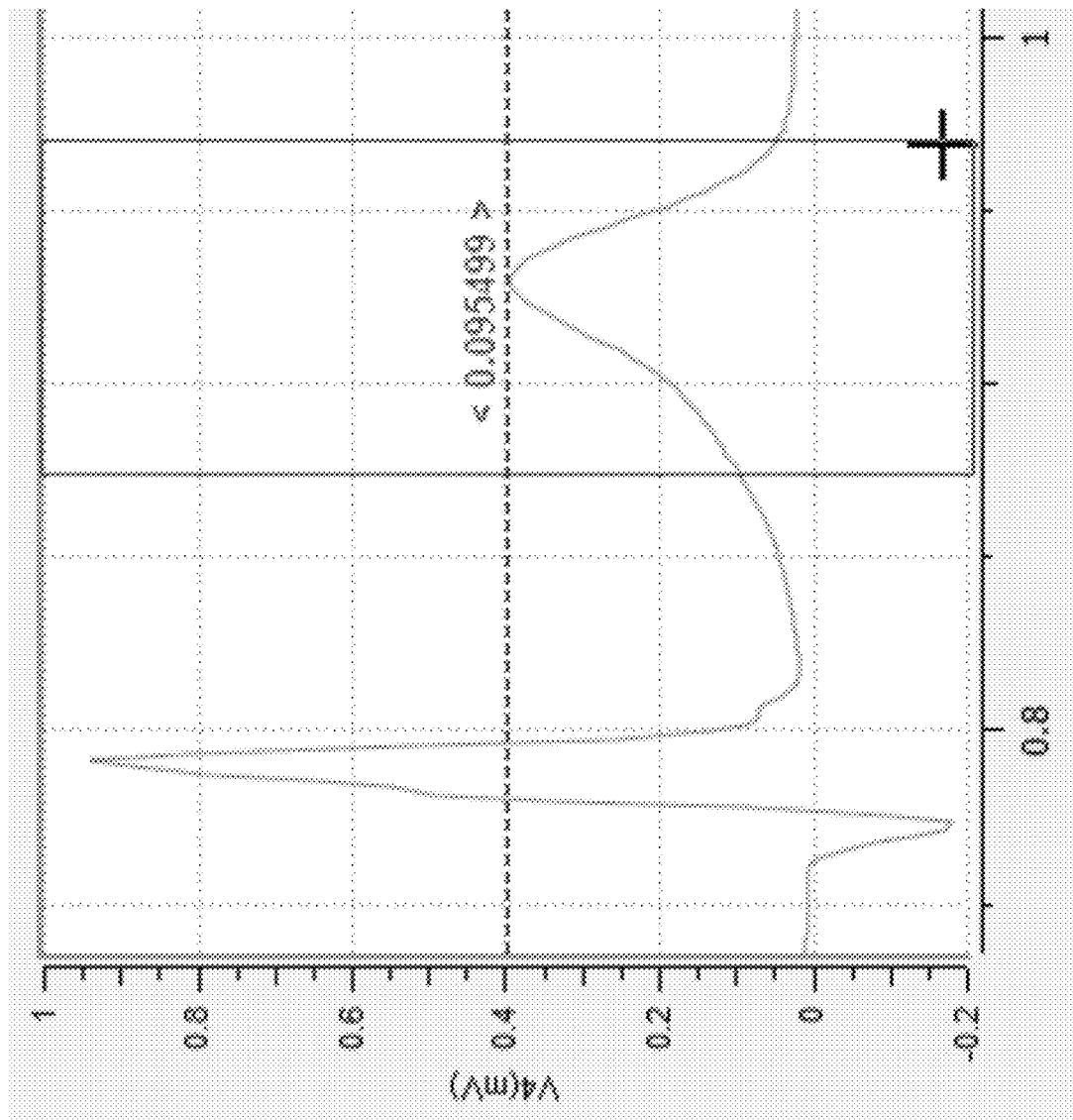
FIG. 1 shows an example of a graphical user interface in which a user can identify a pattern existing in a waveform to be learned by a pattern recognition system disclosed herein.

In contrast, some embodiments of the systems and methods disclosed herein can learn patterns of interest existing in data identified by users without requiring the users to enter parameter values of the patterns. In some embodiments involving a graphical user interface, the user may identify a pattern of interest by placing a "Pattern Detector Box" encompassing the pattern of interest in the interface (e.g., using a drag and drop gesture). See, FIG. 1 for an example of an embodiment of a graphical user interface in which a user can identify a pattern in waveform data to be learned by the systems. In this example, a Pattern Detector Box is provided by the user around the second repolarization in the figure. The pattern recognition system can learn the pattern existing in the data without requiring the user to provide metrics of the pattern. The user is not required to input specific numerical values of various parameters that the system then tries to find in the data. Instead, the system automatically measures values of the section of the signal visually identified by the user and uses those to generate a knowledge vector it learns as the pattern. After learning, the system can find occurrences of the same pattern in other data.

Once a pattern, multiple instances of the same pattern, or instances of different patterns are found, the system then takes measurements of the detected patterns, as well as relations and patterns among multiple patterns, which are also referred to as metrology herein. The measurements can be taken using different patterns and/or different pattern types. In some embodiments, a layer of a recognition system can report information about the waveform(s) or measurements that are of interest to the user. In some embodiments, patterns are recognized, then measurements of each individual recognized pattern (e.g., min, max, slopes, etc.) are captured in a results database, and then the reporting layer pulls out and reports specific measurements from one or more patterns and combines them into a quantity of interest.

In some embodiments, both the measurements of the individual detected patterns, as well as the reported values are specified by the user. During a pattern definition phase, the user can define the attributes and quantities about the pattern he visually identifies (e.g., by drawing a box around a pattern of the displayed signal) that he wants to measure. During analysis of recognized patterns, the user can also specify the things he wants to know, i.e., that he wants reported, from the measurements that were taken during pattern detection. This queries a results database that is populated during pattern detection to get at the information of interest, e.g., by performing analysis on the measured data. In some embodiments, the user can also go back and forth between the reporting layer and the results database to define different information of interest to be reported.

Figure 2:
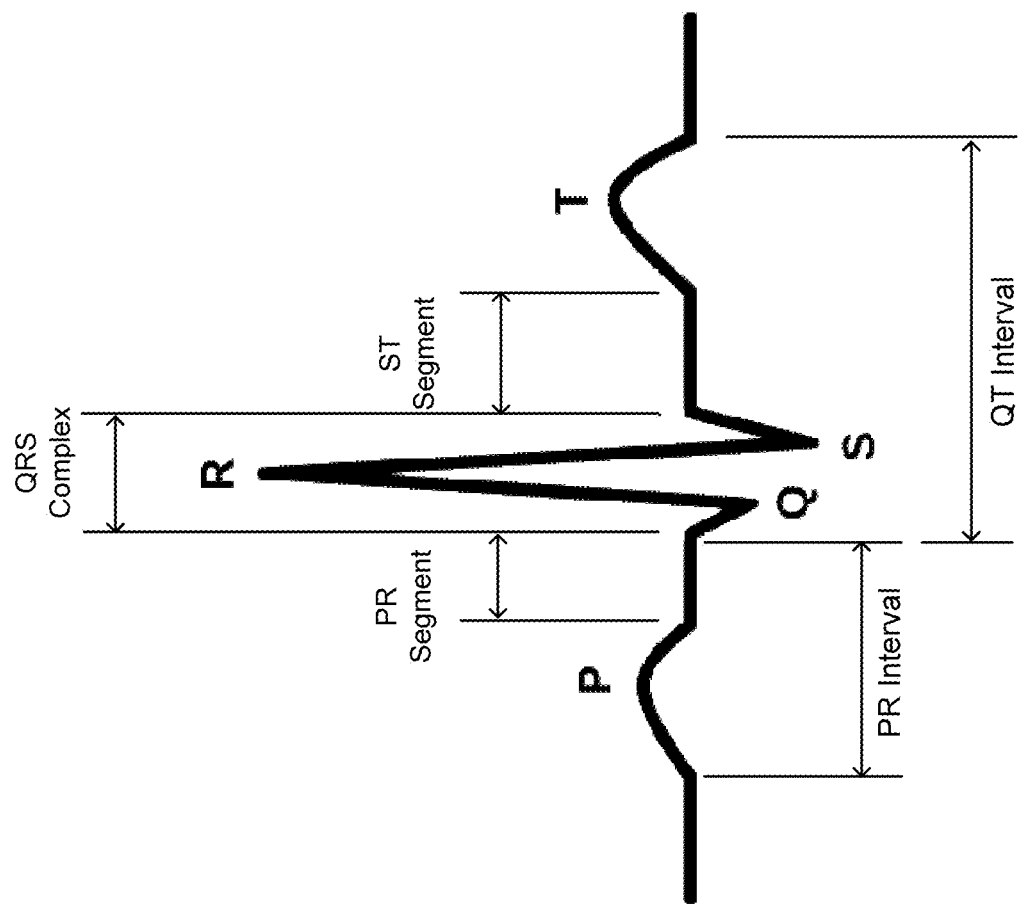
FIG. 2 is a schematic drawing showing various elements of an ECG waveform for an electric cycle of the heart.

For example, in some embodiments, the system allows a user to specify one or more segments of ECG data containing a Q pattern and one or more segments of data containing a T pattern (or one or more segments of data containing both a Q pattern and a T pattern). The system learns and detects the Q pattern and the T pattern. It then can obtain a QT interval as the interval between the onset of a Q pattern and the right intercept of a following T pattern. See FIG. 2 illustrating various elements of an ECG waveform for a cycle of the heart signal. At a learning layer, the systems capture the subjective fuzzy ability to find patterns similar to ways in which humans learn to recognize patterns. At metrology and reporting layers, the systems provide and report useful measurements and analyses on and across individual patterns.

Various implementations described or referenced herein are directed to different systems, apparatus, methods, and computer-readable storage media for pattern identification and pattern recognition.

A. Overview of Pattern Recognition

Generally, pattern recognition involves generation of input vectors potentially through feature extraction, and comparison of the input vectors to a set of known vectors that are associated with categories or identifiers. One finds example logic for pattern identification and pattern recognition in the following five patents, whose disclosures are hereby incorporated by reference: U.S. Pat. Nos. 5,621,863; 5,701,397; 5,710,869; 5,717,832; and 5,740,326.

A vector, in one implementation, is an array or 1-dimensional matrix of operands, where each operand holds a value. Comparison of an input vector to a known vector generally involves applying a distance calculation algorithm to compute the individual distances between corresponding operands of the input vector and the known vector, and in accordance to the distance calculation algorithm in use to combine in some fashion the individual distances to yield an aggregate distance between the input vector and the known vector(s). How the aggregate distances are used in recognition operations depends on the comparison technique or methodology used to compare input vectors to known vectors. There are a variety of ways to compare vectors and to compute aggregate distance. In some implementations, the resulting aggregate distance may be compared to a threshold distance (such as in the case of Radial Basis Functions). In other implementations, the aggregate distance can be used to rank the respective matches between the input vector and the known vectors (such as in the case of K Nearest Neighbors (KNN)). Selection of vector layout, comparison techniques and/or distance computation algorithms may affect the performance of a pattern recognition system relative to a variety of requirements including exact or proximity matching, overall accuracy and system throughput.

Using pattern identification and recognition, it is possible to recognize unknowns into categories. A system can learn that multiple similar objects (as expressed by one or more vectors) are of a given category and can recognize when other objects are similar to these known objects. In some implementations, input vectors having known categories can be provided to a pattern recognition system to essentially train the system. In a particular implementation, a knowledge element is (at a minimum) a combination of a vector and an associated category. As discussed in more detail below, a knowledge element may include other attributes, such as arbitrary user data and influence field values. The knowledge elements may be stored in a memory space or knowledge element array, which as discussed below may be partitioned in a configurable manner. A knowledge map is a set of knowledge elements. In some implementations, a knowledge element, in addition to defining a vector and a category, may further be instantiated as a physical processing element (implemented, for example, in a logic processing unit of a Field Programmable Gate Array (FPGA) that encapsulates processing logic that returns a match result in response to an input data vector.

Data vectors form the basis for the knowledge elements stored in the knowledge map as their operands are the coordinates for the center of the element in n-dimensional space. These data vectors can be derived from analog data sources (such as sensors) or can be based on existing digital data (computer database fields, network packets, etc.). In the case of all analog data sources and some digital data sources, one or more feature extraction processes or techniques can be used in order to provide a data vector compatible with the knowledge map used by the pattern recognition system.

Pattern recognition systems can determine the category of an unknown object when it is exactly the same or "close" to objects they already know about. With a Radial Basis Functions (RBF)-based or similar technique, for example, it is possible for a machine to recognize exact patterns compared with the existing knowledge or similar (close) patterns given the objects defined by knowledge elements in the knowledge map. Further, the systems can expand their knowledge by adding a new instance of a knowledge element in a category (as defined by one or more input vectors), if it is sufficiently different from existing knowledge elements in that category.

For didactic purposes, pattern recognition using Radial Basis Functions (RBFs) is described. As disclosed in the patents identified above, there exists a class of algorithms termed Radial Basis Functions (RBFs). RBFs have many potential uses, one of which is their use in relation to Artificial Neural Networks (ANNs), which can simulate the human brain's pattern identification abilities. RBFs accomplish their task by mapping (learning/training) a "knowledge instance" (knowledge vector) to the coordinates of an n-dimensional object in a coordinate space. Each n-dimensional object has a tunable radius—"influence distance" (initially set to a maximum [or minimum] allowed value)—which then defines a shape in n-dimensional space. The influence distance spread across all n-dimensions defines an influence field. In the case of a spherical object, the influence field would define a hypersphere with the vector defining the object mapped to the center. The combination of a vector, the influence distance and a category makes up the core attributes of a knowledge element.

In some implementations, an influence field is uniform or homogenous, such that the comparison between an input vector and the knowledge instance has equal results throughout the influence field along the tunable radius. In these implementations, the influence field can be analogous to an influence region. In numerous examples of these implementations, the terms influence field and influence region may be used interchangeably. In other implementations, the influence field may be non-uniform or heterogeneous. For instance, the influence field may taper off from the center to the periphery in some implementations. In other words, an input vector near the center of an influence field of the knowledge element may yield a higher matching score than another input vector near the periphery of an influence field. Multiple knowledge elements of the same or differing categories can be "learned" or mapped into the n-dimensional space. These combined knowledge elements define an n-dimensional knowledge map. Multiple knowledge elements may overlap in the n-dimensional space but, in some implementations, are not allowed to overlap if they are of different categories. If such an overlap were to occur at the time of training, the influence distance of the affected existing knowledge elements and the new knowledge element would be reduced just until they no longer overlapped. This reduction will cause the overall influence fields of the knowledge elements in question to be reduced. The reduction in influence distance can continue until the distance reaches a minimum allowed value. At this point, the knowledge element is termed degenerated. Also, at this point, overlaps in influence fields of knowledge elements can occur.

For pattern recognition, an unknown input vector computed in the same fashion as the vectors of the previously stored knowledge elements is compared against the n-dimensional shapes in the knowledge map. If the unknown data vector is within the influence fields of one or more knowledge elements, it is termed "recognized" or "identified." Otherwise it is not identified. If the unknown vector is within the influence field of knowledge elements within a single category, it is termed "exact identification". If it falls within the influence fields of knowledge elements in different categories, it is termed "indeterminate identification".

As discussed above, to process object influence fields and to determine which one of the three result types (exact recognition, not recognized, indeterminate recognition) occurred in recognition operations, a distance can be calculated to facilitate the required comparisons. The data vector format should be compatible and linked with the distance calculation method in use, as is indicated by the formulas shown below. In practice it is computationally more expensive to use hyperspheres (Euclidian distances) to map the knowledge elements, as the corresponding distance calculations require more time-consuming operations. In these cases, the knowledge element can be approximated by replacing a hypersphere with a hypercube, in order to simplify the distance calculations.

The classic approach focuses on two methods, $L_1$ and $L_{sup}$, to approximate the hypersphere with a value easier to compute (a hypercube). $L_1$ is defined as $$\sum_{i=0}^{n} = |DEVi - TVi|,$$

and $L_{sup}$ is defined as $|DEVi-TVi|max$, where DEVi is the value of vector element i of the knowledge element's vector and TVi is the value of vector element i of the input vector. $L_1$ emphasizes the TOTAL change of all vector element-value differences between the object's knowledge vector and the input vector. $L_{sup}$ emphasizes the MAXIMUM change of all vector element-value differences between the knowledge element vector and the test vector. However, as described further below, the pattern recognition system allows the use of other distance calculation algorithms, such as Euclidian geometry (true hypersphere) in addition to the $L_1$ and $L_{sup}$ methods.

A pattern recognition engine can be built to implement a RBF or other comparison technique to define knowledge maps, as described above, and different recognition system configurations. Besides comparison technique, key determinates of such an engine are the number of knowledge elements available, width of the data vector supported by the objects, the width and type of the vector operands, the distance calculation methods supported and the number of possible categories the machine can support. Moreover, a computerized machine can be built to define knowledge maps using Bayesian functions, linear functions, etc. as the comparison techniques. The pattern recognition system described here can be implemented using any such functions. That is, the RBF implementations described here are only representative.

The term "waveform" is used in reference to a signal displaying a wave-like shape and form. A waveform file is a file containing waveform data. A waveform file set is a concatenation of multiple waveform files resulting in a single uninterrupted input to a pattern recognition engine. A waveform file may contain a single channel or multiple channels to be analyzed. Each channel contains a single waveform.

According to the implementations herein, a "pattern" is a discernible regularity of measurements or observations, which can be represented by a vector defining a point in a multidimensional space when the vector components are interpreted as point coordinates. A waveform may include one or more occurrences of a pattern, i.e., one or more appearances of specific patterns.

In some embodiments, a pattern of a waveform may be a 2-dimensional pattern. For instance, a waveform pattern may be represented by amplitude on one axis (dimension) and time on another axis. In another instance, a pattern of a waveform may be represented by frequency on one axis and time on another. In another instance, a pattern of a waveform may be represented by a count or other value on one axis and an observation number or step on another. Additionally, a pattern may be represented by synchrony on one axis and location on another. In other embodiments, a pattern of a waveform may be an n-dimensional pattern, with n greater than or equal to 3, each dimension indicating different characteristics of waveform data.

A "pattern definition" described herein includes one or more waveform characteristics representing a pattern of interest. In some embodiments, one or more waveform characteristics of a pattern definition can be directly provided by a user. In some embodiments, the system automatically derives one or more waveform characteristics of a pattern definition by receiving a segment of data that the user identifies as having the pattern of interest and extracting one or more waveform characteristics from the received segment of data.

In some embodiments, a pattern definition is associated with a region of search (ROS). Each occurrence of a ROS provides a range of data in which the pattern recognition system searches for an occurrence of the pattern of interest. In some embodiments, the pattern definition is associated with other information that is useful for detection of the pattern of interest, e.g., markers and nominal position.

A defined item (e.g., a pattern or a marker) may appear or be encountered, detected, or recognized multiple times in a pattern recognition process. The term "occurrence" is used in connection to the item to distinguish the item's appearance, encounter, etc., from the item per se as defined.

A "marker" relates to one or more locations in a waveform, wherein each location is an occurrence of the marker, has a set of defined waveform characteristics, and is operable as a reference for an occurrence of a pattern of interest. In some embodiments, a marker corresponds to a single point on a dimension of a waveform. For instance, the marker can correspond to a point on the X-axis for a waveform plotted with time on the X-axis and signal amplitude on the Y-axis. A marker may also be based on a defined or detected pattern in a waveform. The pattern serving as a marker may be data from the same waveform as the waveform being analyzed for recognition of patterns of interest, or from a different waveform. For example, the pattern serving as a marker can be derived from a waveform from a different channel in a multi-channel system.

A "marker definition" provides information about a marker. In some embodiments, a marker definition is associated with information about one or more of the following: marker type, e.g., a level-crossing marker or a gradient marker; direction of signal change; threshold value of level or gradient; hysteresis establishing a value for a signal to reach for a second marker validation to be detected following a first detected marker; run for gradient (in some embodiments, a gradient is calculated by rise/run, wherein rise is the increase in signal amplitude and run is the elapsed time); maximum value for a gradient (point where a fluctuating gradient value is at its largest (for positive slopes) or smallest (for negative slopes) value; suppression value establishing a time delay before a second marker can be detected following a first detected marker; and channel wherein a marker is applied.

In some embodiments, multiple occurrences of the same marker definition can be found on a waveform. In some embodiments, occurrences of a marker are timestamps or locations along a waveform that can be used as references for the placement or detection of patterns. They can also be included as time locations for measurements.

A "nominal position" is the position of a defined characteristic of a waveform, e.g., a leading edge of a pattern, relative to one or more defined markers. A nominal position can be x distance units from a defined marker. In embodiments that involve a single defined marker, x distance units corresponds to the distance between the defined characteristics and the defined marker. For instance, when a marker is associated with a temporal point of waveform data with time on the X-axis and amplitude on the Y-axis, the distance units correspond to time intervals. More generally, in embodiments that involve two defined markers for a pattern, x distance units can correspond to a portion of the distance between the two defined markers. Each occurrence of the nominal position is x distance units from an occurrence of the defined marker. Therefore the occurrence of the nominal position is tied to an occurrence of a marker, but independent from a specific occurrence of the defined characteristic of a waveform, providing a computationally efficient way to determine occurrences of the nominal position. Each occurrence of the nominal position can then provide a reference for an occurrence of a region of search (ROS), wherein the ROS is defined relative to the nominal position. In some embodiments, the nominal position is the position of a leading edge of a waveform.

A "region of search" (ROS) is a range of data in which a pattern recognition system searches for an occurrence of a pattern. In various embodiments, a ROS can be based on time, frequency, or location. In some embodiments having a single marker, a ROS can be a region centered on a nominal position. In other embodiments having dual markers, a ROS can be a portion of the distance between the dual markers. In the case of a ROS defined as part of a pattern using no marker references, the ROS can define a leading edge of the associated pattern to be searched for. If the search is successful, the next ROS search interval begins at the trailing edge of the discovered pattern. Each pattern definition can have its own ROS. However, occurrences of different patterns are free to have overlapping portions in their respective ROSes as they are evaluated independently. In some embodiments involving a waveform having a plurality of occurrences of a defined marker, the waveform can also have a plurality of occurrences of a defined nominal position and a defined ROS.

A "detection threshold" is used herein to refer to a defined value that a signal needs to meet or exceed in order for a feature to be detected by a pattern recognition system. In the context of waveform analyses, for instance, the feature may be a marker, a pattern, or some characteristics of a waveform. The signal for the feature may be signal amplitude, slope, inflection, etc.

A "hysteresis threshold" is a signal difference from a detection threshold of a first occurrence of a marker, in the direction towards the baseline below the detection threshold, which is exceeded before a second occurrence of the marker immediately following the first can be detected.

A "processing template" is a reusable processing chain that defines the configuration of input file types, analyses (filters, markers, and patterns), learned knowledge, and measurements that may be used while processing data. The term processing template is used interchangeably with the term analysis template herein. In some embodiments, a single processing template can be applied to different input files.

"Users" may be individual researchers, scientists, technicians, engineers, or other operators who may be responsible for analyzing waveform data or operating the pattern recognition system. In some implementations, a user may be a device that requests recognition or learning operations either automatically or under supervision.

The term "multi-tenant pattern recognition system" can refer to those systems in which various elements of hardware and software of a pattern recognition system may be shared by one or more customers or other users. For example, a given application server may simultaneously process requests for a great number of users, and a given database table may store rows of data such as input vectors for a large number of users. In some embodiments, data associated with different tenants are stored separately, either on separate physical storage devices, or on separate databases on the same physical storage device. In other embodiments, data associated with different users of the same tenant are stored separately. In some embodiments, tenant administration can define how data is shared among its users or user groups. The term "query plan" generally refers to one or more operations used to access information in a pattern recognition system.

The term "job" is used herein to refer to a batch task including an analysis or processing template, input file(s) or data streams, and result database that will insert pattern analysis results into the database.

Various implementations disclosed herein may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine codes, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

B. Partition-Based Pattern Recognition System

Particular implementations of the present invention provide a highly-configurable partition-based pattern recognition system where a set of pattern recognition system attributes (such as vector attributes, comparison techniques, and distance calculation algorithms) can be configured as a so-called partition and selected as needed by a pattern recognition application. In some implementations, the memory space that stores knowledge elements can be partitioned, and a variety of pattern recognition system attributes can be dynamically defined for one or more of the partitions. In one implementation, a pattern recognition engine, such as hardware or a separate software module, maintains the knowledge maps and partitions, while a pattern recognition application accesses the knowledge maps by passing commands to the partition, such as configure, learn and recognize commands. In one implementation, the pattern recognition engine provides a set of application programming interfaces (APIs) that allow applications to define and configure partitions, as well as invoke corresponding partitions for learn and recognize commands.

Although many examples herein use the partition-based mechanism described in this section to perform recognition and learning operations, one skilled in the art recognizes methods of the invention are not necessarily limited to partition-based methods, but can also be implemented with other methods of pattern recognition.

A partition may include one or more of the following configuration parameters: 1) number of vector operands; 2) vector operand type; 3) vector operand width; 4) comparison technique; 5) distance calculation technique; and 6) maximum number of knowledge elements. A partition may also include additional parameter attributes that depend on one of the foregoing attributes. For example, if RBF is selected as the comparison technique, the initial influence field can be a capped maximum value (MAX Influence—the largest hyperspheres or hypercubes) or a smaller value which is the distance to the nearest neighbor of the same category or another category. These influence fields can be reduced as additional knowledge is "learned" which is not in the same category, but within the current influence field of an existing knowledge element. In addition, since a partition identifies a comparison type, one or more learning operations may also be affected. For example, if KNN is selected for the comparison type, learned vectors may be simply stored in the knowledge map without checking to determine whether a new knowledge element vector overlaps an influence field of an existing vector, as influence fields are not part of the KNN algorithm.

As discussed above, a pattern recognition engine maintains a knowledge element array which is a memory space for one or more knowledge maps. Each knowledge map includes one or more knowledge elements, which itself includes a vector, and a category identifier. The system allows for partitioning of the number of available knowledge elements to enable concurrent sharing of the pattern recognition resources. This supports multiple users of the knowledge map functionality, or supports a knowledge map application that wants to use it in different ways (e.g., different feature extraction techniques, different initial maximum influence value, different minimum influence value, different distance calculation method). For example, in a vision application one partition might be used for gradient analysis, whereas another partition of the knowledge element array might be used for histogram analysis. The results returned from each partition might be combined in several application-specific ways to achieve a final-recognition result.

A pattern recognition application can invoke a particular partition by identifying the partition when passing a learn, configure, or recognize command to the knowledge element array. The pattern recognition functionality may return results including an identified category, as well as other data configured or associated with the category or a matching knowledge element(s). In one implementation, the pattern recognition engine can be configured to remember the partition identifier of the last command passed to it and apply the last-identified partition to subsequent commands until a new partition is identified.

An overall pattern recognition process may be defined or configured as a series or set of individual pattern recognition operations, each associated with a configured partition. In one implementation, the pattern recognition application can include decisional logic that effectively arranges the partitions in a serial or hierarchical relationship, where each partition can be included in a decisional node including other logic or operations that is traversed during a pattern recognition operation. Traversing the partitions can be done by a host processor, or can be offloaded to a co-processor, or even programmed into a programmable logic circuit, such as an FPGA.

B.1. Partitions—Data Vectors and Operands

In the prior art, the width of the knowledge vector was fixed. This causes two problems. First, in situations where the input knowledge is smaller than this fixed width, resources are wasted as the full width of the neuron array is not used for each neuron. In some cases this can be dramatic (e.g., a 5-byte input vector being stored in a 64-byte vector width which is fixed). Second, in other situations, the input knowledge might have a natural width wider than the fixed vector width. This could cause loss of fidelity as the data must be scaled down to fit into the vectors. In the pattern recognition system described herein, the width of the knowledge vector of the knowledge elements and test vectors is not fixed. Multiple vector widths (such as 1-, 2-, 4-, 32-, 64-, 128-, 256-byte words) are available to suit the knowledge provided by the application or feature extraction processes. With smaller vector widths, more knowledge elements are available using the same memory resources.

Figure 3:
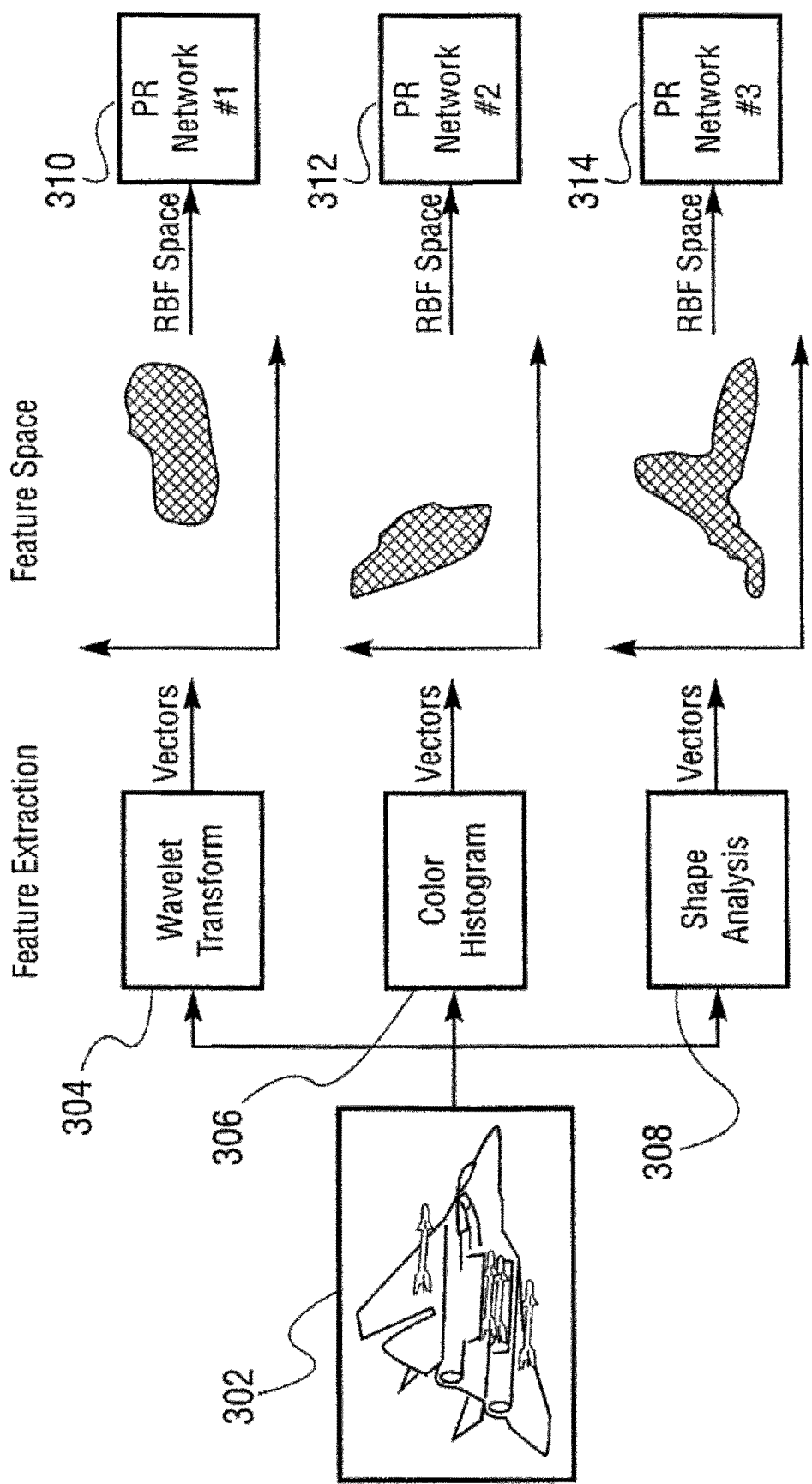
FIG. 3 is a flow diagram illustrating multiple feature extraction processes applied to an input.

Still further, the pattern recognition system can be used with a variety of supported data types. Knowledge elements and test vectors can be represented with a data vector having operands or vector elements of a variety of widths (as described above) and data types (such as unsigned bytes, signed bytes, unsigned N-bit integers, signed N-bit integers, floating point values, and the like). A given data vector can be generated from already digitized information or information that being fed directly from a sensor. The sensor-based information may be first processed by a feature extraction process (as well as other processes), as shown in FIG. 3. FIG. 3 illustrates a plurality of feature extraction processes 304, 306 and 308 can process a given input data set 302, such as in image captured by an image sensor, to yield corresponding n-dimensional vectors positioned in their respective feature spaces. For example, a color histogram feature extraction process 306 may yield an n-dimensional vector, where n is defined by the number of color bins of the color histogram and the value of each operand is the number of pixels that fall into each respective color bin. Other feature extraction processes may yield or require vectors having a different number of operands, and operand types (such as different widths and data types). As FIG. 3 illustrates, each of the resulting data vectors can be applied to a corresponding pattern recognition network 310, 312 and 314, each contained within a partition and each including a knowledge map for training/learning and/or pattern recognition operations. In one implementation, a partition may be configured for each feature extraction process, where the number and type attributes of the vector elements are defined based on the requirements or properties of each feature extraction process. For example, the wavelet transform process 304 may require that a data vector having 15 elements or operands, each having an 8-bit width are configured. The color histogram process 306 may require a data vector with 30 operands or elements, each having a 32-bit width.

B.2. Partitions—Comparison and Distance Calculation Techniques

As discussed above, a partition may be configured that identifies a comparison technique used to compare an input (test) data vector and a known vector of a knowledge element. Selectable comparison techniques include Radial Basis Functions, K Nearest Neighbor functions, Bayesian functions, as well as many others described in scientific literature. Additionally, after a comparison technique is selected, one or more technique specific parameters may be configured (such as maximum and minimum influence fields for RBF comparisons). Further an interface is defined so that users of the pattern recognition system can build their own pluggable comparison technique modules, if those provided by the pattern recognition system are not sufficient. Additionally, if one or more applications with different needs are using the knowledge element array, one could set up each partition to use different pluggable comparison technique modules.

Still further, the algorithm for computing the distance between an input vector and a known vector can also be configured. For example, one from a variety of algorithms can be selected, such as Euclidian distance, $L_1$, $L_{sup}$, linear distance and the like. As discussed above, however, $L_1$ and $L_{sup}$ are approximations of the true hyper-spatial distance which would be calculated using Euclidian geometry. In the pattern recognition system according to various embodiments of the invention, the math for doing distance calculation is "pluggable." This means that a given application can determine which math modules are available and request the one appropriate for its needs in terms of natural distance calculation, e.g., a module that uses Euclidian geometry and floating point numbers. Further an interface is defined so that users of the pattern recognition system can build their own pluggable distance calculation modules, if those provided by the pattern recognition system are not sufficient. In this manner, a user can set the width of the individual components of their input vectors, treat them as the appropriate data type (integer, floating point, or other) and can apply any distance-calculation algorithm that they desire or that the pattern recognition system chooses to provide. Additionally, if one or more applications with different needs are using the knowledge element array, one could set up each partition to use different pluggable distance calculation modules.

B.3. Partitions—Weighting & Masking

In the prior art, it was impossible or inefficient to mask off portions of the existing knowledge of a vector or to weight different parts of the trained knowledge element vector as might be needed on subsequent recognition operations. For example, a set of knowledge elements might be trained on an entire image, but in some subsequent recognition operations only the center of the images might need to be taken into consideration. In the pattern recognition system according to one implementation, mask vectors and/or weighting vectors can be used when matching against an existing knowledge base. In one implementation, masking and weighting of operand vectors is part of a recognition operation. In one implementation, an application may cause the pattern recognition engine to mask a vector operand by identifying a partition and the operand(s) to be masked in a mask command. An application may cause the pattern recognition engine to weight vectors operands by issuing a weight command that identifies a partition, the operands to be weighted, and the weighting values to be used. In one implementation the active influence field of a knowledge element may be temporarily increased or decreased to account for masking vectors or weighting vectors that may be currently in use.

B.4. Partitions—Higher Level Recognition Operations

Partitions can be configured and arranged in a hierarchy or other structured relationship (series, parallel, branching, etc.) to provide for solutions to complex pattern recognition operations. A pattern recognition application, for example, may define an overall pattern recognition operation as a set of individual pattern recognition operations and include decisional logic that creates a structured relationship between the individual pattern recognition operations. In such an implementation, the results returned by a first set of partitions can be used as inputs to a second, higher level partition. For didactic purposes, the decisional logic can be considered as a set of decisional nodes and a set of rules and processing operations that define relationships between decisional nodes.

A decisional node, in a particular implementation, may comprise configured logic, such as computer readable instructions, that includes 1) operations applied to one or more inputs prior to calling a pattern recognition engine; 2) calls to one or more partition-based recognition operations implemented by a pattern recognition engine, and/or 3) operations applied to the results returned by the pattern recognition engine. The decisional node may make calls to one or more partitions maintained by the pattern recognition engine. The additional logic of a decisional node can range from simple Boolean operations to more complex operations, such as statistical analysis and time series analysis. Furthermore, the operations responding to the results of pattern recognition operations can select one or more additional decisional nodes for processing.

In particular implementations, a decisional node can be implemented as a decisional node object, which is an instantiation of a decisional node class in an object-oriented programming environment. In such an implementation, the class can encapsulate one or more partition operations (as corresponding API calls to the pattern recognition engine). The decisional nodes can be sub-classed to develop a wide array of decisional nodes. As discussed above, additional logic can be developed to establish relationships between decisional nodes as well, and can be configured to interact with other decisional nodes or user level applications to achieve complex, high order processing that involves pattern recognition. For example, in one implementation, a decisional node could be implemented as a finite state machine whose output could change as inputs are provided to it and the results of recognition operations are returned. The resulting state of the finite state machine, at any given time, can be an input to a higher level decisional node, which itself may encapsulate one or more partition operations as well as additional processing logic.

Processing operations associated with a decisional node or a configured set of decisional nodes can be implemented in a variety of manners. Partition operations can be performed by a pattern recognition engine (implemented as a separate thread or process of a general purpose computer, offloaded to a co-processor, and/or implemented in a programmable logic circuit), while the decisional nodes can be implemented as a series of programming instructions associated with a user level application. In other implementations, processing of the decisional nodes can also be offloaded to a co-processor, and/or implemented in a programmable logic circuit.

Figure 4:
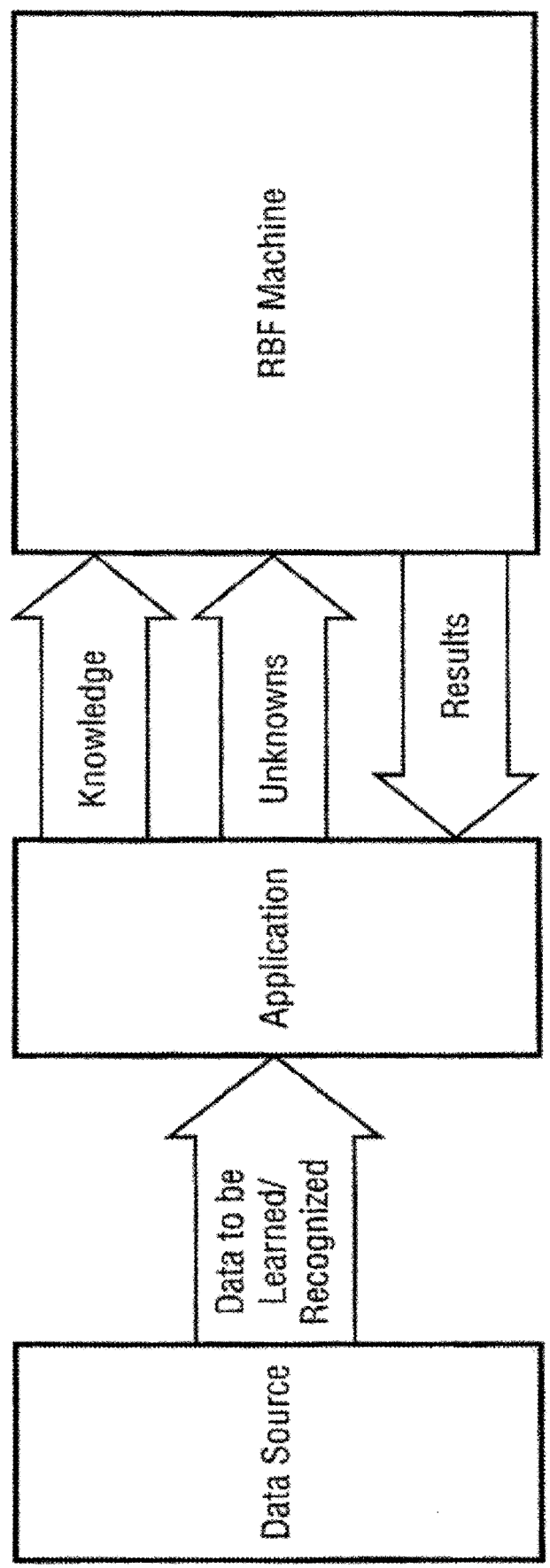
FIGS. 4 and 5 are schematic diagrams illustrating interaction of pattern recognition system components.

In the prior art, either a single recognition machine is used to identify a certain category of object or multiple recognition machines are used to identify an object when a majority vote wins. For example if two out of three recognition machines returned the same result, the object would be identified as that result. Further, in the existing prior art and scientific literature, RBF machines are used in a flat arrangement, as shown in FIG. 4. However there are large numbers of pattern identification problems where a flat arrangement cannot provide the desired results. These are normally situations where there is a large amount of detail (background and foreground) of different data types that must be processed in order to determine a final pattern recognition result. For example, one might apply a certain technique to input data and, if a match is found, then one might feed different data (based on the first match) calculated by a different technique into another recognition operation to determine a "higher level" recognition result.

Using the foregoing, a pattern recognition application can be configured to support a set of pattern recognition operations arranged in a hierarchy or other structured relationship that can be traversed to achieve a final recognition result. For example, a hierarchical configuration of pattern recognition operations can be configured where each decisional node of the hierarchy (pattern recognition partition(s) along with optional control/temporal logic) can identify a subsequent path to take. The results associated with one operational node of the hierarchy can be used to decide the next operational node to be executed and/or can be an input to a subsequent operational node. For example, the results of a first set of partition operations can become through combinational techniques, the input vector to a second, higher level partition or node operation.

Figure 5:
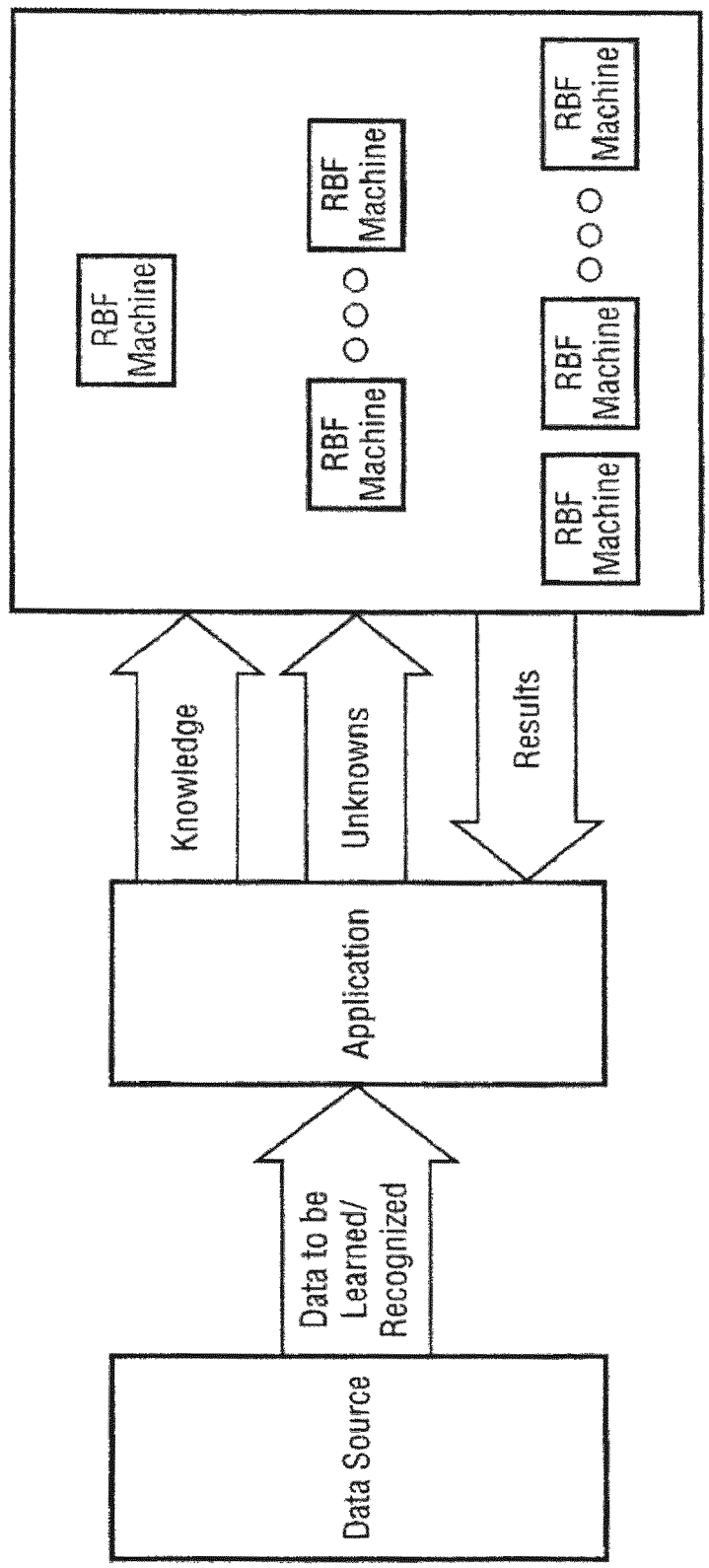

FIG. 5 illustrates a hierarchical recognition system, according to one implementation of the invention. A hierarchical recognition system, in one implementation, leverages the pattern recognition system's capabilities described here, including its capabilities with respect to opaque user data (as described in detail below), its partitioning capabilities, and/or its masking capabilities. When a knowledge map is taught a vector/category combination, the knowledge map allows opaque user data to be stored with knowledge elements as they are trained. The knowledge element/map does not process this information. It simply stores it and returns it to the application/user when the knowledge element is matched in a subsequent recognition operation. This opaque user data can be used for lookups (e.g., a key) or other user-defined purpose. This capability could be used to answer the question of why a certain vector fell into a specific category as the opaque data value returned could be used to look up the original training vector (and its source, e.g., picture, sounds, etc.) to present to a user or for use in an auditing application.

The opaque user data of multiple recognition operations could be used as an input vector (via combinatorial logic) to a higher level partition/node, or could also be used to lookup a data vector that could be used as an input vector (via combinatorial logic) to a higher level partition/node. In other implementations, the opaque user data could be used to look up a partition or decisional node to be processed next in a multiple layer pattern recognition application. For example, one recognition stage could use a first partition to provide a result. Via the use of opaque user-data, a subsequent recognition stage, using the same or a different input vector, could be performed in a different partition based on the opaque user data returned by the first recognition stage. This can continue for several levels. Additionally, once a higher level recognition result is achieved, it could be used to weight or mask additional recognition operations at lower levels in the hierarchy, such as to bias them toward the current top-level recognition.

Thus, a pattern recognition application may use multiple partitions or nodes to create the layers or it may create multiple independent layers and connect them as needed. The application decides which partitions/nodes are to be in which layers. To use such a pattern recognition system, the application trains specific knowledge elements with corresponding opaque user data (see above and below) into specific partitions. In the more simplistic case, a given unknown pattern may be presented to the appropriate partitions and the recognition result of each partition (combination of category recognized and/or opaque user data and/or derived data from the opaque user data), if any, would be fed to higher layers in the hierarchy. This process would repeat until a final recognition result was derived at the top of the hierarchy.

An example of this would be the lowest level of the hierarchy recognizing edges of a shape or sub-samples of a sound. Further up in the hierarchy, lines with intersecting angles would be recognized from image data along with tones from sound data. Still further up in the hierarchy, a four legged mammal would be recognized from the image data and the sound "woof" would be recognized from the sound data. Finally at the top of the hierarchy "dog" could be the final recognition result.

Or consider the following example. An image sensor might be pointed at a scene which includes a wall upon which a TV is mounted. First level pattern recognition might detect the corners and edges of the TV in the middle of their field of view. Once the individual elements were recognized, data associated with this recognition operation (e.g., the opaque user data in the pattern recognition system) might contain data on the position of the recognition in the overall scene (e.g., corner located at 2, 4, 8 and 10 o'clock). Similar results might be obtained for the edges. A higher level of recognition might conclude that these patterns in their respective positions formed a box. Recognition techniques using other different approaches might plot color changes. When these results are combined with all other techniques a final result of TV might be the determination at the top of the hierarchy. Once the TV is recognized, masking or weighting might be applied to lower levels in the hierarchy to focus only on the TV and ignore other objects in the scene being recognized, such as paintings on the wall, flying insects, books on a bookshelf, etc. A practical application of this example would be airport security where once a wanted person was identified by the facial patterns, tone of speech, type of clothing, fingerprint, etc., a computerized system could then "follow" this person throughout the facility continuously recognizing the person while somewhat ignoring the surrounding scene. In addition to the spatial examples defined above, additional levels in the hierarchy could use temporal (times series) pattern recognition operations to define their outputs. The input to these levels would be spatial recognitions that are then trended over time to produce a temporal recognition result.

A permutation on this case is that instead of just using one partition's or node's results to feed to a higher level partition or node, multiple lower level partitions could be combined into recognition units (or nodes). In this fashion probabilistic results can be feed further into the hierarchy. An example would be the lower level results are that there is an 80% probability, as opposed to a binary result in the simpler hierarchy.

Through experimentation, the correct numbers of levels are determined along with what to train/recognize in each level and what to feed up to higher levels. A starting point can be to use different knowledge vector feature extraction techniques at the lowest level and map these different techniques to different partitions/nodes. Next one would feed unknown knowledge vectors to the trained lower level to determine what was recognized. Based on these recognition results, the connection to the next level in the hierarchy would be created along with determining suitable feature extraction algorithms and associated logic for that level. In some cases the original training data would be used with different nth-order feature-extraction algorithms to train higher levels, or the output from the lower level (opaque user data or derived from opaque user data) would be used to train the higher level or a combination of the two. Each recognition problem domain may require experimentation to determine what the proper number of levels is, what the levels should be trained with and how they should be connected.

In the previous example, high fidelity recognition results can be obtained by feeding up through a recognition hierarchy. For time series (or temporal) recognition problems, it is also useful to feed a result from higher levels back to lower levels to bias them for the object being recognized and tracked. As an example, once a dog is recognized as barking, it can be advantageous to focus on the barking dog as opposed to blades of grass blowing in the background. The opaque user data could also be used to bias one or multiple levels of the recognition hierarchy once "sub recognitions" occurred at lower levels in the hierarchy to allow them to help focus the "desired" result.

In order to accomplish this, as each level recognizes a specific pattern, it could provide a bias to its own inputs or feed a bias to a lower level in the hierarchy to bias its inputs. This feedback would be accomplished the same way as the feed forward approach, namely, use (1) the recognition results' opaque user data or (2) what that data points to, to provide a bias to the same or a lower level. This would be accomplished by using the masking or weighting functionality described earlier.

C. Enhancements to Logic for Pattern Identification and Pattern Recognition

As described in the paragraphs below, the system enhances pattern recognition functionality in a variety of manners, in one implementation, making the logic more useful to real-world applications.

Figure 6:
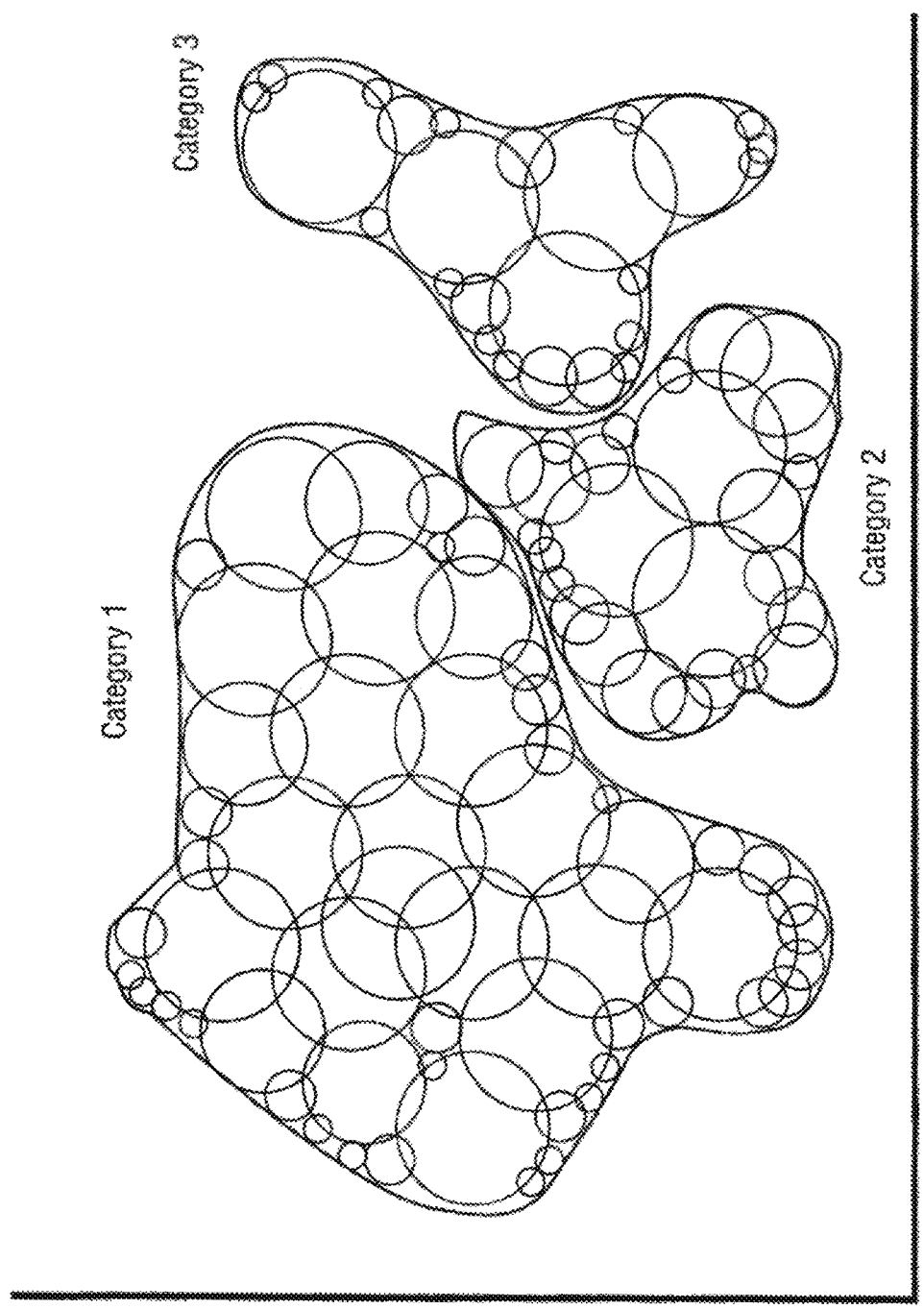
FIG. 6 graphically illustrates a knowledge map for didactic purposes.

FIG. 6 shows an idealized, example pattern recognition knowledge map that might be defined for a two-dimensional (2D) vector type after array training has progressed to a near final state. Three categories have been defined. There is also an "other" category which is implied in the figure. Pattern recognition approximates the "real" knowledge category map (outer black lines) with a plurality of knowledge elements represented as circles in the idealized diagram of FIG. 6. With sufficient training, the difference between the real map and the approximate map can be quite small. In the case of RBF, knowledge elements are allocated to define a point in N-dimensional space, hold an influence field value (radius) and also remember their category (among other attributes). A collection of these knowledge elements in association with a partition is a knowledge map. As a data vector is taught to the knowledge element array (teaching=data vector+category+optional user data+learn command), it is mapped to the appropriate n-dimensional coordinate. If not within the influence of an existing knowledge element, a knowledge element is allocated for the data vector and then an initial influence field is applied along with the given category and optional user data. When this happens the current influence field of other knowledge element may be reduced so no overlap occurs where the categories would be different. In other words, the influence fields of knowledge elements on the boundary of a category in the knowledge map are reduced so as to not overlap with those in a different category. There is an influence field value (MIN Influence) past which the current influence field cannot be reduced. If this happens, the knowledge element is termed "degenerated." Teaching data vectors which are not in a category (i.e., they are in the "other" category) is almost exactly the same (e.g., influence fields of existing knowledge elements may be adjusted), but no new knowledge element is allocated. As explained below, this process is called half-learning.

Figure 7:
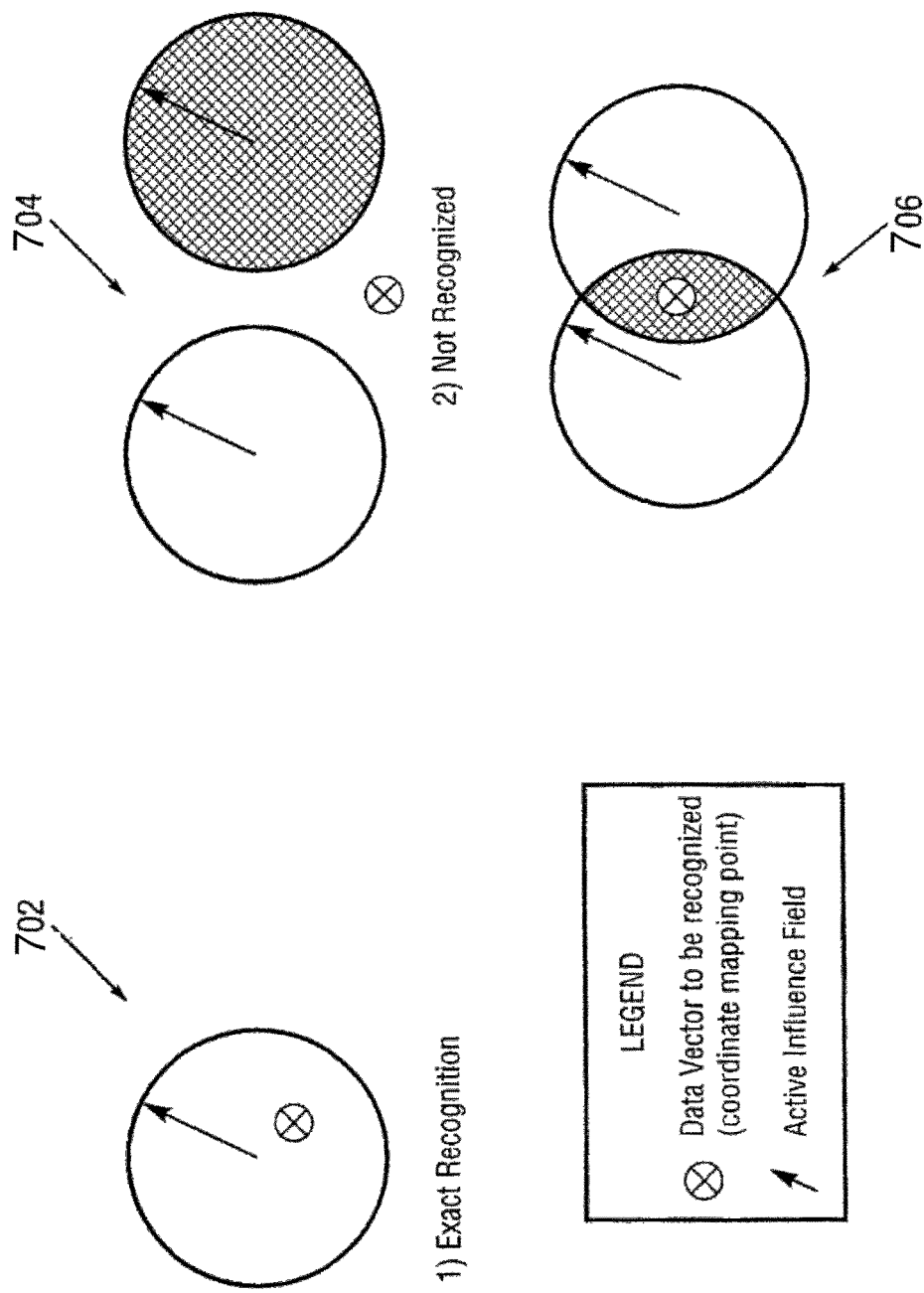
FIG. 7 graphically illustrates matching of input vectors to knowledge elements according to one possible implementation of the invention.

In the recognition phase, input (test) data vectors are presented to the knowledge map and, in one implementation, with a partition identifier. FIG. 7 below shows an example of these three recognition result types. The recognition result can be one of three types:

1. Exact Recognition (702)—The input vector fell within the influence field of knowledge elements of only a single category. The category of these knowledge elements is available to determine the type of information recognized.
2. Not Recognized (704)—The test vector fell outside the influence field of all knowledge elements. This could be a valid result (when an "others" category is appropriate for the knowledge map), or an indication that additional training using the test vector in question is warranted.
3. Indeterminate Recognition (706)—The test vector fell within the current influence fields of more than one knowledge element and those knowledge elements were of different categories. In this case, the category the smallest distance away can be used, the majority category value of the knowledge elements matched can be used, or as with the Not Recognized state, additional training may be warranted.

Figure 8:
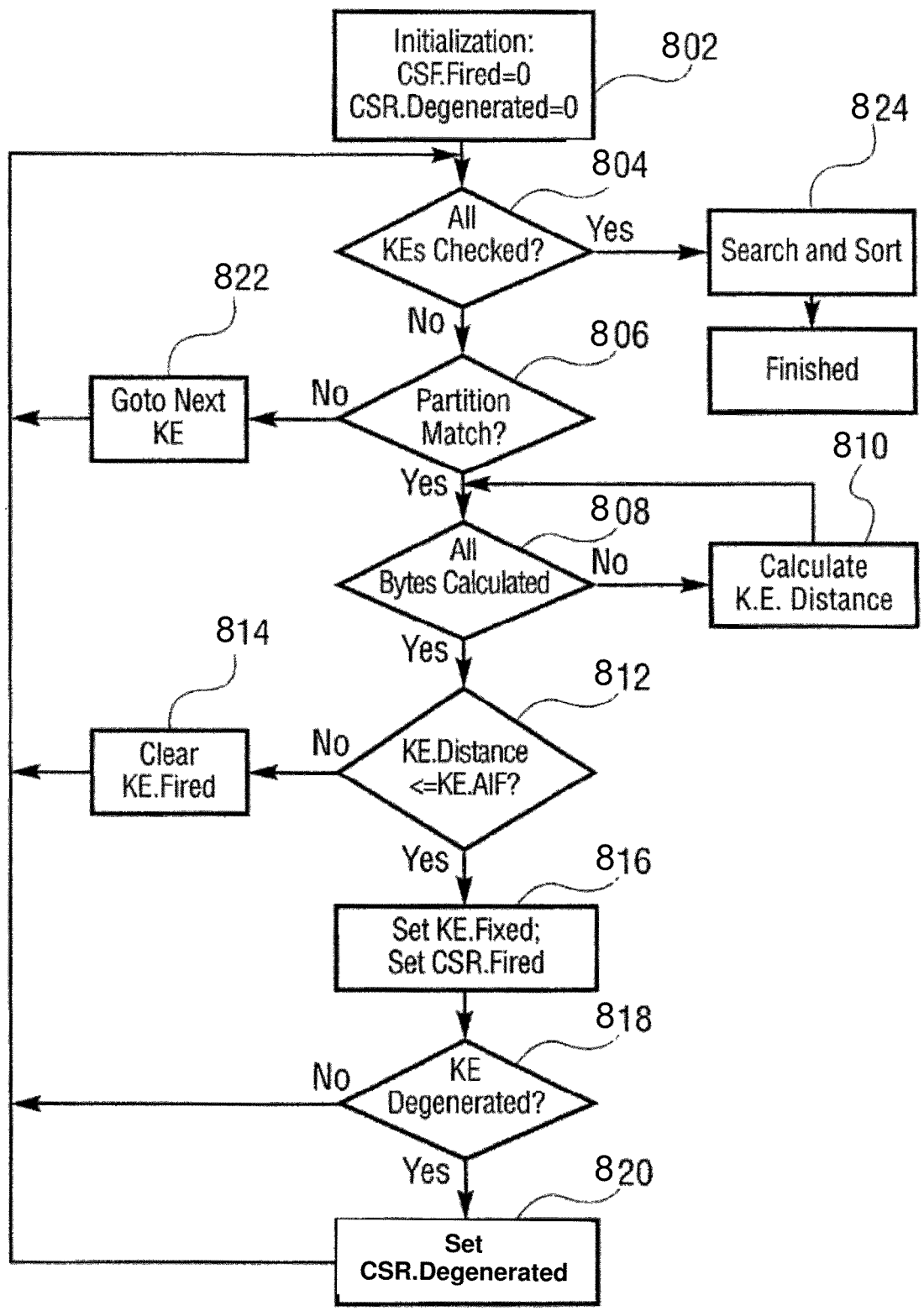
FIG. 8 is a flow chart showing a method directed to matching knowledge elements against input vectors.

FIG. 8 shows an example flowchart of the logic depicted pictorially in FIG. 7. For example, an application may pass a recognize command to a pattern recognition engine identifying an input data vector and a partition. The pattern recognition engine may initialize one or more operational variables (802) and begin processing the input data vector. For example, the pattern processes the input data vector against all knowledge elements (KEs) (804, 822) that correspond to the identified partition (806). As to a given knowledge element, the pattern recognition engine may compute a distance between a first operand of the input vector and the corresponding operand of the knowledge element vector using the distance calculation algorithm of the identified partition, and repeats this process for all operands to compute an aggregate distance (KE.distance) (808, 810). Next, the pattern recognition system determines whether the aggregate distance between the input vector and the knowledge element vector is within the influence field of the knowledge element (812). If not, the pattern recognition system clears the KE.Fired flag that would otherwise indicate a match (814). If so, the pattern recognition engine sets the KE.Fired flag to indicate a knowledge element and category match (816). Additionally, if the knowledge element is a degenerated element (818), the pattern recognition engine sets a degenerated flag (820). In the implementation shown, after or as knowledge element comparison logic is executed, control logic searches the results and sorts the matching knowledge elements by the respective aggregate distances between the input vector and the knowledge element vectors (824). Other implementations are also possible. For example, if KNN is used, the comparison of influence field to aggregate distance would be omitted. In such an embodiment, the top K matching knowledge elements are returned ordered by distance. Still further, if a test vector is matched because it falls within the active influence field of an existing knowledge element, this is a "fuzzy" or "proximity" match. To be an exact match, the test vector would have to be the same (exactly) as the knowledge vector of a knowledge element in the knowledge map. In one implementation, the pattern recognition system allows an application to select proximity (tunable) or exact matching.

C.1. Optimization of Knowledge Vector Fields

In the prior art, an input vector presented for learning would be rejected if it falls within the influence field of an existing knowledge element in the same category. Yet a subsequent learning operation might allocate a knowledge element in another category which could cause the influence field of the original "matched" knowledge element to be reduced such that if the initial input vector was then presented, it would cause a new knowledge element to be allocated.

Figure 9:
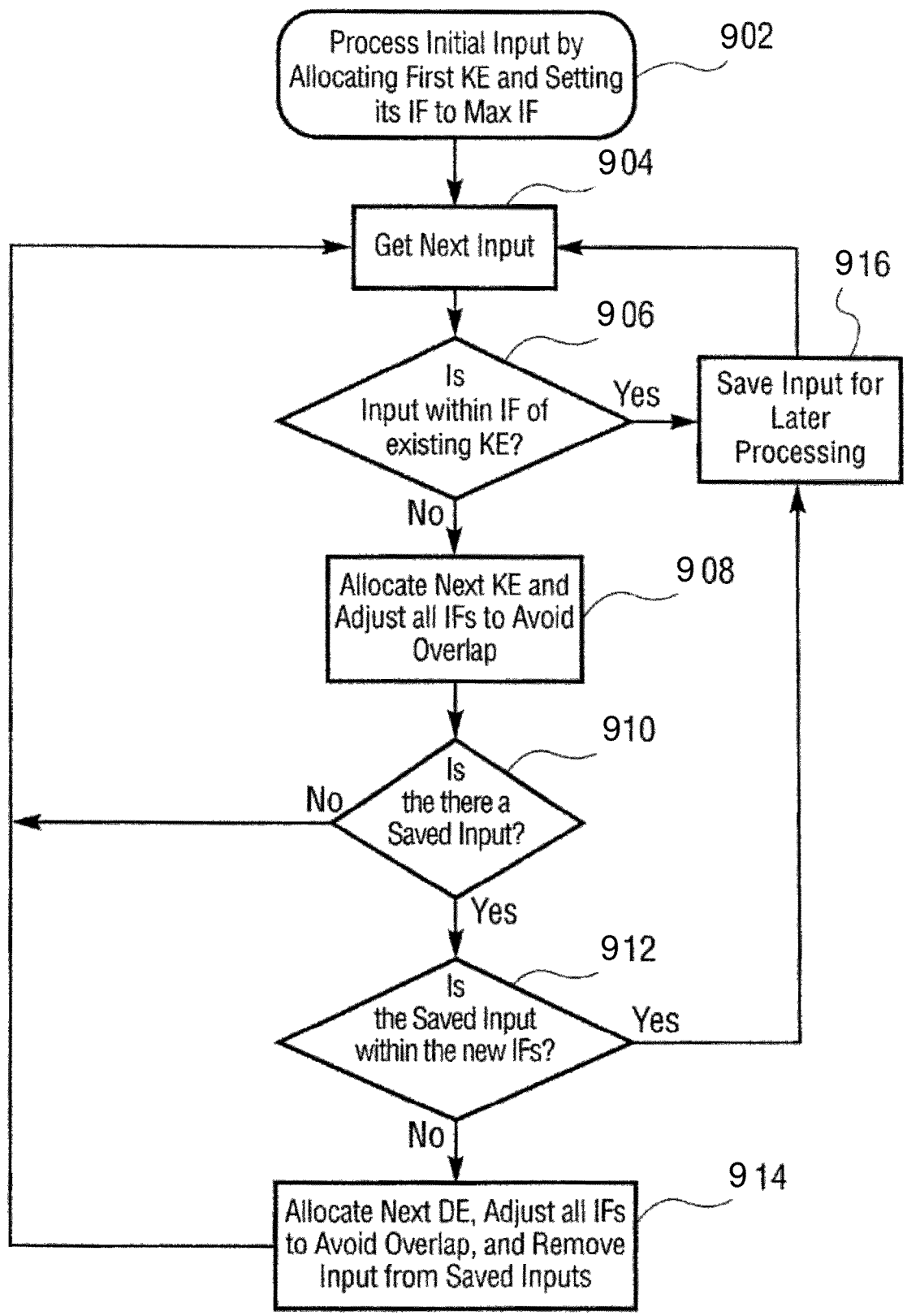
FIG. 9 is a flow chart showing a method directed to a learning function according to one possible implementation of the invention.
Figure 10:
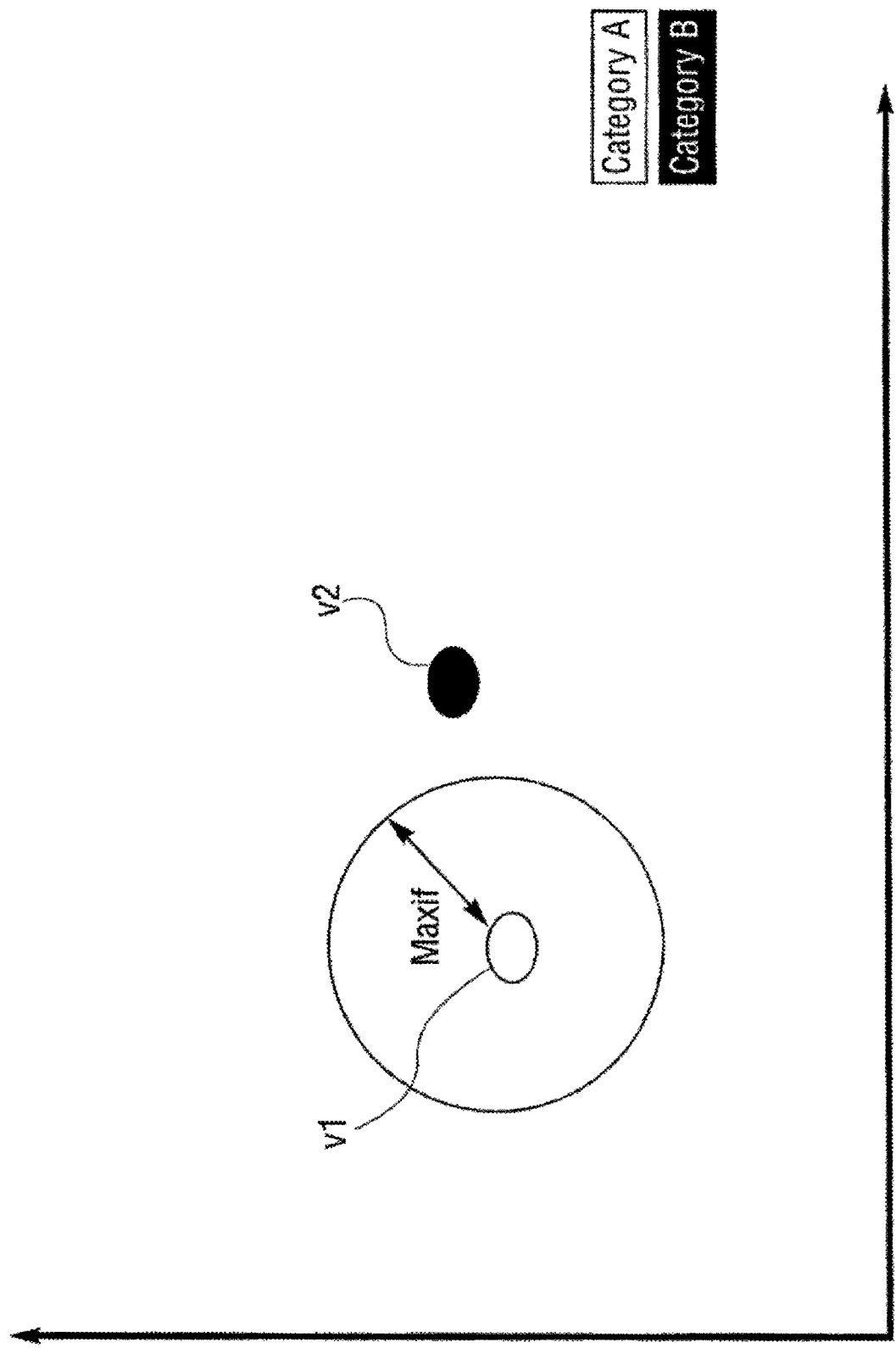
FIGS. 10, 11, 12, 13, 14, 15 and 16 are charts that graphically illustrate a learning function according to one possible implementation of the invention.
Figure 11:
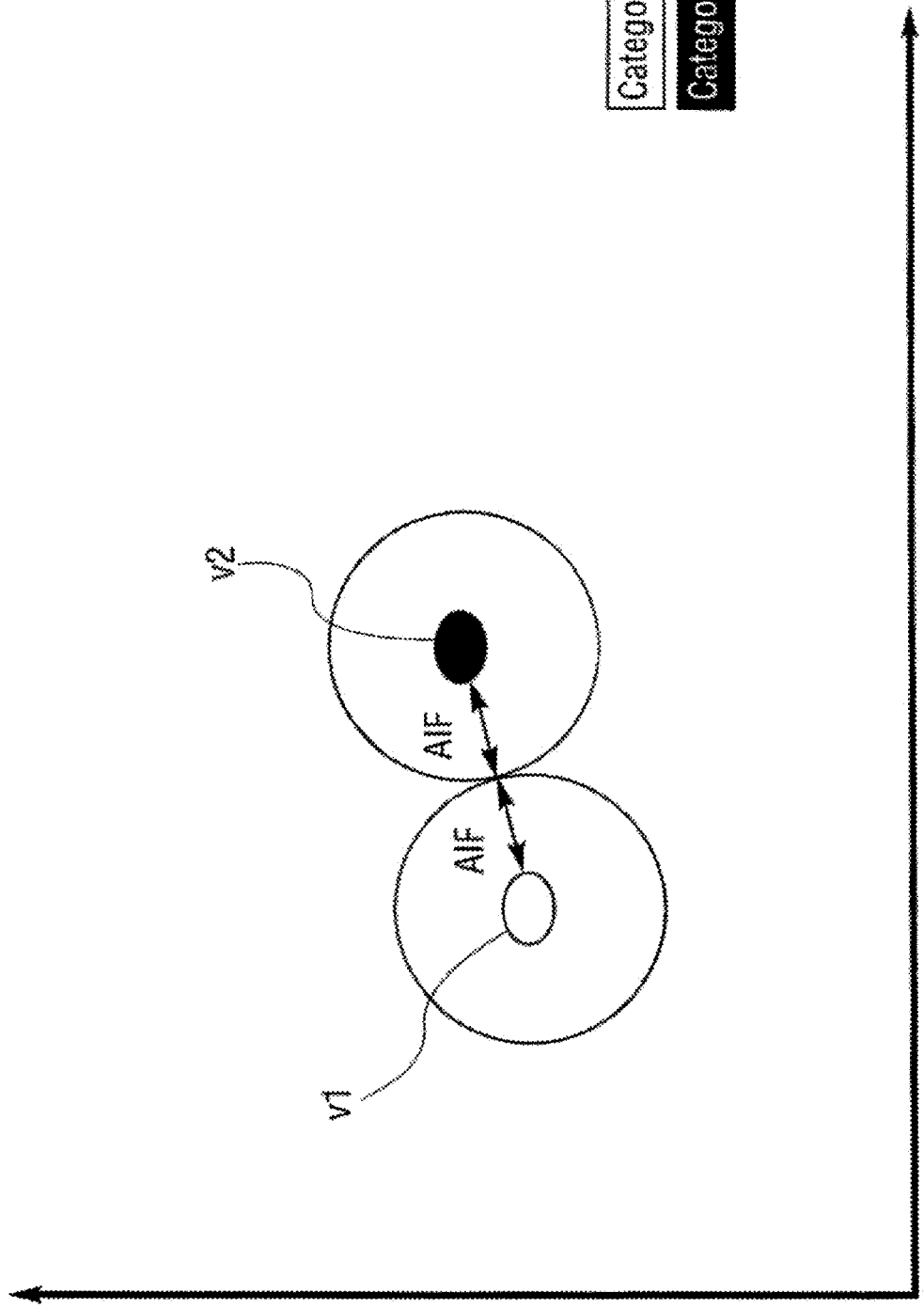
Figure 12:
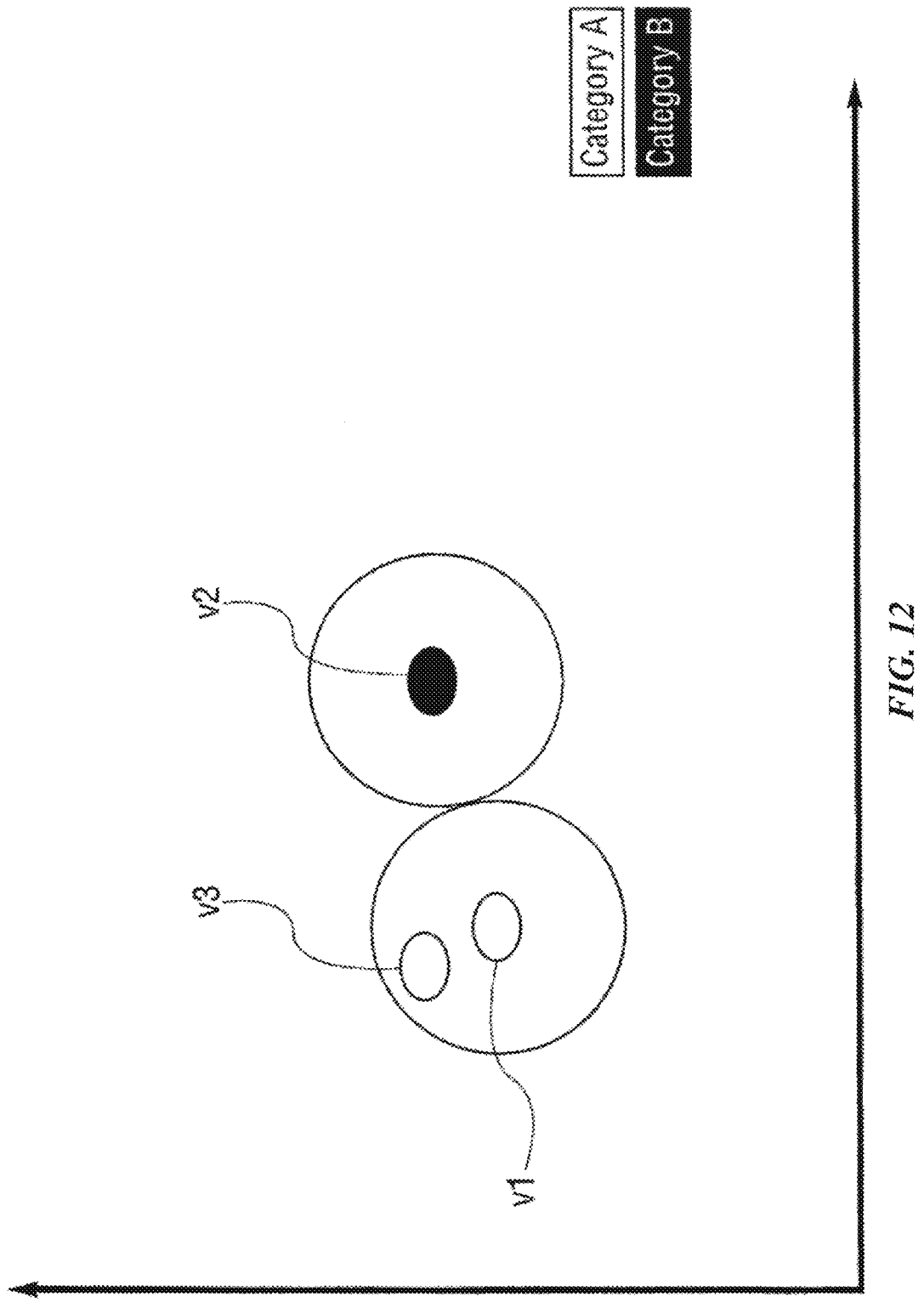
Figure 13:
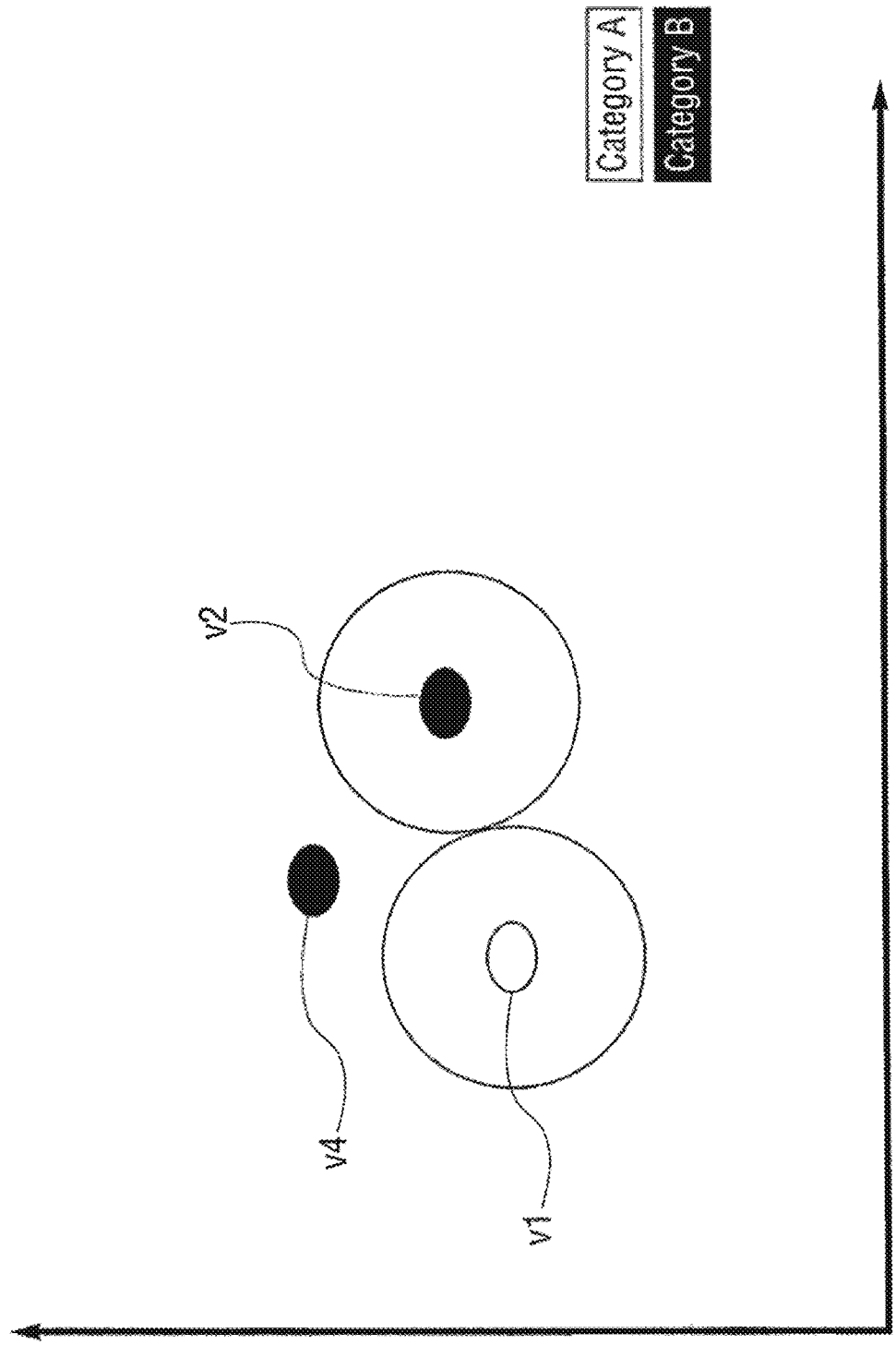
Figure 14:
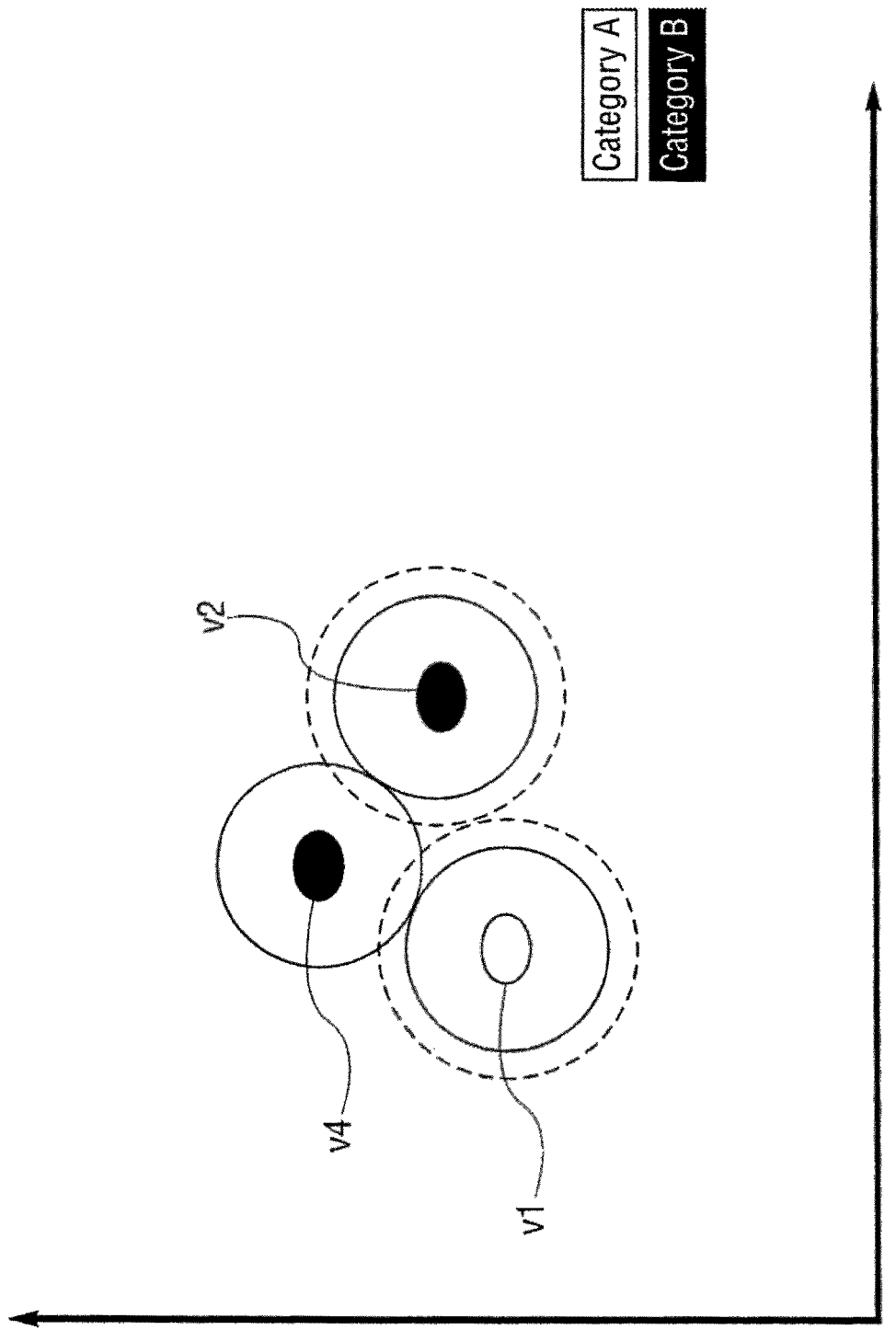
Figure 15:
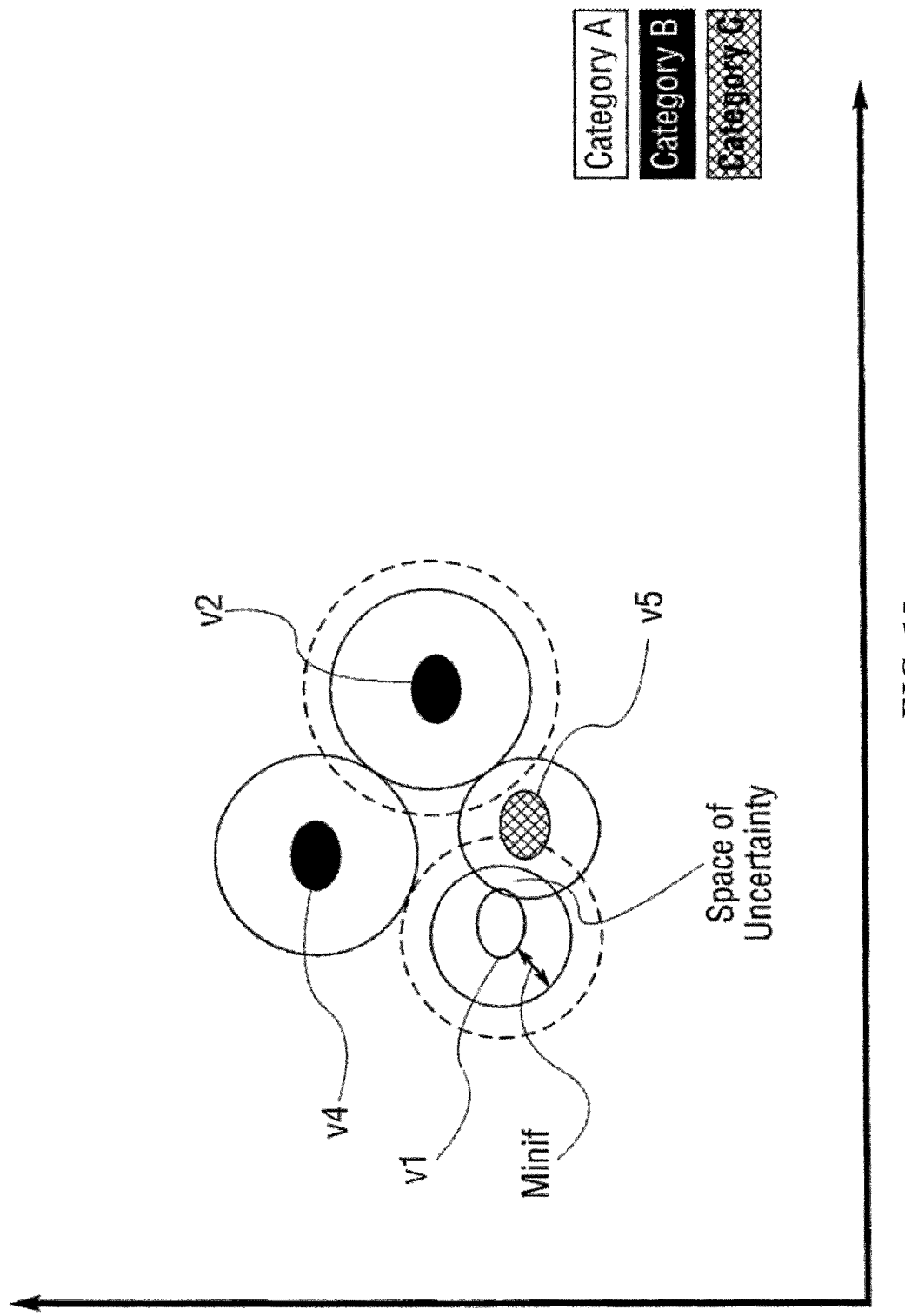
Figure 16:
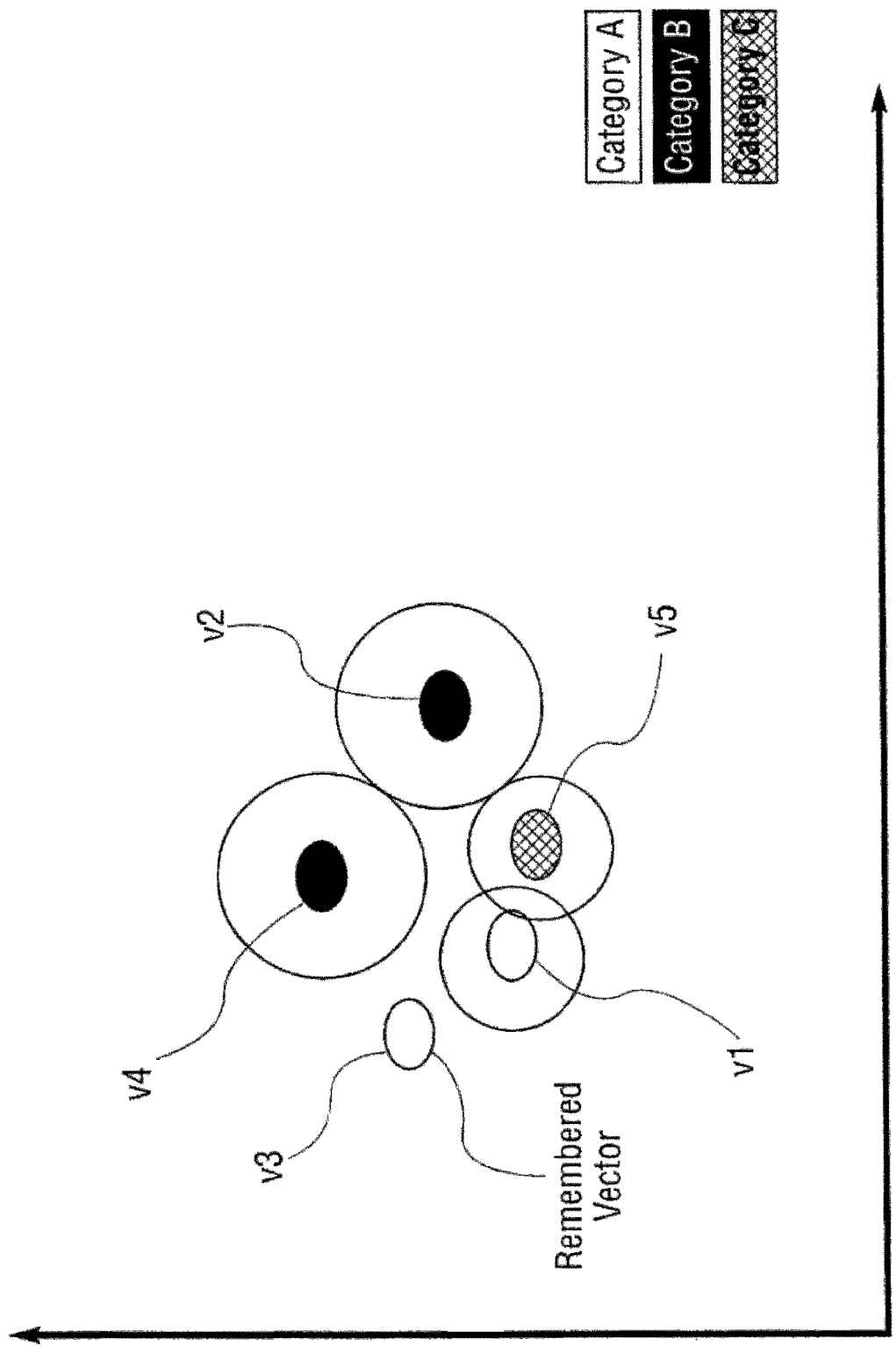

In the pattern recognition system according to certain implementations of the invention, all vectors presented for learning that match against existing knowledge elements are remembered and are tried again if a subsequent learning operation reduces the influence field of any knowledge element in the array. In this way, knowledge density can be maximized to aid in increasing the sensitivity of subsequent recognition operations. This learning process is shown pictorially in FIGS. 10 through 16 for an example in a hypothetical 2-D space. FIG. 9 illustrates a method directed to the foregoing. FIG. 10 illustrates a learned vector v1 in category A and a learned vector v2 in category B. As FIG. 10 illustrates, the knowledge element corresponding to vector v1 has an influence field set to the maximum (Maxif) (see FIG. 9, 902). Vector v2 is the next learned input vector (FIG. 9, 904). As FIG. 11 illustrates, the influence fields of the knowledge elements for vectors v1 and v2 are adjusted to not overlap, since they have been assigned different categories (906, 908). In one implementation, the influence fields of each of the knowledge elements are adjusted equally to prevent the overlap. Other modes can be implemented as well. For example, the influence fields of a selected category can be favored by some weighting factor that causes the favored category to have a larger influence field. As FIG. 12 illustrates, vector v3, in the same category A as vector v1, lies within the influence field of an existing vector (again v1). Accordingly, vector v3 is initially omitted from the knowledge map in that no knowledge element is allocated, but saved for later processing (906, 916). FIG. 13 illustrates a vector v4 in Category B, which (as FIG. 14 illustrates) causes the influence field associated with vector v1 to be further reduced (906, 908). As FIG. 14 shows, in one operational mode, the influence field associated with vector v2 can also be reduced; however, in another operational mode, influence fields are adjusted only for overlapping knowledge elements in different categories: The selection of mode, in one implementation, can be another partition configuration attribute. FIG. 15 illustrates the addition of vector v5, which causes the influence field associated with vector v1 to reduce to the minimum allowed value (906, 908). As FIG. 16 shows, vector v3 no longer lies within the influence field associated with vector v1 and is allocated a knowledge element in the knowledge map (see FIG. 9, 910, 912 & 914).

C.2. Optimization of Knowledge Maps

In addition to adjusting individual knowledge elements' influence fields sequentially and iteratively during recognition and learning operations, some implementations of the pattern recognition system provide mechanisms to optimize a knowledge map by reorganizing the knowledge map resulting from one or more recognition operations or learning operations. In additional to adjusting the influence fields of knowledge elements, the system can substitute one or more new knowledge elements for existing knowledge elements in a knowledge map, thereby improving the information density of the knowledge map and recognition efficiency of the system.

In a learning process, examples are added as knowledge elements in a knowledge map. It is likely that the order in which examples were added is non-optimal with respect to the knowledge element count and/or the aggregate region mapped by the influence region of the individual knowledge elements. In the simplest case, X examples may have been required to map the n-dimensional space required for a given pattern based on the order they were learned by the user. There exist at most X! possible orders these pattern examples could have learned in. A simple approach to optimization might be to try all X! permutations and determine which one results in the smallest number of knowledge elements for a given "optimized" partition. At the other end of the spectrum, more sophisticated approaches would determine the aggregate region mapped by the knowledge elements in an original partition and then create an optimized number of knowledge elements that map the same (or very similar) aggregate region. The optimized knowledge elements might not correspond to examples that were originally learned. In some implementations, the system keeps track of the optimized knowledge elements and the original knowledge elements for audit purposes. In embodiments implemented in a distributed environment, discussed further below, an optimization process may be directed to a separate machine.

In some embodiments, the system first determines the aggregate region mapped by learned knowledge elements in a particular knowledge map. Then the system creates an improved knowledge map including a plurality of improved knowledge elements that map a region that is equivalent to the aggregate region mapped by the learned knowledge elements. The new knowledge map is considered improved as the improved knowledge elements meet one or more defined criteria.

In some embodiments, the new knowledge map is considered improved if the number of improved knowledge elements in the knowledge map is fewer than the previously learned knowledge elements. In other embodiments the new knowledge map is improved if the new knowledge elements are distributed more evenly throughout the aggregate region mapped by the previously learned knowledge elements. Other criteria may also be used to determine if the new knowledge map has been improved or optimized. Such criteria include but are not limited to: the distance among the new knowledge elements, the distance between the new knowledge elements and the previously learned knowledge elements, and the distance between the new knowledge elements and input vectors. Although some of the new knowledge elements and the previous learned knowledge elements may overlap, typically one or more of the improved knowledge elements are different from the previously learned knowledge elements.

In some embodiments, the system has the capability to audit the reorganization of the knowledge map. The system stores the previously learned knowledge elements, as well as the improved knowledge elements defining a new feature space. In some embodiments, during additional learning and recognition operations, the system can compare the accuracy, reliability, and efficiency of the previously learned knowledge map and the improved knowledge map. In some embodiments, the system tracks where the original examples of knowledge elements used in training are mapped to the new feature space.

In some implementations, the pattern recognition system has the ability to carry out learning, reorganization, and recognition processes simultaneously. To improve the computational efficiency of the simultaneous processes, the system is configured to direct the reorganization of a particular knowledge map to be carried out by a processing unit separate from the processing unit that performs the recognition or learning operations. In a distributed computing platform, such as ones discussed below, the reorganization of knowledge maps can be carried out by processing units on a remote server over the Internet.

C.3. Half-Learning an Input Vector

Figure 17:
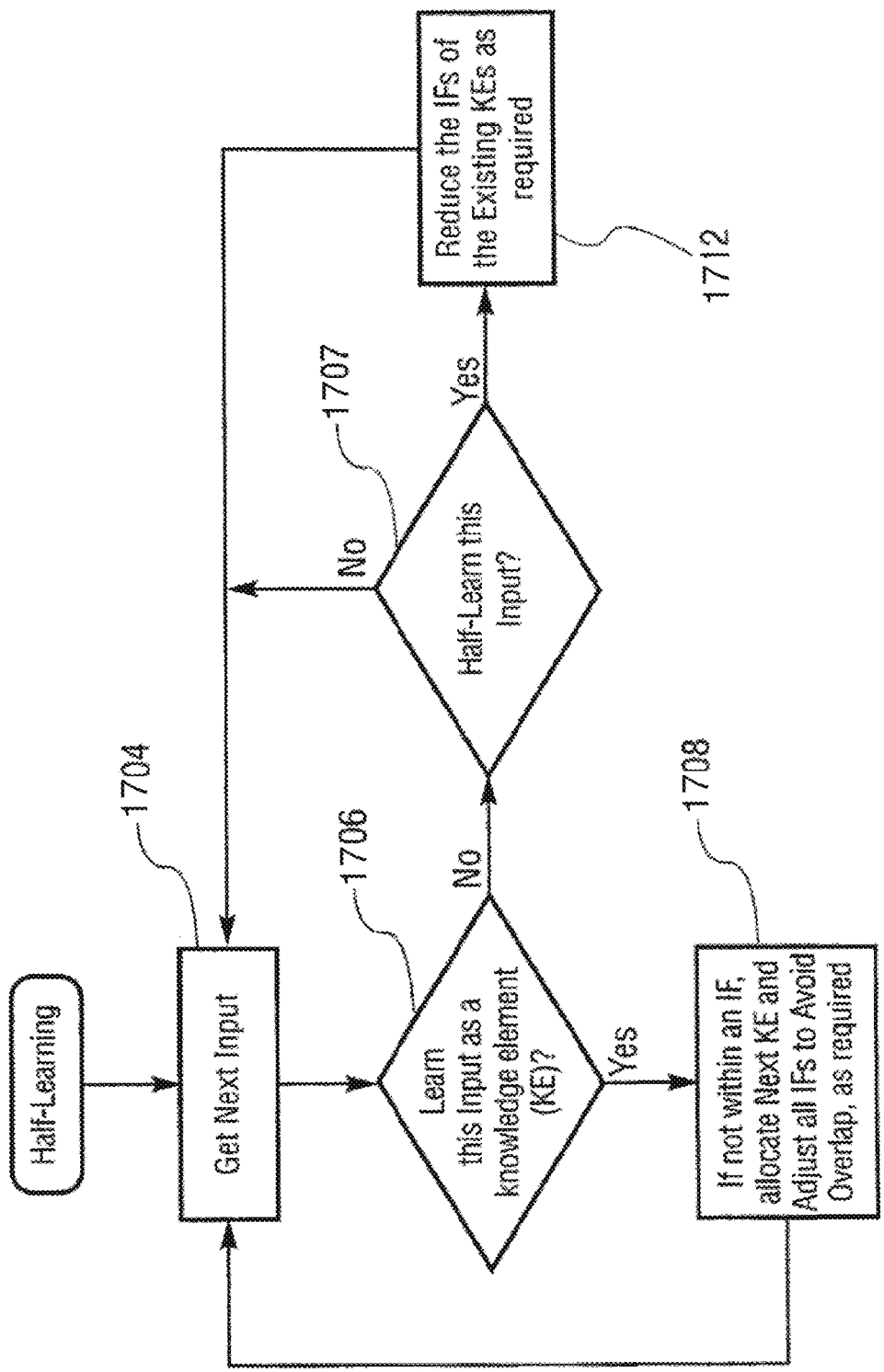
FIG. 17 is a flow chart showing a method directed to a half-learning function according to one possible implementation of the invention.

In many cases, additional input knowledge is not meant to be learned (e.g., allocated a knowledge element) but rather is only used to adjust the influence fields of existing knowledge elements to make sure they would not match the input data on a subsequent recognition operation. The pattern recognition system described here does allow this; it is termed "half-learning". With half-learning, influence fields may be adjusted, but no new knowledge elements are allocated to preserve memory resources. As shown in FIG. 17, with each input to be learned (1704), the pattern recognition engine checks whether the learn command is a half-learn command or a regular learn command (1706). If a regular learn command, the pattern recognition engine allocates a knowledge element if the vector is not within the existing influence field of a knowledge element in the knowledge map and adjusts one or more influence fields as required (1708). If a half learn command (1707), the pattern recognition engine simply adjusts one or more existing influence fields as required (1712).

C.4. Unlearning an Input Vector

In the prior art, it was not possible to delete existing knowledge if it was determined that that knowledge was in error. The only approach was to delete all the knowledge and retrain the knowledge element array again and not include the errant knowledge. This took time and required that the original knowledge be retained for subsequent training operations. The pattern recognition system, according to some implementations of the invention, allows individual knowledge elements to be deleted (cleared and marked as available) if it is determined that the knowledge they represent is in error. In addition, subsequent learning operations will use the knowledge elements previously deleted (if any) before the free knowledge element block at the end of the knowledge element array is used. When a knowledge element is deleted, it also triggers a reapplication of the "not learned knowledge," if any.

Figure 18A:
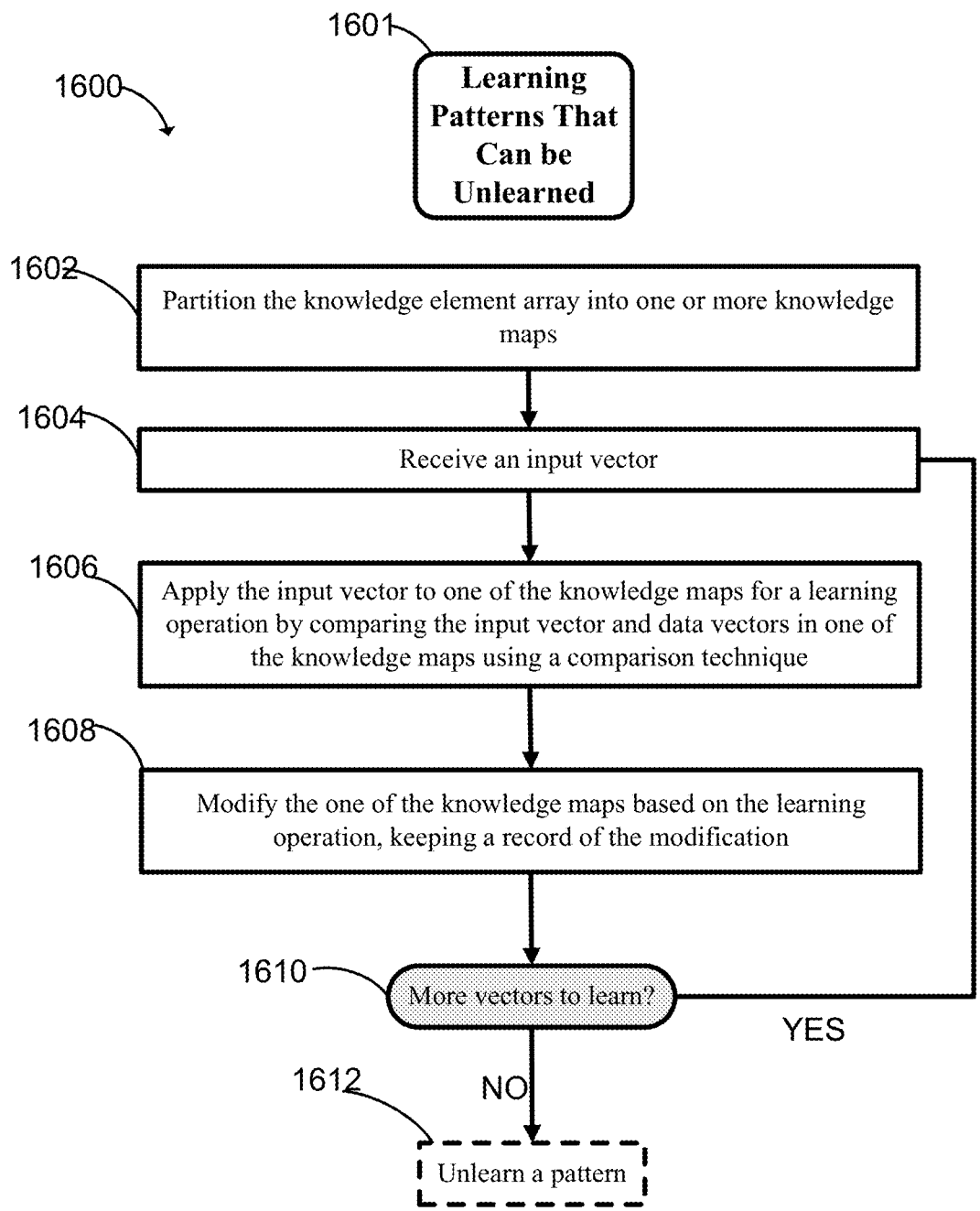
FIG. 18A-B are two flow charts showing a method for learning and unlearning an input vector according to some implementations of the invention.
Figure 18B:
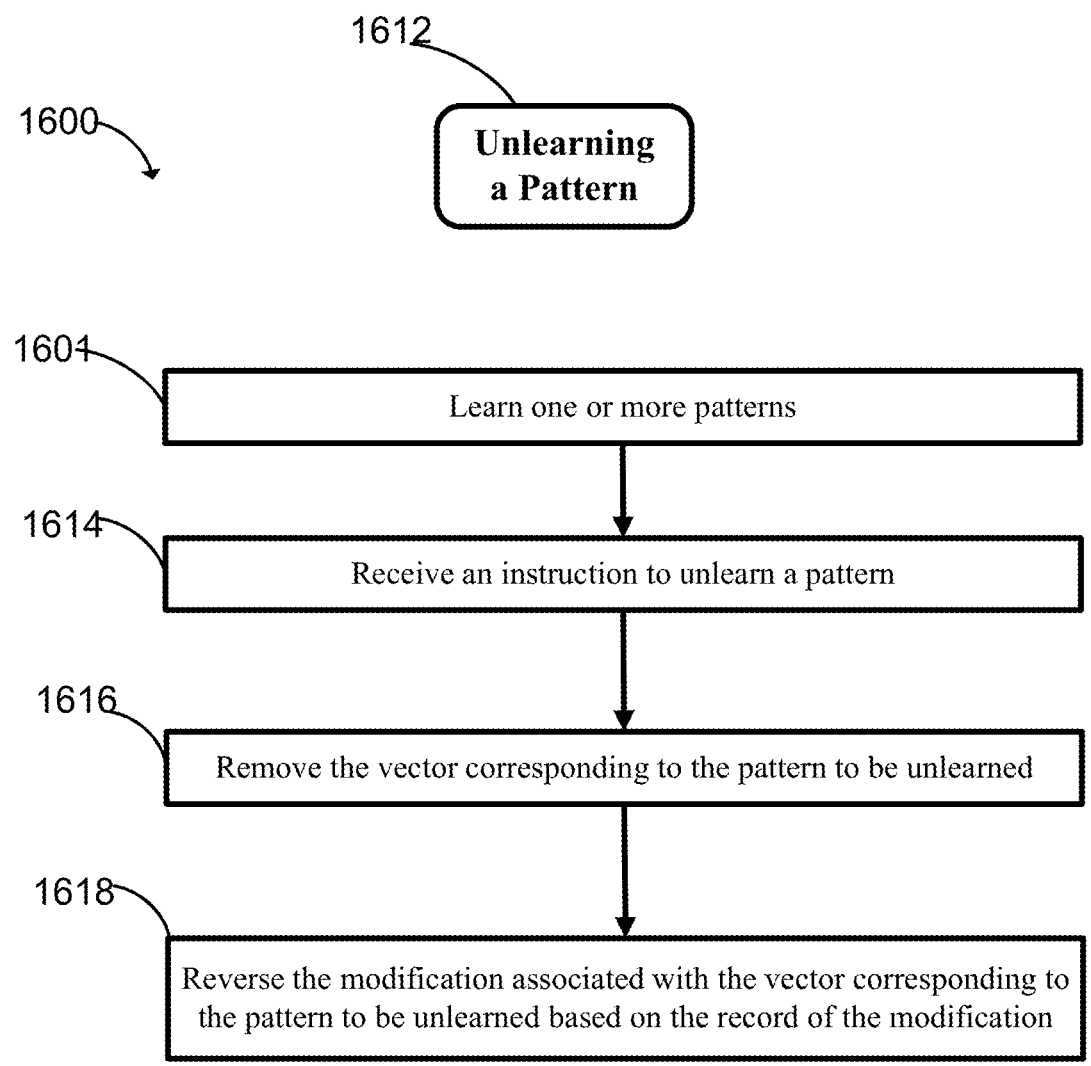

FIGS. 18A and 18B are two flow diagrams showing operations in examples of methods for learning and unlearning an input vector according to some implementations (1800). In such implementations, the unlearning process is carried out by pattern recognition systems as described in this document. Such systems include one or more memories configured to maintain a knowledge element array with a plurality of knowledge elements. In some embodiments, the system first performs a partition-based learning operation as shown in FIG. 18A. In the learning operation, the system partitions the knowledge element array into one or more knowledge maps (1802). Each knowledge map has an associated partition identifier and includes one or more of the knowledge elements, each knowledge element including one or more operands collectively defining a data vector and a category identifier. The system receives an input vector (1804), and applies the input vector to one of the knowledge maps for a learning operation by comparing the input vector and data vectors in the knowledge map using a comparison technique (1806).

In some embodiments, the comparison technique used in the learning operation is based on a partition configuration. The system first receives a particular partition identifier and a partition configuration corresponding to the particular partition identifier. The system then identifies a knowledge map associated with the particular partition identifier as the one of the knowledge maps to be modified in the learning process. The system also identifies a comparison technique defined by a partition configuration as the comparison technique used in the learning process. In some implementations, the comparison technique may have been previously defined at an initial setup stage before any learning or recognition operations occurred. In these implementations, identifying a comparison technique may involve looking up the technique previously defined for a partition configuration.

In some embodiments, the learning operation involves modifying at least one of the knowledge maps based on the learning operation (1608). In some embodiments, the learning operation involves determining whether an input vector falls within an influence field of an existing knowledge element of the knowledge map. If the input vector falls within an influence field of an existing knowledge element, the system initially rejects the input vector. If not, the system enters the input vector into the knowledge map as a knowledge element with associated metadata. The system conditionally adjusts one or more influence fields of other knowledge elements. In some embodiments, the system can further compute the knowledge map by processing one or more of the initially rejected input vectors.

Important for its unlearning capability, the system keeps a record of the modification to the knowledge map (1608). In some embodiments, the learning process can continue for a number of iterations to learn a plurality of knowledge elements (1610). At certain point of the process, either based on preset criteria or use of feedback, the system checks to determine whether any learned input vectors need to be unlearned (1612).

FIG. 18B shows one implementation of how the system unlearns a pattern. After one or more patterns are learned (1801), for example as described above with respect to FIG. 18A, the system can receive an instruction to unlearn a pattern (1814). In some embodiments, the instruction may be based on user input specifying the identity of the pattern to be unlearned. In other embodiments, the instruction may be automatically triggered by specific scenarios detected by the system. For instance, if the system detects that the removal of the previously learned example of a pattern can improve the efficiency of the pattern definition, the system may automatically issue an instruction to unlearn the previously learned example. In some embodiments, the system also reverses the modification for at least one unlearned vector based on the record of the modification occurred during the learning phase (1818), thereby unlearning the specific vector that is supposed to be unlearned, while keeping the effect and influence of other vectors that have been learned and are retained.

In some embodiments, the unlearning process involves removing from the knowledge map the knowledge element corresponding to the unlearned vector (1816), and conditionally reversing the adjustment of the one or more influence fields associated with the unlearned vector (1818).

C.5. Unsupervised Learning

In addition to learning patterns based on user provided input, the partition-based pattern recognition systems and methods described herein may be implemented with capabilities of unsupervised learning. In some embodiments, the unsupervised learning is based on statistical irregularities of the input vectors. Specifically, the unsupervised learning utilizes density estimation or clustering (e.g., k-means, mixture models, hierarchical clustering). Additionally, unsupervised learning can also use techniques that seek to summarize and explain key features of the input data. For instance, blind signal separation using feature extraction techniques for dimensionality reduction may be used, e.g., principal component analysis, independent component analysis, non-negative matrix factorization and singular value decomposition. Furthermore, suitable for applications with ANN, self-organizing map (SOM) and adaptive resonance theory (ART) are commonly used unsupervised learning algorithms. The SOM is a topographic organization in which nearby locations in the map represent inputs with similar properties. The ART model allows the number of clusters to vary with problem size and lets the user control the degree of similarity between members of the same clusters by means of a user-defined constant called the vigilance parameter.

In one embodiment using statistical irregularities for unsupervised learning, the pattern recognition system is configured to process an input vector for a learning operation that enters the input vector into the knowledge element array, which can contain a plurality of knowledge elements. The pattern recognition system matches the input vector to at least one of the knowledge elements of the knowledge element array when the input vector lies in the influence field of the at least one of the knowledge elements. The system maintains a count for each knowledge element. The count represents the number of data vectors, including the input vector previously matched or currently matched to that knowledge element. The counts of the knowledge elements collectively represent statistical irregularities of patterns represented by the data vectors. The statistical irregularities provide statistics such as density or clustering measure. The pattern recognition system automatically, or in an unsupervised manner, learns the statistics and organizes the learned information, which provides the knowledge for recognition operations in systems and methods described elsewhere in this document.

C.6. Dynamic Learning

In some embodiments, the system and methods for pattern recognition can continuously and dynamically learn new information in either a supervised or an unsupervised manner. A pattern recognition system according to these embodiments includes one or more memories configured to maintain a knowledge element array including a plurality of common knowledge elements. Each common knowledge element includes one or more operands collectively defining a data vector representing a pattern common in a population. Each common knowledge element has an influence field.

In some embodiments, dynamic learning occurs after data representative of a population have been entered into a knowledge base and when new data specific to a member of the population is provided. The dynamic learning process updates the knowledge element array taking into consideration both the data common to the population and data specific to the member of the population. In various embodiments, the population can be a group of humans, animals, tissues, cells, machines, devices, and other entities that provide data having patterns of interest. Members of the population can be individual humans, animals, cells, machines, etc.

In an illustrative and specific example of dynamic learning, a pattern recognition system has a common knowledgebase of normal heartbeats applicable to all persons in a population. The common knowledgebase may be provided by a group of experts. Then the system adds knowledge from an individual person to create an aggregate knowledgebase. The system having said knowledgebase starts alarming about an irregular heartbeat for Suzy. A user of the system (e.g. a doctor or Suzy herself) can specify that Suzy's heartbeat is normal for Suzy, so the system adds the input vector representing Suzy's heartbeat into the aggregate knowledgebase for Suzy. In the unsupervised case, the system automatically adds Suzy's normal heartbeat data into the common knowledgebase to create an aggregate normal knowledgebase for Suzy.

In some embodiments, an unsupervised dynamic learning system processes an individual input vector representing a pattern specific to a single member of the population. If the individual input vector represents statistical irregularities such as those discussed above, the system enters the data of an individual input vector into the knowledge element array as a knowledge element. In some embodiments, the system also conditionally adjust one or more influence fields of other knowledge elements if the individual input vector is not in any influence fields of the other knowledge elements and the individual input vector is to be learned. The learned information then provides knowledge for partition-based pattern recognition operations as described herein.

In other embodiments, a supervised, dynamic learning system processes an individual input vector representing a pattern specific to a single member of the population. Upon receiving information indicating that the individual input vector does not represent the pattern common in a population and the input vector is to be learned, the system enters the data of an individual input vector into the knowledge element array as a knowledge element. In some embodiments, the system conditionally adjusts one or more influence fields of other knowledge elements in the same manner as in the supervised learning system.

C.7. Pattern Definition Protection

In some embodiments involving supervised learning, pattern recognition systems receive user input to direct learning of patterns. In some embodiments described herein, a user may select multiple occurrences of a pattern of interest in training data for the pattern recognition system to learn as exemplars of the pattern. In some embodiments, the user may also specify patterns as incorrectly recognized counter-exemplars that should be excluded from the definition of the pattern of interest. In some embodiments, the exclusion of a counter-exemplar is implemented by the "half-learning" mechanism described above that adjusts the influence field of a knowledge element. As new and different exemplars and counter-exemplars of the pattern are learned, the definition of the pattern of interest is dynamically refined to encompass the proper scope of the pattern of interest. However, if the user provides erroneous data as an exemplar, the definition of the pattern of interest may be weakened such that it does not reflect the true scope of the pattern of interest. Some embodiments provide protection against this problem by issuing a notice about learning a new input vector if the new input vector deviates significantly from the influence field(s) of the knowledge element(s) of the pattern of interest. In some embodiments, the threshold for issuing the notice depends on a predetermined value of influence distance. In some embodiments, the threshold for warning may be dynamically updated based on statistical irregularity of learned patterns. For instance, a statistical outlier in influence distance amongst previously learned patterns (e.g., 3 standard deviations from the mean) may cause the system to issue a warning to the user. Then the user may provide instructions as to whether or not to learn the input vector.

Moreover, pattern definition may be weakened due to variations across different channels of a multi-channel system such as a multi-electrode array. When processing data originating from different sources, such as in the case of multi-electrode array data, random or systematic variation in some of the sources can cause difficulty in learning or recognizing patterns. For instance, a problematic electrode in a multielectrode array may introduce systematically or periodically inflated amplitude in the waveform data in a first channel. If an inflated amplitude coincides with a noise bump that does not reflect a real signal of interest, the system may mistakenly learn the noise bump as a pattern of interest either under supervised learning (e.g., with user input directing erroneous learning of the amplified noise bump) or unsupervised learning (e.g., by detection of signal irregularity). The resulting pattern definition is weakened, such that when it is also applied to a second channel without the inflated amplitude, the system may not properly learn and/or recognize the correct pattern of interest in either channel.

Figure 19:
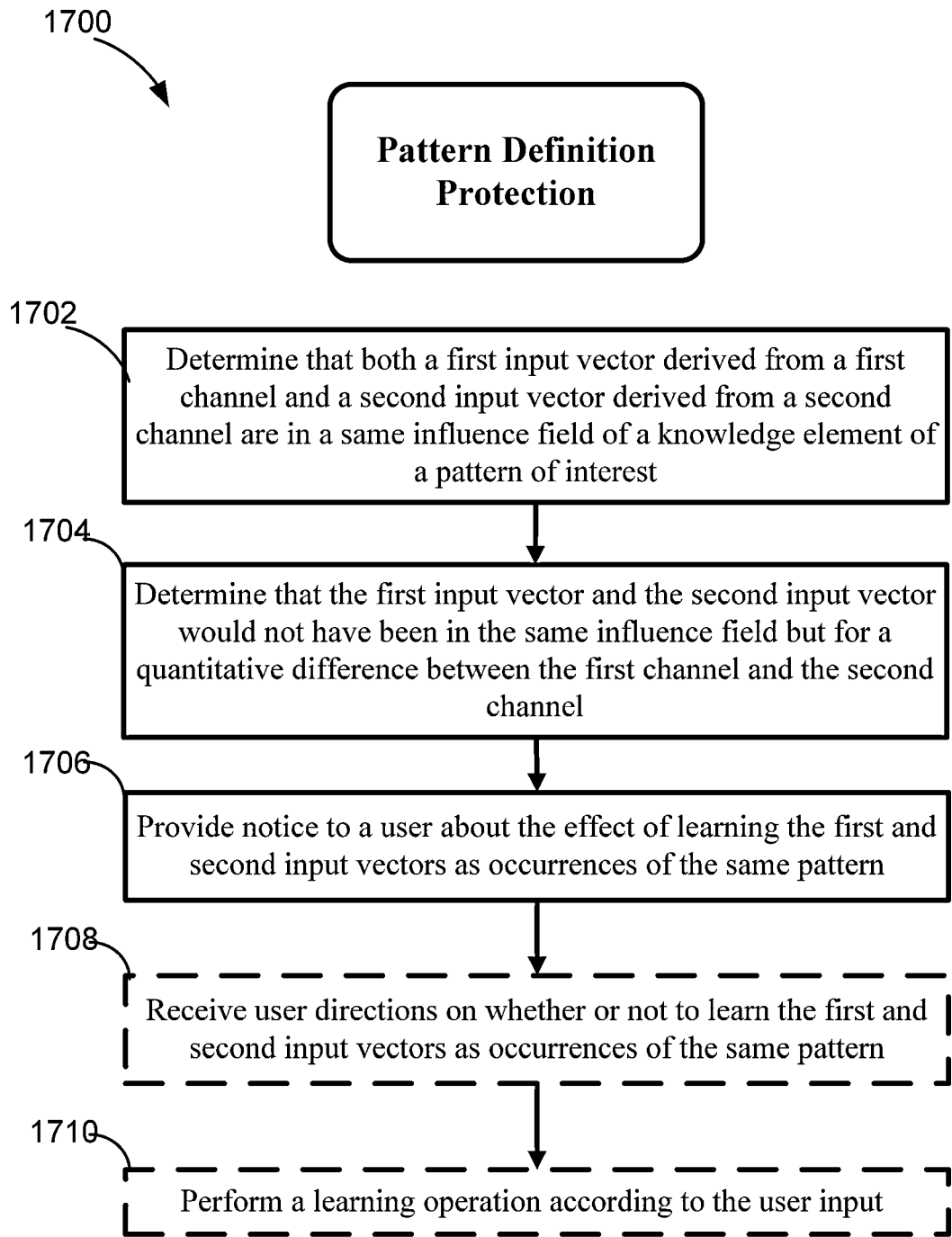
FIG. 19 is a flow chart showing a method for protecting a pattern definition according to some implementations of the invention.

FIG. 19 is a flow chart showing a method for protecting a pattern definition according to some embodiments, which provides a mechanism to prevent erroneously recognizing an input vector as an occurrence of the pattern of interest due to errors or irregularity in a channel (1900). The method is applicable in a learning process of multichannel data. The method is implemented on a pattern recognition system such as those described elsewhere herein. The method involves determining that a first input vector and a second input vector are within the same influence field of a knowledge element of a pattern of interest (1902). Here the first input vector is derived from data of a first channel of a multi-channel system, and the second input vector is derived from data of a second channel of a multichannel system. The pattern recognition system is informed or determines that the data of the two channels have a quantitative difference. In the example above in which a noise bump in a first channel is mistakenly learned as a pattern of interest, the system may, for instance, either automatically detect or be given user input that the amplitude of the problematic channel fluctuates periodically. The method further involves determining that the first and second input vectors would not have been in the same influence field of the pattern of interest, but for the problematic fluctuation (1904). The method also provides the user with a notice based on the determination (1906). For instance, in some embodiments, the pattern recognition implementing the method issues a notice to the user that the quantitative difference (e.g., a fluctuating amplitude) causes the two input vectors to fall in the same influence field of a knowledge elements. In some embodiments, the system can issue a warning that learning the two input vectors as the same pattern would weaken the pattern definition.

In some embodiments, the pattern recognition system implementing the methods of 1900 receives user input directing whether or not to learn the first input vector and the second input vector as occurrences of the same pattern (1908). Then the system performs a learning operation according to the user input (1910).

C.8. Other Enhancements

In the pattern recognition system, the specific identifier, e.g. number, of the matched knowledge element (e.g., array index) is returned for all matched knowledge elements. Thus if an application keeps track of which knowledge element identifiers are allocated when training the knowledge element array, these identifiers can be used when matches occur to reference back to the source of the initial training knowledge, possibly in conjunction with the opaque user data, as described above. The ability to determine the precise knowledge elements which caused a match can be quite useful to a variety of applications. For example, the knowledge elements that did not cause a match may possibly be excluded when developing a knowledge map for the same application in order to save memory space and processing power.

Still further, the pattern recognition system may also maintain user and system counters for each knowledge element. A system counter is incremented each time a knowledge element is matched to an input vector. A user counter is incremented each time a knowledge element is matched to an input vector and when one or more user-defined rules are satisfied. In this manner, the significance of the trained knowledge elements can be assessed. For example, when developing a pattern recognition system for a specific application, such as machine vision in an auto assembly line, the system may be initially trained with 250,000 knowledge elements. Use of the system in a testing environment and analysis of the system and user counters may reveal, for example, that only 100,000 knowledge elements were ever matched and that many of the matched knowledge elements had an insignificant number of matches. An engineer may use this knowledge when implementing the field version of the pattern recognition system to exclude large numbers of knowledge elements, thereby reducing resources (processing and memory) for the given machine vision application.

In addition, the pattern recognition system can also support configurable weighting values that can be selectively applied to knowledge elements of one or more categories to bias selection of for or against that category as to one or more input vectors. For example, the weighting factor can be used to increase the influence fields of RBF knowledge elements or to adjust the resulting aggregate distance computed between an input vector and a knowledge element vector. Again, this may be another configuration parameter for a partition.

In one implementation, the pattern recognition system supports a mode where a knowledge map is held static. For example, in a first dynamic mode, a given knowledge map can be augmented and changed as it is trained with new knowledge. The pattern recognition system also supports a static mode that disables further learning as to a select knowledge map. The fixed size (or further learning disabled mode) can be used to disallow knowledge updates which could cause non deterministic results when two similarly configured machines are modified independent of one another. In one implementation, the commands to enter and exit this mode may require an administrative password to allow for periodic updates, while protecting the knowledge map from updates by unauthorized personnel or applications.

As noted above, the pattern recognition system is implementation-agnostic and can be implemented using software in a general-purpose computing platform. Moreover, as noted above, the pattern recognition system is also amenable to implementation in firmware, hardware (FPGA or ASIC), combinations thereof, etc.

D. Pattern Recognition of Biological Data

D.1. General Biological Data

The pattern recognition systems are generally applicable to a vast number of patterns that exist in the physical world and in various types of data. One important type of patterns is waveform patterns. The pattern recognition systems and methods described herein find applications in biological related or derived data. In various embodiments, for instance, the disclosed systems and methods can measure the following characteristics of biological signals: cardiac QT interval, RR interval, RT interval, field potential, depolarization, repolarization, T wave peak amplitude, R wave peak amplitude, and total spike amplitude, etc. Of course, the pattern recognition systems and methods can also process data in non-biological fields. For instance, the pattern recognition systems can recognize patterns in data of one or more of the following types: financial, marketing, machine control, industrial control system (e.g., supervisory control and data acquisition), software system (logged data such as transactions, operating system, network packets, web server traffic, social media traffic), economic, epidemiological, audio, sonographic, electro-magnetic, radiographic (e.g., X-ray images), radiological (e.g., high-energy particle flux such as alpha, beta, gamma, and cosmic ray), chromatographic agricultural, astronomic, atmospheric, oceanographic, geologic, geophysical data, etc.

In various embodiments, the system can simultaneously process input vectors corresponding to different data types. In some embodiments, the different data types are derived from a plurality of different sensor types. In some embodiments, the plurality of different data types can include any of image data, video data, audio data, waveform data, chemical data, text data, temperature data, or biological data. In certain embodiments, the pattern recognition system process input vectors corresponding to biological data including electrocardiogram (ECG), electroencephalogram (EEG), multielectrode array, and electromyogram (EMG) data, etc. As a few examples of applications in diverse fields, in some embodiments, the pattern recognition systems can process one or more types of the following data: mechanomyogram (MMG); muscle tonus; muscle spasimus; electrooculograph (EOG); pressure and volume change (plethysmography), galvanic skin response; magnetoencephalogram (MEG); gas exchange (in- and ex-halation or decay of methane, $CO_2$, $O_2$, etc.); gas concentration, e.g., $PO_2$, nutrient absorption; salt, ion, and chemical concentrations inside/outside cells; chemical exchange in media/reagents, e.g., glucose uptake or ethanol output in yeast; temperature; blood pressure; hydraulic pressure (cell tension) and water concentration; cell adhesion; continuous-flow cytometry; fluorescent signals, e.g., fluorescent PCR; optogenetic signals, radionucleotide marker uptake/decay; radiographic (X-ray) and magnetic resonance imaging (MRI); functional magnetic resonance imaging (fMRI); etc. In some embodiments, the pattern recognition systems and methods can process signals based on sensing diffusion in media (solid, liquid, gas, and plasma) and across osmotic membranes.

In many examples provided herein, the patterns have time as one dimension, such as in the ECG amplitude vs. time waveform data. However, applications are not limited to such examples. Patterns represented in various dimensions may be learned and recognized. For instance, the X axis may be the number of cycles of PCR, and the Y axis may be the quantity of nucleic acid in some application. Furthermore, the dimensions need not be on a ratio scale. Patterns represented by ordinal-scaled dimensions can be learned and recognized as well.

D.2. Waveform Data

Pattern Recognition of Waveform Data

In some embodiments, the pattern recognition systems and methods disclosed herein recognize and provide metrology (measurements) of waveform data such as EEG, ECG, and other biological or non-biological waveform data. In some embodiments, the pattern recognition system employs a region of search in searching data for pattern recognition. In other embodiments, the pattern recognition system employs one or more markers in searching data for pattern recognition. In certain embodiments, the systems use a combination of region of search and markers for efficient and effective recognition of a pattern. Relevant concepts involved in the methods and systems and the relations among them are further explained below. Waveform is a signal displaying a wave-like shape and form. In some embodiments, patterns of waveform may be presented as the shape of signal amplitudes on the Y axis and time on the X axis. In other embodiments, patterns of waveform may be represented as amplitude on the Y axis and frequency components on the X axis. In some embodiments, patterns of waveform may be represented as synchrony for one axis and location of another axis. Various other characteristics of waveform may be used to generate patterns of waveform. Although most of the examples of patterns given herein are two-dimensional, patterns processed by the systems and methods described herein may be represented in a three-or-more dimensional space.

Markers

As described above, a "marker" relates to one or more locations in a waveform, where each location is an occurrence of the marker, has a set of defined waveform characteristics, and is operable as a reference for an occurrence of a pattern of interest. In some embodiments, a marker corresponds to a single point on a dimension of a waveform. For instance, the marker can correspond to a point on the X-axis for a waveform plotted with time on the X-axis and signal amplitude on the Y-axis. This type of marker is used in many examples of pattern recognition of waveforms in this document. However, a marker may also be based on one or more attributes of a waveform, e.g., an amplitude threshold, a gradient, and a pattern of the waveform.

In some embodiments, a defined or detected pattern in a waveform can be used as a marker. In these embodiments, the marker relates to a range of data instead of a single point of data. Depending on the needs of particular applications, an arbitrary point in the range of data can be used as a reference to search for an occurrence of a pattern of interest. For example, a user-selected or automatically-detected P-wave pattern in an ECG waveform may serve as a marker for detection of a QRS complex. An arbitrary point in the P-wave pattern, e.g. a leading edge, a peak, or the trailing edge, can provide a reference point to define a range of data in which the system searches for an occurrence of the QRS complex.

In some embodiments involving data derived from a multi-channel system, a defined or detected pattern in a waveform of one channel can be used as a marker for waveform of another channel. Various other detected patterns may be used as markers to provide reference to search for a pattern of interest to be detected.

A "marker definition" provides information about a marker. A marker relates to one or more locations in a waveform, wherein each location is an occurrence of the marker, has a set of defined waveform characteristics, and is operable as a reference for an occurrence of a pattern of interest. In some embodiments, a marker definition is associated with information about one or more of the following: marker type, e.g. level-crossing or gradient marker; direction of signal change; threshold value of level or gradient; hysteresis establishing a value that a signal must reach for a second marker validation to be detected following a first detected marker; run for gradient; suppression value establishing a time delay before a second marker can be detected following a first detected marker; channel wherein a marker is applied, etc.

In some embodiments, multiple occurrences of the same marker definition can be found on a waveform. In some embodiments, occurrences of a marker are timestamps or locations along a waveform that can be used as references for the placement or detection of patterns. They can also be included as time locations for measurements.

In some embodiments, markers are waveform characteristics (e.g. a slope or an amplitude of signal) having temporal locations along a waveform that can be used as references for the placement of patterns. Markers can also be included as time locations for measurements. In some embodiments, occurrences of markers are determined by a marker detector tool, which returns a time location into an analysis results database for amplitude based waveform data. There are cases for both single and dual markers. In some embodiments, three or more markers may be implemented. In other embodiments, markers can be provided with reference to signal frequency instead of amplitude.

In some embodiments, a pattern recognition system for waveforms creates markers having or associated with one or more of the following properties as listed in Table 1.

TABLE 1

Example Properties Associated with a Marker

| Marker Properties | Description |
| --- | --- |
| Name | A user-defined name applied to the marker. |
| Type | Determines if the marker will be detected by a level-crossing, or will trigger on the gradient (slope) of the signal. |
| Direction | Determines if the marker detector activates on an increasing or decreasing signal. |
| Threshold | Sets the value for which either the level-based or gradient-based marker must meet and/or exceed. |
| Hysteresis | Used to prevent false marker detection. Establishes a value the signal must reach to allow re-arming of the detector. |
| Run | (Used by gradient markers) The value is the time elapsed over which the Run occurs. (Gradient is typically calculated by Rise/Run => Threshold/Run) |
| Suppression | Used to prevent false marker detection. After a marker has been detected, a suppression value establishes a time delay before the detector can re-arm and fire again. |
| Channels | A list of channels where the marker detector will be applied. |
| Label | A short label for a name that may be too long to display on a plot |

In some embodiments involving waveform shapes based on time and amplitude, a marker may be defined by level crossing (level marker) or gradient crossing (gradient marker). Level markers use a simple threshold level crossing method to establish location of an occurrence of a marker. These are well suited for low noise signals where the target event is much larger than the baseline data signal. Gradient markers analyze the slope of the signal. In many cases, the marker can key on a rapidly changing signal even though there may be noise in the signal. Gradient markers are typically more effective if the targeted reference location and the data to be analyzed have similar amplitudes, or if the baseline of the signal drifts over time.

In some embodiments, for level markers, the user identifies a valid threshold value that a marker likely meets, but that will not exceed the peak of data. For gradient markers, the user identifies a valid threshold value that represents the slope of the signal at the targeted detection time. Usually a gradient is selected for a repeatable waveform characteristic. Both a positive and negative gradient can be calculated. The values from both time and amplitude can be used. A threshold can be thought of as a rise in the signal, with slope calculated as rise divided by run, for example the time elapsed.

In some embodiments, the markers have the waveform characteristics of increasing gradients (getting steeper) or decreasing gradients (getting flatter). In some embodiments, the marker definition regarding sign (+/−) of the threshold determines whether the slope is positive or negative. Moreover, the markers may also be defined as maximum value for a gradient (point where a fluctuating gradient value is at its largest (for positive slopes) or smallest (for negative slopes) value. In some embodiments, markers are set at fixed intervals along the waveform, e.g., at specific time intervals such as every 2 seconds, at location intervals such as every 400 samples, or at specific points such as the start, middle, or end of the signal data.

Another property of a marker definition is suppression. After an occurrence of a marker is detected, the suppression value establishes the time period required before the detector will "rearm," i.e., before the system will detect another occurrence of the marker. If the period between two occurrences of a marker is normally 1 second, setting the Suppression to 0.75 seconds will prevent any marker occurrences from being detected during that "suppressed" period. Suppression can be very useful with noisy data. Suppression works with either level or gradient markers. Note that markers detected with suppression enabled are dependent on the location of the analysis window. If the system detects an occurrence of a marker that is not the actually intended waveform characteristic, the intended waveform characteristic immediately following the detected occurrence may be missed. In some embodiments, the system provides an adjustable analysis window, such that the user can position the portion of the waveform having the intended waveform characteristics near the starting position of the analysis window.

In some embodiments, the marker definition can be associated with a hysteresis threshold, which is a signal difference from the detection threshold of a first occurrence of a marker, in the direction towards the baseline below the detection threshold, which must be exceeded before a second occurrence of the marker immediately following the first can be detected. Just as suppression is used as a tool on the Time (X) axis, hysteresis is a control that can be used for suppression on the amplitude (Y) axis for a waveform. Hysteresis control is useful when a signal has a high component of ripple where an additional Marker could be detected before the signal falls to its baseline.

In some embodiments, in situations when both X axis suppression and Y axis hysteresis are applicable to waveform data during marker detection or feature extraction, the system allows users to specify whether and/or how suppression or hysteresis takes precedence. For instance, a marker definition includes both a 10 second suppression period (condition 1) and a 3 microvolt hysteresis (condition 2). The user can specify one of the following: one of suppression or hysteresis takes effect before the other, either alone would be sufficient to prevent identification of a marker, or both conditions need to be met to prevent identification of a marker.

In some embodiments, the system provides a graphical user interface (GUI) to receive user input for creation of markers. The system can present the user with a training waveform through the GUI, through which the user can select a point or a region of the waveform that represents a marker. The system then generates a marker definition including the training waveform information selected by the user. In some embodiments, the system further allows use of fillable forms for a user to input waveform characteristics or other properties associated with the marker. In some implementations, the system can automatically identify multiple occurrences of the marker in a waveform.

Pattern Definition

As described above, according to the implementations herein, a "pattern" is a discernible regularity of measurements or observations, which can be represented by a vector defining a point in a multidimensional space when the vector components are interpreted as point coordinates. A waveform may include one or more occurrences of a pattern, i.e., one or more appearances of specific patterns.

Also as described above, a "pattern definition" described herein includes one or more waveform characteristics representing a pattern of interest. A pattern definition may optionally be associated with other information regarding the pattern of interest, e.g., markers and regions of search for the pattern. In various embodiments, the pattern recognition systems can receive or derive these waveform characteristics from data provided by users. The waveform characteristics are of particular quantitative, qualitative, or categorical values. The pattern recognition system can derive a knowledge vector that represents the pattern having the waveform characteristics. The knowledge vector defines a point in a multidimensional space and represents the pattern of interest having the defined waveform characteristics. The knowledge vector can be used to create a knowledge element in a knowledge map.

In some embodiments, one or more waveform characteristics of a pattern definition can be directly provided by a user. In some embodiments, the system automatically derives one or more waveform characteristics of a pattern definition by receiving a segment of data that the user identifies as having the pattern of interest and extracting one or more waveform characteristics from the received segment of data. In some embodiments, the segment of data having the pattern of interest is identified by the user using a graphical interface, through which the user selects a segment of data displaying the pattern of interest. Various feature extraction techniques may be used to extract the waveform characteristics from the segment of data.

In some embodiments, a pattern recognition system generates one or more knowledge elements with reference to the pattern definition for inclusion in a knowledge element array. Each knowledge element includes i) one or more operands collectively defining a data vector representing the pattern of interest, and ii) a category identifier.

In some embodiments, a pattern definition is associated with a region of search (ROS). Each occurrence of the ROS provides a range of data in which the pattern recognition system searches for an occurrence of the pattern of interest. In some embodiments, the pattern definition is associated with other information that is useful for detection of the pattern of interest, e.g., markers and nominal position. In some applications, a ROS is not required. In such implementations, the learning and detection of patterns are performed sample by sample, or once every number of samples, throughout the range of data provided. In various embodiments, pattern extraction tools can be employed to create pattern definitions and/or data vectors (e.g., learning and testing vectors) representing the patterns. Pattern detectors can be software implemented tools that can be applied to any waveform to detect and identify simple or complex signal features (i.e. all occurrences of patterns of interest). The features contained in these waveforms are broken down into simple elements by tools called Feature Extraction Techniques (FETs), for example Haar wavelet, Fourier transform, polynomial interpolant, integral functions, rational polynomial approximation, etc. FETs are settable to process in various domains (e.g. the time or frequency domains). In some embodiments, FETs can be used to derive characteristics for creating pattern definitions. In some embodiments, FETs can also be used to create knowledge vectors for knowledge elements during learning. In some embodiments, FETs can further be used create test vectors during recognition. Patterns can raster, or free-run, the entire waveform, or they can be linked back to markers to only be recognized at particular locations in the signal. In some embodiments, The FETs are chosen in order to preserve and reflect a specific property of the signal in question. In some implementations, the "shape" of the signal is important to users working to identify particular events such as a heartbeat pattern recognizable by human experts visually when looking at an EKG. In some implementations involving heartbeat, the FET used is a Haar Wavelet that retains the relative sample point relationships thus preserving a localized "shape." The FET transformation is performed over the incoming sample data set of a count equal to the pattern width (in seconds when using "time" as the reference axis) at the given sample frequency. The FET transformation outputs a vector of fixed size such that two such output vectors can be "compared" using differencing methods point by point.

After a pattern definition is created, the pattern recognition systems can detect occurrences of the pattern in test data using methods described herein. The test data includes test vectors that represent potential occurrences of the pattern of interest. After one or more patterns are detected, the systems apply metrology (measurement) tools to determine signal characteristics such as local maximum, local minimum, slope, pattern statistics, polynomial fit maximum tangent intercept with baseline, inflection points, points of maximum curvature, duration intervals at various relative amplitudes, etc. In many applications, measurements based on the recognized patterns are of interest to users, instead of or in addition to the patterns per se. In some embodiments, the metrology data are provided to users through a reporting layer or module of the system.

It is worth differentiating among the following concepts: a) waveform characteristics of a pattern definition for a pattern of interest, b) metrology of the pattern, and c) the operands of a data vector (e.g., a training vector, a knowledge vector, or a test vector) representing the pattern. Waveform characteristics of a pattern definition are attributes that define a pattern. The metrology of the pattern includes measures taken from the pattern after the pattern is determined. The operands of a data vector are values that collectively form a data vector representing a pattern of interest. In some embodiments, the data vector is created after the pattern is defined. In some cases, two or more data vectors may represent patterns defined by a single pattern definition. The operands of a data vector of the pattern need not directly correspond to the waveform characteristics of the pattern. For instance, a pattern definition of a pattern may have five waveform characteristics. In contrast, a data vector representing the pattern may include more or fewer than five operands depending on the complexity or redundancy of the waveform characteristics.

In other words, there are different levels of abstraction of a pattern, namely, the pattern as it physically exists in a waveform, the user's view of the pattern in the interface (i.e., what the user select in a box), and the system's view of the pattern (e.g., a feature vector derived from the user's selection, which is also a point in n-dimensional space represented by the extracted features). Pattern definition is the process of the user drawing the box around the pattern and possibly defining markers and regions of search. When the user tells the system to learn it, the FETs generate a knowledge vector that is included in the knowledge map. During the pattern definition, the user can also specify the measurements to be made when the pattern is detected. These measurements are stored in the results database which can be mined for reporting.

In one particular implementation, a pattern definition has or is associated with the following properties listed in table 2.

TABLE 2

Examples of Properties Associated with a Pattern Definition

| Pattern Properties | Description |
| --- | --- |
| Name | A user-defined name of a pattern of interest. |
| Type | The method of feature extraction a pattern detector will use. |
| Description | This is a generic field for the user to describe, annotate, or remark on the pattern detector setup. |
| Left/Right Marker | A pattern detector can be referenced to markers for efficient, precise analysis. Markers are particularly helpful when analyzing and measuring periodic life science biosignals such as ECGs/EKGs. Single left, single right, and dual left-and-right marker references may be used. Pattern detection may also use no markers. |
| Channels | A list of signal channels where the pattern detector will be applied. |
| Nominal Position | A defined characteristic of a waveform relative to one or more defined markers. |
| Region of Search | The X axis (e.g., time) section where the pattern detector searches and recognizes potential patterns. The region of search (ROS) is a total time and can be centered on the nominal position. Search area can be thought of as nominal position +/− (ROS ÷ 2). There is a special 2-marker case where ROS is a percentage of the pattern detector over the marker spacing. |
| Pattern Width | The X axis (e.g., time) for the pattern detector to occur calculated by right border minus left border. |
| Step Size | The smallest size increment in X axis (time) units, which the ROS uses to search. |
| Tolerance (%) | The pattern match criteria can be made loose or tight. A low tolerance sets matching constraints tight. A high tolerance loosens them. |
| Label | A short label for a name that may be too long to display on a plot |

In some embodiments, the system provides a graphical user interface GUI to receive user input for creation of pattern definitions. In some embodiments, the system presents the user with a training waveform through the GUI, through which the user can select the region of the waveform that represents the pattern of interest. The system then will take the information of the selected region of the training waveform and use that to create the pattern definition. In some embodiments, the system further allows use of fillable forms for a user to input waveform characteristics or other properties associated with the pattern of interest.

Region of Search

Signals are rarely static and have a tendency to move or drift. In many cases, a pattern of interest is detected if the pattern recognition engine search data in a range relative to a reference point. To accommodate this need, some embodiments include a controllable Region-of-Search (ROS). Generally speaking, the ROS is a portion of the signal over which the pattern recognition engine will "search" for a match. In some embodiments, the ROS is always searched for a leading edge of the associated pattern.

As described above, "nominal position" is the position of a defined characteristic of a waveform, e.g., a leading edge of a pattern, relative to one or more defined markers. Typically, a nominal position depends on both its corresponding marker and waveform characteristic. A nominal position is x distance units from a defined marker. In embodiments that involve a single defined marker, x distance units corresponds to the distance between the defined characteristics and the defined marker. In embodiments that involve two defined markers for a pattern, x distance units corresponds to a portion of the distance between the two defined markers. Each occurrence of the nominal position is x distance units from an occurrence of the defined marker. Therefore the occurrence of the nominal position is tied to an occurrence of a marker, but independent from a specific occurrence of the defined characteristic of a waveform, providing a computationally efficient way to determine occurrences of the nominal position. Each occurrence of the nominal position then provides a reference for an occurrence of a region of search (ROS), wherein the ROS is defined relative to the nominal position. In some embodiments, the nominal position is the position of a leading edge of a waveform.

Also as described above, a "region of search" (ROS) is a range of data in which a pattern recognition system searches for an occurrence of a pattern. In various embodiments, a ROS can be based on time, frequency, or location. In some embodiments having a single marker, a ROS can be a region centered on a nominal position. In other embodiments having dual-markers, a ROS can be a portion of the distance between the dual markers. In the case of a ROS defined as part of a pattern using no marker references, the ROS can define a leading edge of the associated pattern to be searched for. If the search is successful, the next ROS search interval begins at the trailing edge of the discovered pattern. Each pattern definition has its own ROS. However, occurrences of different pattern definitions are free to have overlapping portions in the ROSes as they are evaluated independently. In some embodiments involving a waveform having a plurality of occurrences of a defined marker, the waveform also has a plurality of occurrences of a defined nominal position and a defined ROS for a given pattern occurrence.

In some embodiments, involving dual markers that are to left and right of a pattern of interest, the nominal position and ROS will be displayed as a percentage of the distance between the two markers.

Figure 20:
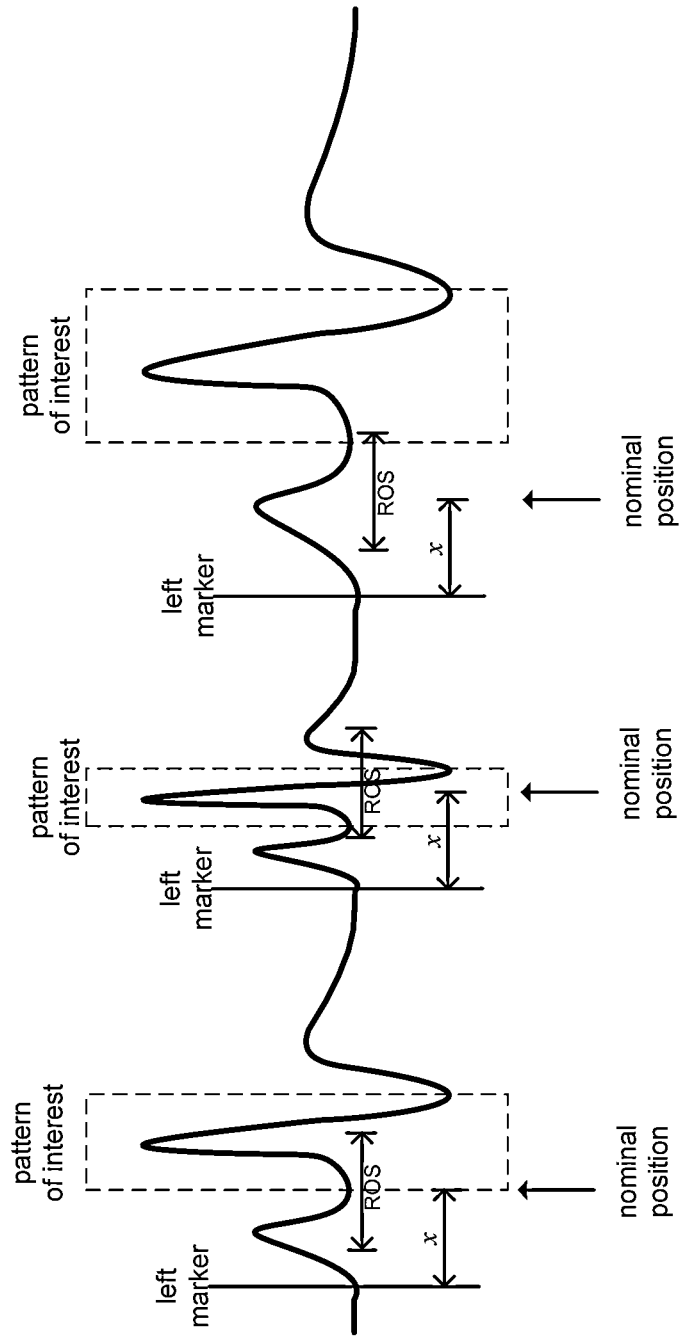
FIG. 20 is a diagram illustrating the relationship between a region of search and a left marker for waveform data analysis according to one possible embodiment of the invention.
Figure 21:
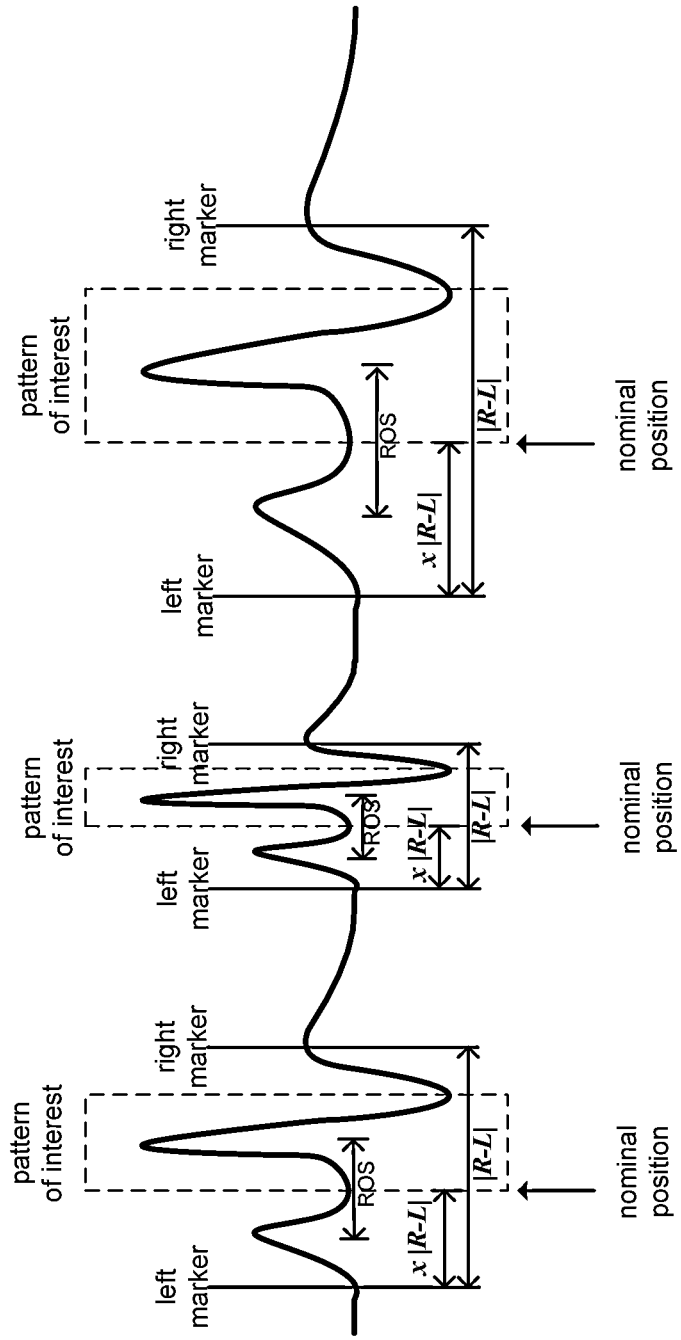
FIG. 21 shows a diagram illustrating the relationship between a region of search and two markers (left and right) for waveform data analysis according to one possible embodiment of the invention.
Figure 22:
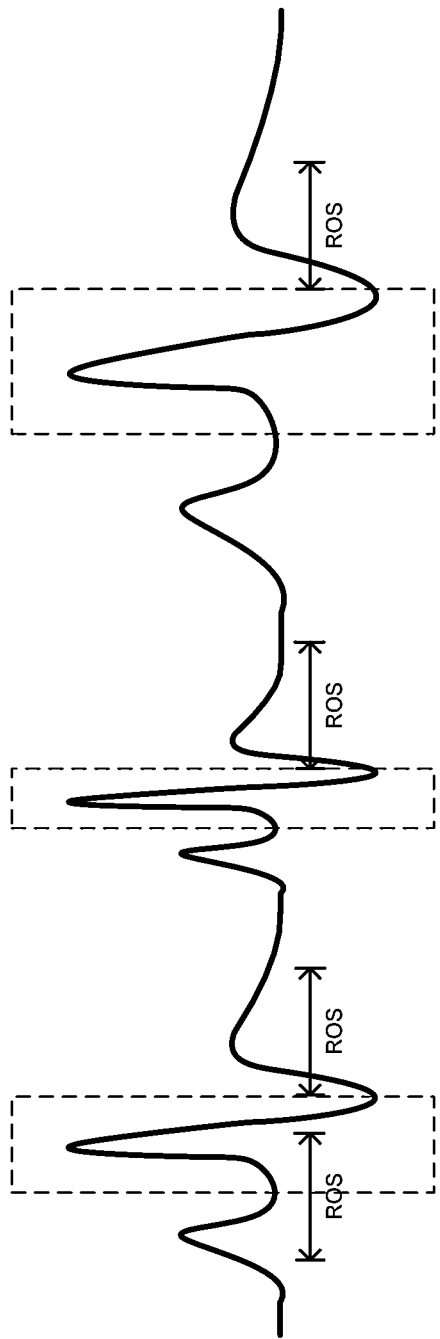
FIG. 22 shows a diagram showing the region of search without reference to a marker in waveform data analysis according to one possible embodiment of the invention.

FIGS. 20-22 are diagrams illustrating the relation among pattern of interest, region of search, nominal position, and markers, if any. In these examples, three occurrences are shown for each of a pattern of interest, a left marker, a nominal position, and a region of search. The leftmost pattern of interest and associated ROS, nominal position, and left marker are illustrated as the items as defined. The right patterns and associated items in the middle and on the right are illustrated as detected occurrences of the pattern and associated items.

FIG. 20 illustrates a region of search associated with a single marker in a particular implementation. The ROS is an interval of an absolute distance defined by a user. Each of the three occurrences of the ROS is centered on an occurrence of the nominal position. The nominal position in this example is the position x distance units from the associated left marker, wherein x is the distance between the defined left marker and the leading edge of the defined pattern of interest (the leftmost of the three patterns and three markers).

As can be seen from the figure, the three ROSs all have the same absolute size, and they are all determined relative to the nominal position. The nominal position depends on the distance between the defined left marker and a defined pattern of interest (on the far left), which is readily determined once the left marker and the pattern definition are defined. Therefore, the ROS provides an efficient means to reduce the data that a recognition engine must search to find the pattern of interest.

As explained above and illustrated in this example, due to the change of one signal sample to another signal sample, the region of search does not need to always contain the full range of the pattern of interest, so long as it includes at least a leading edge of the pattern of interest. For the pattern in the middle in this example, the ROS includes the whole range of the pattern. But for the pattern on the right, the ROS contains only a small segment of the pattern of interest at the leading edge. In some embodiments, a ROS is a context interval in which a single instance of a pattern definition may be identified. Only the pattern's left edge lies within the ROS interval and patterns may be larger or smaller than the associated ROS interval.

For all three patterns in the example in FIG. 20, the leading edge of the pattern of interest falls within the ROS. For the pattern on the left, the leading edge of the pattern of interest is squarely in the center of the ROS. However, for the pattern in the middle, the leading edge of the pattern abuts the left border of the ROS; while for the pattern on the right, the leading edge of the pattern is near the right border of the ROS. If the ROS is defined to be smaller than in this example, the leading edge of the pattern will fall outside the ROS, resulting in missing detection of the pattern of interest. To ensure that the pattern of interest falls within an ROS in this example, a user may need to increase the range of the ROS. However, increasing the size of the ROS leads to larger amount of data to be searched, reducing pattern recognition efficiency.

In some embodiments, the system provides a mechanism that helps to find the pattern of interest without unnecessarily expanding the data range. FIG. 21 shows an implementation using a region of search associated with two markers, a left marker and a right marker. This implementation helps to efficiently utilize a ROS, which has better odds to encompass a pattern of interest without unnecessarily enlarging the range of the ROS.

In this scenario involving a ROS with two markers, the ROS is defined as a region relative to the nominal position similarly to the scenario involving a ROS and only one marker. However, both the nominal position and the ROS are defined as a portion of the distance between the left marker and right marker, |R-L|. Therefore, the ROS changes in a manner corresponding to the change of the waveform data between the left marker and right marker. As a result, the ROS is more likely to encompass the pattern of interest, and it can do so without enlarging the range of the ROS for patterns that tend to span a narrower range of data. In some cases, the ROS can be shrunk but still efficiently includes the pattern of interest or portion thereof.

FIG. 22 illustrates the case where a ROS is defined as part of a pattern using no marker references. In this case, the ROS is searched for the left edge of the associated pattern. If the search is successful, the pattern is recorded on the channel searched and the next ROS search interval begins at the right edge of the discovered pattern.

In some embodiments, a pattern recognition system terminates searching a ROS if the pattern of interest has been encountered in a first occurrence of the ROS, and starts searching for the pattern of interest in a second occurrence of the ROS following the first occurrence of the ROS.

Pattern Recognition Using Markers and Region of Search

Figure 23:
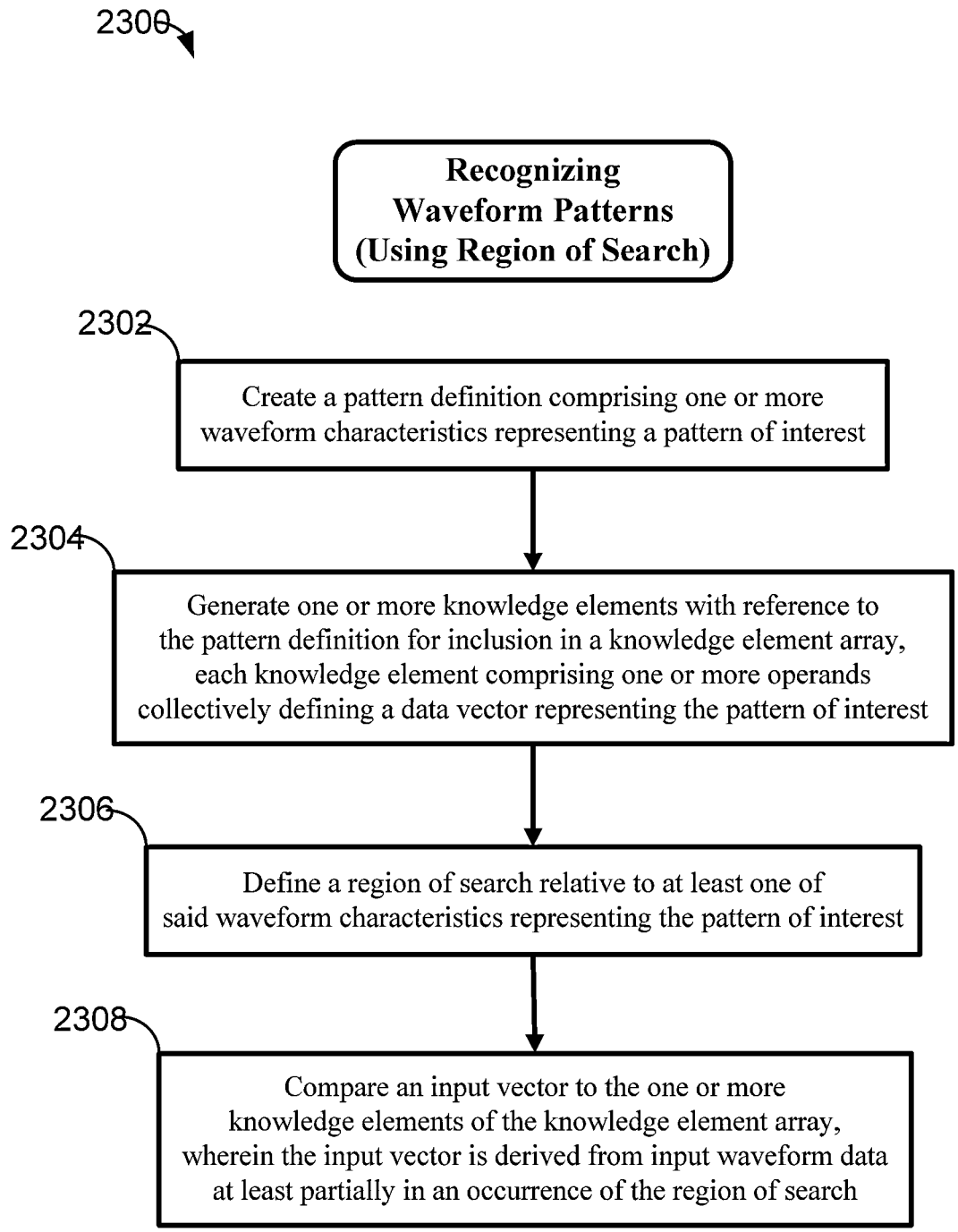
FIG. 23 is a flow chart showing a method for recognizing waveform patterns using a region of search according to some implementations of the invention.

FIG. 23 shows a flow chart illustrating an example embodiment that employs a region of search in the pattern recognition process (2300). In this example, the method involves creating a pattern definition including one or more waveform characteristics representing a pattern of interest (2302). The waveform characteristics may be a leading edge, a trailing edge, amplitude, modulation, spread, etc. In one implementation, the pattern definition is created through a graphical user interface, where a user can select a segment of a waveform from a training waveform showing the pattern of interest. The data of the selected segment provides the basis of the pattern definition. In some implementations, the user can provide additional information through a related GUI to further adjust the information of the pattern definition. For instance, a user can manually enter information about the peak or slope of the pattern of interest.

In the process 2300, the method involves generating one or more knowledge elements with reference to the pattern definition for inclusion in a knowledge element array (2304). Each knowledge element comprises i) one or more operands collectively defining a data vector representing the pattern of interest and ii) a category identifier. The method also defines a region of search relative to at least one of said waveform characteristics representing the pattern of interest (2306). The region of search representing a range of waveform data in which to search for the pattern of interest.

The example process shown in the figure also involves performing a pattern recognition operation on an input vector by comparing the input vector to the one or more knowledge elements of the knowledge element array, wherein the input vector is derived from input waveform data at least partially in an occurrence of the region of search of the input waveform (2308).

In the example process of 2300 shown in FIG. 23, a pattern definition is provided once, training operation is performed once to generate a knowledge element, then a region of search is provided once, and finally a recognition operation is performed once. However, in various implementations in practice, a pattern definition may be used with two or more different ROSs. Similarly, a ROS may be used for two or more different pattern definitions. Moreover, after a pattern is recognized using data in ROS, the system may learn the recognition results. In addition, in some embodiments, the system may also perform a dithered learning operation, such that the system learns additional examples around the training example.

In various embodiments, after a pattern is learned by the system, the learning can be further updated, such as by a half learning process described above. In addition, a learned pattern may be unlearned by the system as described.

Figure 24:
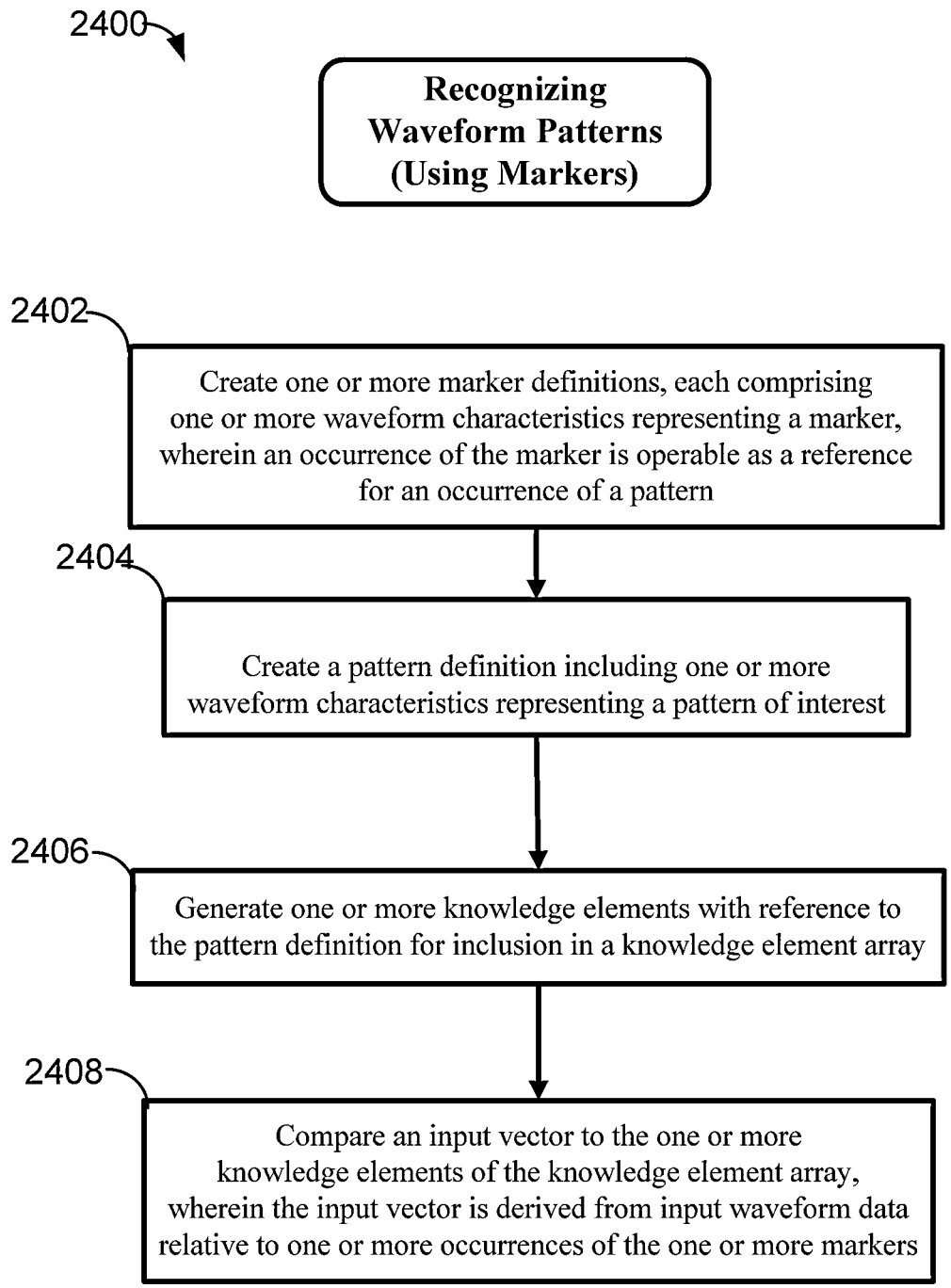
FIG. 24 is a flow chart showing a method for recognizing waveform patterns using one or more markers according to some implementations of the invention.

FIG. 24 shows a flow chart illustrating an example embodiment that uses one or more markers in the pattern recognition process (2400). The process involves creating one or more marker definitions, each including one or more waveform characteristics representing a marker. An occurrence of the marker is operable as the reference for an occurrence of a pattern (2402). A system implementing the process creates a pattern definition comprising one or more waveform characteristics representing a pattern of interest (2404), and generates one or more knowledge elements with reference to the pattern definition (2406), in a manner similar to the method 2300 using region of search described above. With reference to the information from the defined marker, the system compares an input vector to the one or more knowledge elements of the knowledge element array, wherein the input vector is derived from input waveform data relative to one or more occurrences of the markers. Based on the result of the comparison, the system can recognize an input vector as an occurrence of the pattern of interest. In some embodiments, for instance, the system determines the input vector as a match to the pattern of interest if the input vector falls in the influence field of any knowledge element. In some embodiments, the method includes two markers, a left marker and a right marker. In such embodiments, the input vector is derived from data falling between the two markers. In other embodiments, the method includes only one marker. In such embodiments, the input vector is derived from data in a range or having a starting point that is located at a defined distance from the single marker.

In the example process of 2400 shown in FIG. 24, a marker definition is provided once, then a pattern definition is provided once, and finally a recognition operation is performed once. However, in some implementations in practice, a marker can be provided after a pattern definition. Furthermore, a pattern definition may be used with two or more different markers. Similarly, a marker may be used with zero, one, two or more pattern definitions. Moreover, after a pattern is recognized, the recognition result may be learned by the system. After a pattern is learned by the system, the learning can be further updated, and a learned pattern may be unlearned by the system.

Figure 25:
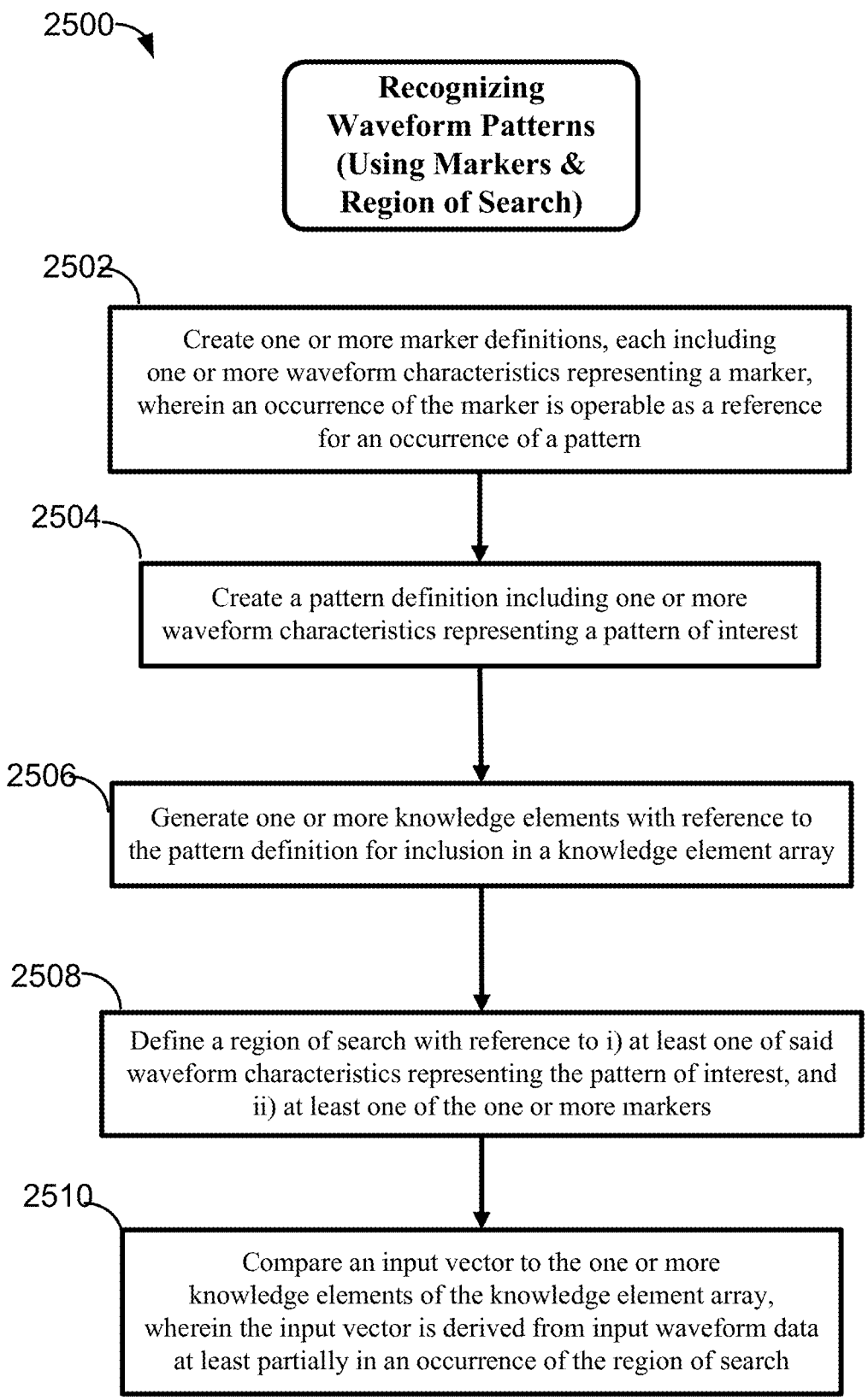
FIG. 25 is a flow chart showing a method for recognizing waveform patterns using a region of search and one or more markers according to some implementations of the invention.

FIG. 25 shows a flow chart illustrating an example embodiment that uses both a region of search and one or more markers in the pattern recognition process (2500). The process involves creating one or more marker definitions, each comprising one or more waveform characteristics representing a marker (2502). An occurrence of the marker is operable as the reference for an occurrence of a pattern. A system implementing the process 2300 creates a pattern definition comprising one or more waveform characteristics representing a pattern of interest (2504), and generates one or more knowledge elements with reference to the pattern definition (2506), in manners similar to the method using only ROS without markers (2300).

The system further defines a ROS with reference to one of the waveform characteristics representing the pattern of interest. The ROS is also defined with reference to at least one of the one or more markers (2508).

In the example process of 2500 shown in FIG. 25, one or more markers are provided, then a pattern definition is provided once, and then a ROS is defined with reference to both the markers and the pattern definition, and finally a recognition operation is performed once. However, in some implementations in practice, a marker can be provided after a pattern definition. Similar to the process of 2100, a pattern definition may be used with two or more different markers, and a marker may be used with zero, one, two or more pattern definitions. After markers and a ROS are provided, one or more recognition operations and one or more learning operations may be performed as described above.

In some embodiments, the region of search is defined as a region relative to a nominal position. Each occurrence of the nominal position is x distance units from an occurrence of the single marker; and x distance units is the distance between the single marker and the at least one of the one or more waveform characteristics representing the pattern of interest.

In some embodiments, the ROS is defined relative to two markers as illustrated in FIG. 21. In such embodiments, the ROS is defined as a portion of the distance between the two markers. Meanwhile, the ROS is also defined with reference to the two markers, because the ROS is centered on the nominal position, which in turn depends on the two markers and the leading edge of the pattern of interest.

In some embodiments, the region of search is a portion of the distance between the two dual markers. Each occurrence of the nominal position is x distance units from an occurrence of one of the two dual markers; and x distance units is the distance between the one of the two dual markers and the at least one of the one or more waveform characteristics representing the pattern of interest.

With reference to the information from the defined marker, the system employing the method of 2500 performs a pattern recognition operation by comparing an input vector to the one or more knowledge elements of the knowledge element array, wherein the input vector is derived from input waveform data at least partially falling in occurrence of the ROS. In some embodiments, the pattern recognition operation includes determining a match between the input vector and the one or more knowledge elements of the knowledge element array if the input vector falls in any influence fields of the one or more knowledge elements. In some embodiments, the recognition operation includes computing the aggregate distance between the data of the input vector and the one or more knowledge elements. In some embodiments, the pattern recognition operation includes recognizing an occurrence of the pattern of interest if the input vector falls within an influence field of the one or more knowledge elements.

In some embodiments, the logic of the pattern recognition system is configured to enter the data of the input vector into the knowledge element array as a knowledge element and conditionally adjust one or more influence fields of other knowledge elements if the input vector is not recognized by a recognition operation and the input vector is to be learned.

In other embodiments, the logic is configured to "half-learn" an input vector by adjusting the influence fields without entering the input vector into the knowledge element array, if the input vector is not recognized by a recognition operation and the input vector is to be learned.

In some embodiments, the pattern recognition method involves performing the pattern recognition operation on a plurality of input vectors derived from input waveform data at least partially falling in occurrences of the region of search by comparing the input vectors to the one or more knowledge elements of the knowledge element array and finding the best match if any.

In some embodiments, the input vector is derived from previously computed and stored information or information generated by one or more sensors. In some embodiments, the one or more sensors comprise one or more multichannel sensors. In some embodiments, the one or more multichannel sensors are multielectrode array sensors.

In some embodiments, the pattern recognition system provides a cross-channel marker, which uses waveform data from a first channel to define a marker for waveform data in a second channel.

In some embodiments, the pattern recognition system automatically detects a plurality of occurrences of each of one or more markers. In some embodiments, the pattern recognition system prevents detection of an occurrence of a marker in a user definable suppression interval. In some embodiments, the pattern recognition system prevents detection of a new occurrence of a marker before signal exceeds a user definable hysteresis threshold. In some embodiments, the pattern recognition system automatically computes a plurality of occurrences of the region of search.

Micro-Search and Dithered Learning

In various embodiments, step size may be defined for detection of patterns. Step size determines the sampling rate when searching for a pattern of interest. As the step size increases, the sampling rate decreases, improving the speed to search through a region of interest when comparing test vectors to a knowledge vector representing the pattern of interest. However, this improvement of speed comes with an accuracy tradeoff such that the best matching pattern in the region of search may be skipped over between two steps. Some embodiments provide methods to overcome this speed-accuracy tradeoff by analyzing data skipped over between two steps after a pattern is detected in an input vector.

In some embodiments, the pattern recognition first performs a "macro-search" by stepping through the region of search using a larger step size to detect a pattern as a preliminary match to the pattern of interest. After identifying a preliminary match, the pattern recognition performs a "micro-search" in the neighborhood region of the preliminary match using a smaller step size to detect a pattern as a final match. In some embodiments, if the preliminary match is good enough to meet certain matching criteria, the system may not conduct the micro-search after the macro-search.

Figure 26A:
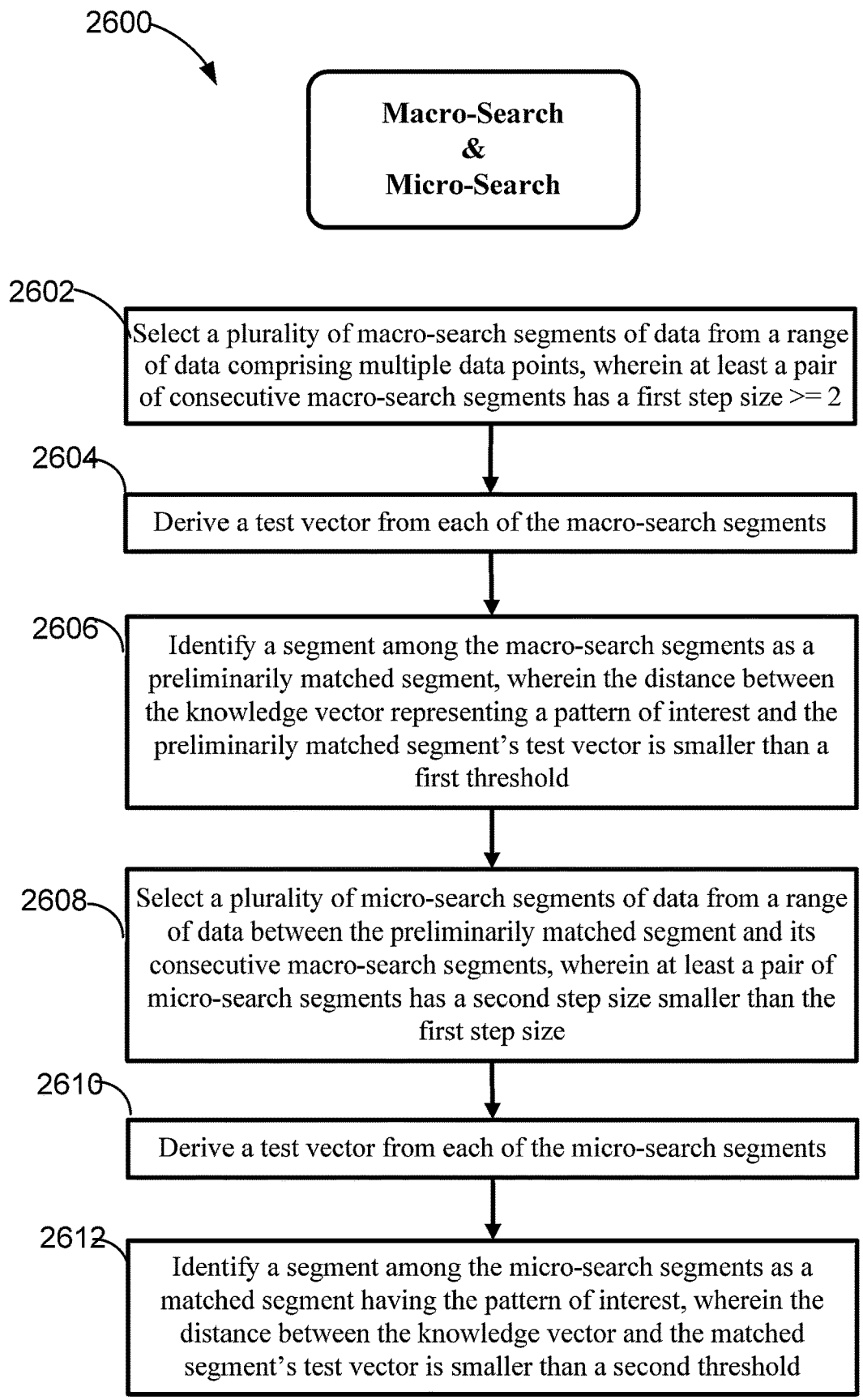
FIG. 26A is a flow chart showing a dithered learning method for efficiently searching through a region of search.

FIG. 26A is a flow chart showing an example of a micro-search method (2600) for efficiently searching through a region of search when initially searching with a relatively large step sizes. In some embodiments, the method first involves selecting a plurality of macro-search segments of data from a range of data comprising multiple data points (2602). In some embodiments, the range of data is within a region of search as defined above. At least a pair of consecutive macro-search segments has a first step size not smaller than two, the step size being the number of data points offsetting a pair of consecutive segments. In some embodiments, the same step size is used to sample all consecutive segments. For instance, the method may examine a region of search of 100 data points for macro-search segments, each segment having 10 data points. The method performs a macro-search with a step size of 5, by sampling the macro-search segments at samples 1-11, 6-16, 11-21, 16-26, and so on.

After obtaining the macro-search segments, the method proceeds to derive a test vector from each of the macro-search segments (2604). The test vector can then be compared to a knowledge vector representing a pattern of interest using comparison method described above. In some embodiments, the distance between the two vectors determines whether the test vector falls in the influence field of the knowledge element containing the knowledge vector. In some embodiments, the influence field may be adjusted by a tolerance parameter. If the test vector is in the influence field of the knowledge vector, the pattern of interest may be determined to be in the macro-search segment. Some embodiments involve identifying a segment among the macro-search segments as a preliminarily matched segment, wherein the distance between the knowledge vector and the preliminarily matched segment's test vector is smaller than a first threshold (2606). In some embodiments, the first threshold may be a particular value of a distance between two vectors or % tolerance. In some embodiments, when multiple segments meet the criterion, the segment whose test vector is closest to the knowledge vector among all macro-search segments is selected as the preliminarily matched segment.

Then the method 2600 proceeds to perform a finer grain search after the macro-search. Some embodiments involve selecting a plurality of micro-search segments of data from a range of data between the preliminarily matched segment and its consecutive macro-search segments (2608). The micro-search segments have a second step size smaller than the first step size used for the macro-search. In some embodiments, the same step size applies to all micro-search segments. In other embodiments, different step sizes may be used, and at least some of the step sizes are smaller than the first step size. In some embodiments, the second step size is 1, sampling every data point in the data region near the preliminarily matched segment. In some embodiments, the sampling occurs upstream and downstream of the preliminarily matched segment. In some embodiments, the range of data for micro-search is the range between the macro-search segments immediately upstream and downstream of the preliminarily matched segment. After the micro-search segments are obtained, the method proceeds by deriving a test vector from each of the micro-search segments (2610) and identifying a segment among the micro-search segments as a matched segment having the pattern of interest, wherein the distance between the knowledge vector and the matched segment's test vector is smaller than a second threshold (2612). In some embodiments, the matched segment has the test vector that is closest to the knowledge vector representing the pattern of interest. This allows the system to find the local minimum (as to the distance between the test and knowledge vectors). By performing the macro-search, the system improves its speed to search through test data. By performing the micro-search in the neighborhood of the data having a preliminarily matched pattern, the system provides a mechanism to hone in on the most accurately matched pattern. By combining micro and macro searches, the system improves both the speed and accuracy of pattern detection.

Figure 26B:
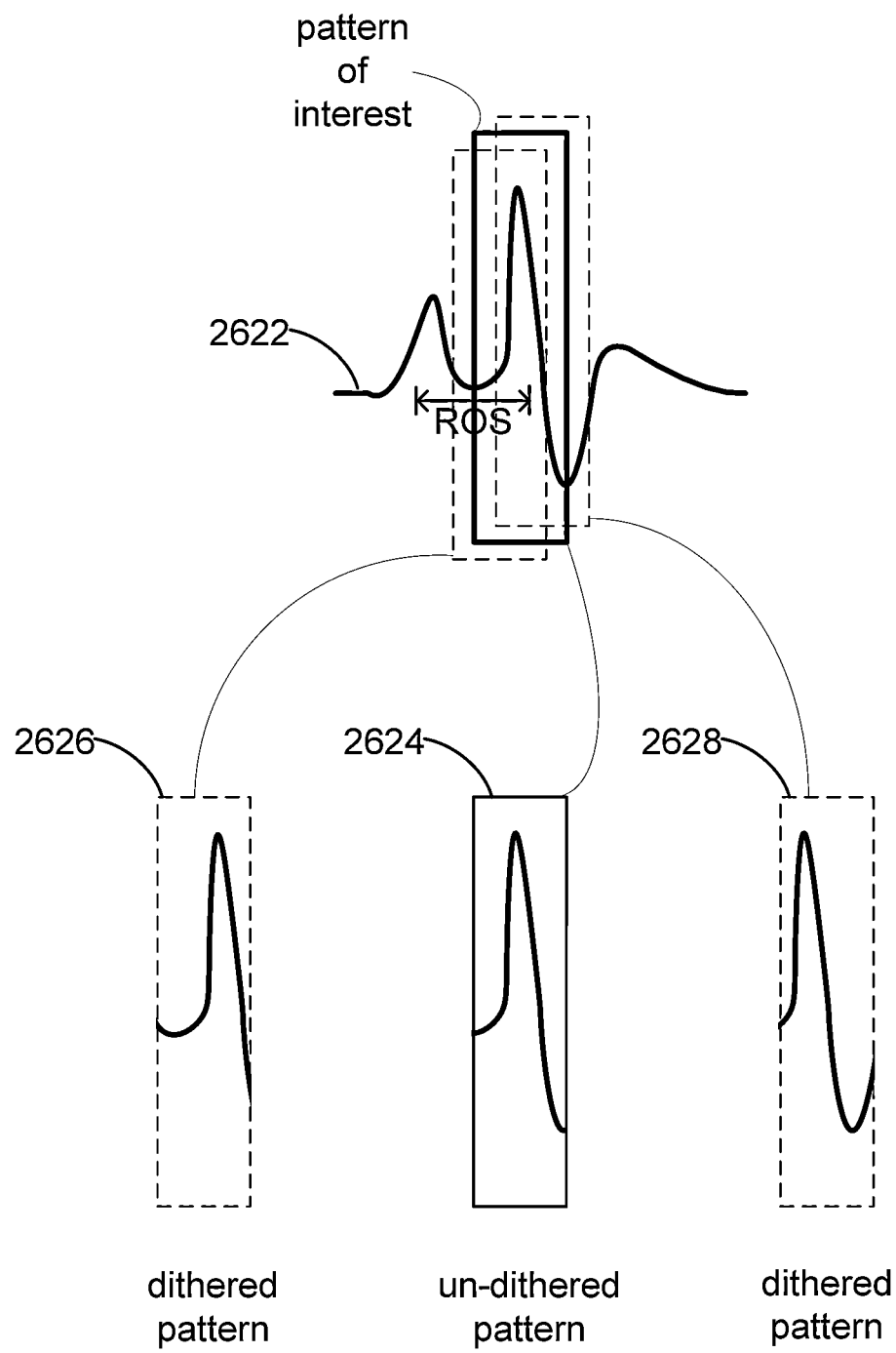
FIG. 26B illustrates an example of data and patterns learned by a system with dithered learning capability.

In some embodiments that apply a region of search, sometimes a pattern of interest in test data may lie close to the border, or even beyond the border of the region of search. Moreover, if the step size is relatively large when searching for the pattern of interest, a good match between a test vector and a knowledge vector may not exist. A dithered learning approach can help to improve pattern recognition in these situations, although dithered learning can also be implemented in other situations (e.g., when a region of search is not used). In dithered learning, the system learns not only the pattern as defined by the pattern definition within the region of search, but also a number of dithered patterns from the neighboring regions relative to the region of search. For example, FIG. 26B shows the pattern of interest, the "un-dithered" pattern 2624, in training waveform data 2622 and the "dithered" patterns 2626 and 2628 to the left and right of the un-dithered pattern 2624. The system learns both the un-dithered and dithered patterns and stores them as knowledge elements, which are used to improve recognition performance. The dithered patterns 2626 and 2628, as well as the un-dithered pattern patterns 2624, have their leading edges in the region of search (ROS) in this example. In some embodiments, the dithered patterns may fall entirely outside of the ROS. The dithered patterns may be upstream and/or downstream of the pattern of interest (un-dithered pattern). The difference or distance between the dithered patterns and the pattern of interest may be adjustable for various applications. The number of dithered patterns to be learned is also adjustable. A larger step size during pattern detection phase may benefit from a larger difference between dithered and un-dithered patterns, or a larger number of dithered patterns. A smaller region of search may also similarly benefit from the larger difference or the larger number of dithered patterns.

In the pattern detection phase, the system performs a primary search to compare a test vector to not only the knowledge vector of the pattern of interest (or the un-dithered knowledge vector), but also to the knowledge vectors of the dithered patterns (or the dithered knowledge vectors). If a test vector matches the un-dithered knowledge vector, the system makes a recognition call. The system also determines if the test vector matches any of the dithered knowledge vectors. If the test vector matches any of the dithered knowledge vector, but not the un-dithered knowledge vector, the system performs a secondary search on test data that are in the neighborhood of the test data. In the secondary search, test vectors are compared to the un-dithered knowledge vector.

In some embodiments, the secondary search is performed with a step size smaller than that of the primary search. In these embodiments, the primary search can be implemented as a macro-search, and the secondary search can be implemented as a micro-search as described above. In some embodiments, the step size is every sample in the secondary search. In some embodiments, the secondary search terminates when a match is found between a test vector and the un-dithered knowledge vector. In some embodiments, the secondary search terminates when a match score is maximized (e.g., distance between vectors are minimized).

Binary Search of the ROS

In searching for a pattern of interest in an ROS, the system does not have a priori knowledge of where a match or a best match among matches may exist in the ROS. In some embodiments, mechanisms are provided to efficiently find the best match among candidate data in a ROS. To improve the search efficiency of the pattern recognition engine, in some embodiments, a pattern recognition system divides each occurrence of the region of search into two or more sub-regions; and perform a pattern recognition operation on input vectors derived from input waveform data at boundaries of the sub-regions by comparing the input vectors to the one or more knowledge elements of the knowledge element array.

Figure 27:
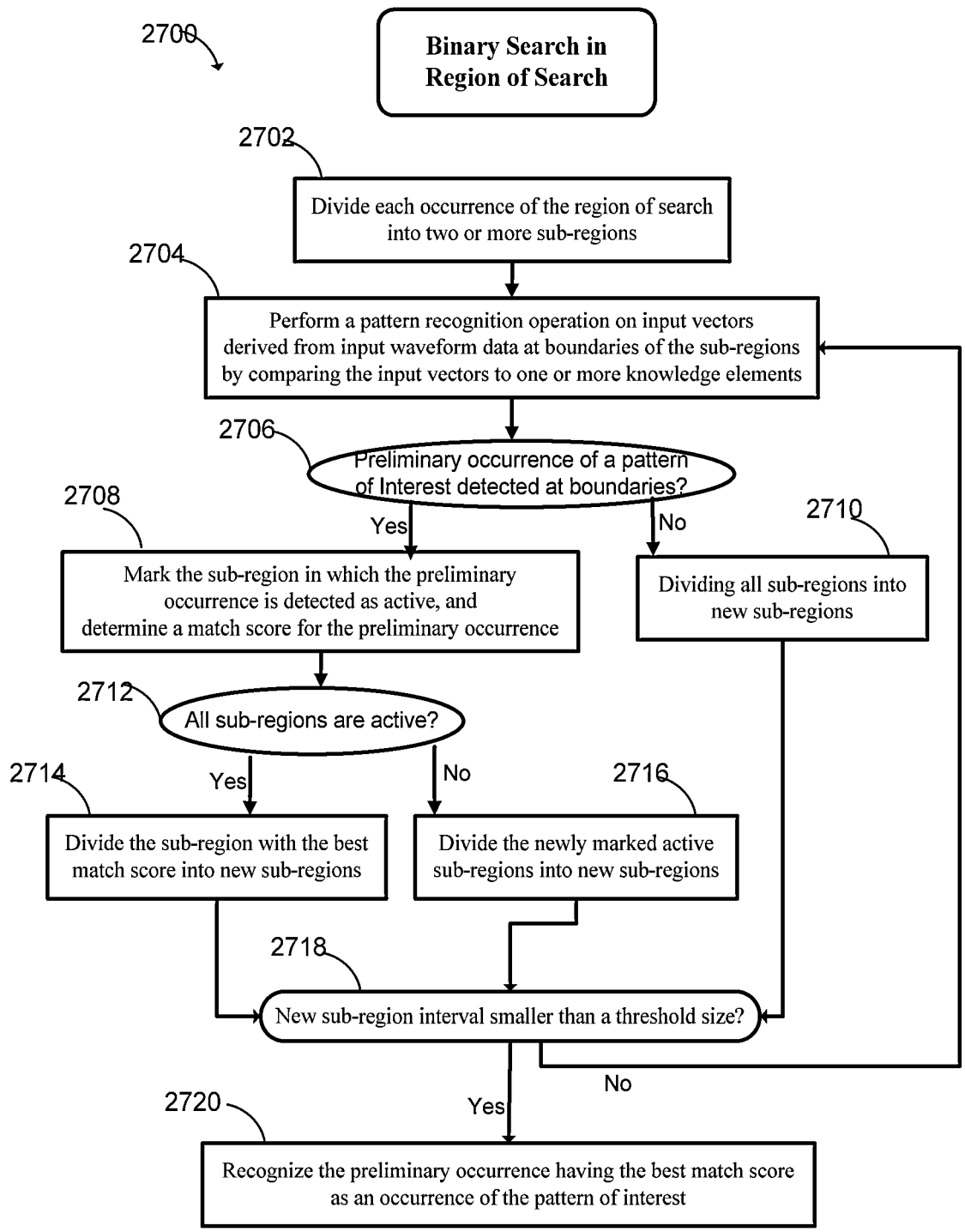
FIG. 27 is a flow chart showing a binary search method implemented for efficiently searching within a region of search according to some implementations.

FIG. 27 is a flow chart showing a binary search method implemented for efficiently searching within a region of search according to some implementations (2700). The pattern recognition system implementing the methods divides each occurrence of the region search into two or more subregions (2702). The system then performs a pattern recognition operation on input vectors derived from input waveform data at the boundaries of the subregions by comparing the input vector to one or more knowledge elements that represent patterns of interests (2704). The system next determines whether the preliminary occurrence of the pattern of interest has been detected at the boundaries of the subregions (2706). If so, the system marks the subregions in which the preliminary occurrence detected as active, and determines a match score for the identified preliminary occurrence of the pattern of interest (2708). The system further determines whether all the subregions or marked as active (2712). If all the subregions are active, the system divides the subregions with the best match score into new subregions for further process (2714). If some but not all of the subregions are active, the system divides the newly marked active subregions into new subregions for further processing (2716). If no preliminary occurrence of a pattern has been detected at the boundaries, the system divides all the subregions into new subregions further processing (2710). With new subregions, the system next determines whether the new subregions have intervals that are smaller than the threshold size (2718). If not, the system loops back to block 2704 to perform a new round of pattern recognition operation on input vectors derived from the input waveform data at the boundaries of the new subregions. If the new subregion intervals are smaller than the threshold size, the system ends the search, and recognizes that the preliminary occurrence having the best match score as an occurrence of the pattern of interest, if any preliminary attendances have been recognized in the binary search process (2720).

Frequency Domain Pattern Recognition and Display

In some embodiments, the pattern recognition systems have abilities to recognize, analyze and display frequency domain patterns. In some cases, e.g., involving a spectro-gram pattern, a frequency pattern of interest does not only depend on the time dimension in a time window, but also depends on the frequency and power dimensions. In some embodiments, the pattern detection systems provide two displays to show the data, one showing 2-D data of amplitude over time (e.g., time on X axis and amplitude on Y axis), another showing 3-D data of power for frequencies over time (e.g., time on X axis, frequency on Y axis, and power indicated by colors on Z axis).

In some embodiments, the pattern recognition systems provide one or more text fields for users to specify a first time window for learning, analyzing, or recognizing frequency data. This contrasts with the drag and drop method to place a box around the time range of amplitude data having the pattern of interest. In some embodiments, the systems further provide one or more text fields for a user to specify an epoch smaller than the first time window. The epoch functions as a sliding time window in the first time window. The pattern recognition system learns or recognizes a frequency pattern in the epoch. In some embodiments, the systems alternatively use a drag and drop box to define the epoch, especially when the epoch is many times smaller than the first time window, e.g., 20 minutes for the first time window and 15 seconds for the epoch. In various implementations, the pattern recognition system can extract features from the 2-D data, the 3-D data, or further transformed data. Feature vectors can then be created from the extracted features for learning and recognition as described above. In some embodiments, graphical displays are provided to visualize virtual channels for transformed data, along with a physical channel displaying the untransformed data.

E. Processes Before and After Pattern Recognition Operation

E.1. Reusable Workflow

Typically, experimental data require extensive processing such as resizing, filtering or enhancing of the waveform before a learning and recognition operation template can be fully set up and trained. In some implementations, the pattern recognition system improves user productivity by simplifying the setup and training of the pattern recognition engine. This is in part achieved by creating reusable and configurable workflows that can be applied to various sources of data for analysis, feature extraction, and pattern recognition.

Figure 28:
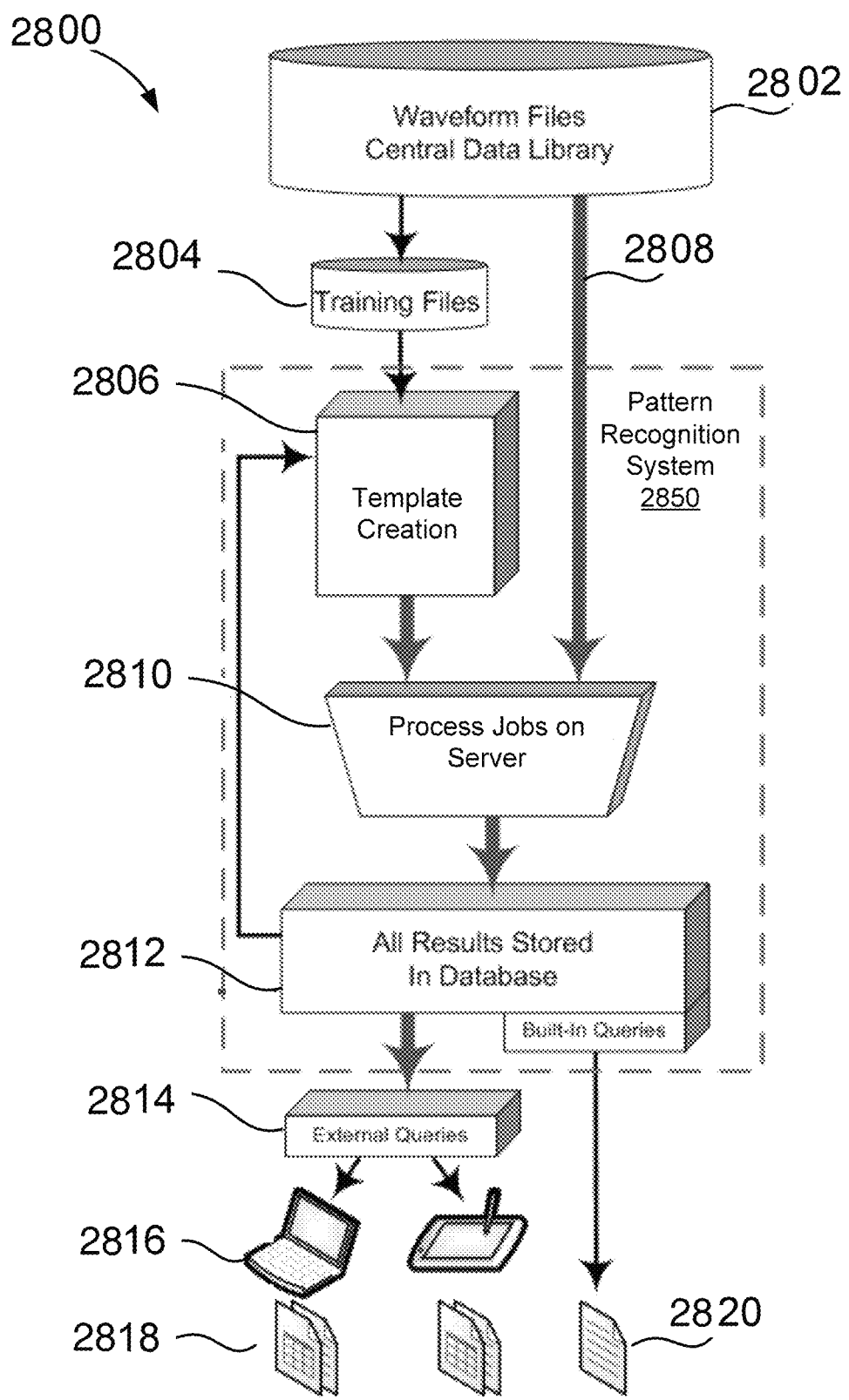
FIG. 28 is a flow chart showing a workflow of the process in some implementations.

FIG. 28 is a flowchart illustrating a general workflow (2800) of the system and methods of pattern recognition. The system stores waveform files in a central data library (2802). The data library includes user experiments or application data, including new and archived data. Although in this example, the data library is centralized and stored on one storage, a distributed storage architecture may be implemented in other embodiments, so that the data library may be divided into parts stored in different databases or at different devices. See the section on Distributed Computing Architecture below for detailed examples of how a distributed data library can be implemented. A user typically uses a small set of representative files (2804) from the central data library (2802) as a training file to set up and train the pattern recognition engine (2810) in the pattern recognition system (2850). In this implementation, the user sets up a processing template comprising processing chains on a workbench client computer (2806). Data that have been processed through the processing chain are supplied to the pattern recognition engine (2810) for pattern recognition and learning operations.

Large data files or file sets (2808) are taken from the central data library (2502) submitted as jobs for the pattern recognition engine (2810) for batch process. The results of the learning and recognition operations based on the large data files or file sets are also stored in a database (2812). In some embodiments, the results of the recognition operations are stored in a result database, wherein the recognition operations are based on the training files and the training processing templates. In some embodiments, the recognition system can learn patterns that have been identified as being different from the pattern of interest. The results of learning are entered into a knowledge database. The database may be implemented as client or tenant database, or it could be implemented as server embedded database.

In some implementations, the pattern recognition system has built-in query functions, which, when executed, provides relatively simple reports to users (2820). In some embodiments, the system provides external query modules (2814) that are connected to user or third party computing platforms (2816) such as handheld devices, laptop computers, and desktop computers. Queries submitted to this model cause the system to supply extensive reports and dashboards.

In some embodiments involving data from multiple channels, the processing template (2806) includes global and individual channel filters. Global filters are implemented on all channels, while a channel filter is only applied to a particular channel. In some embodiments, the system also provides advanced processing functions including signal processing, convolution operators, and polynomial curve fitting, etc. In some embodiments, multiple filters can be cascaded together. An example would be a low-pass filter applied prior to a smoothing filter. The processing chain is customizable in that filters in the chain can be readily added or deleted.

Figure 29:
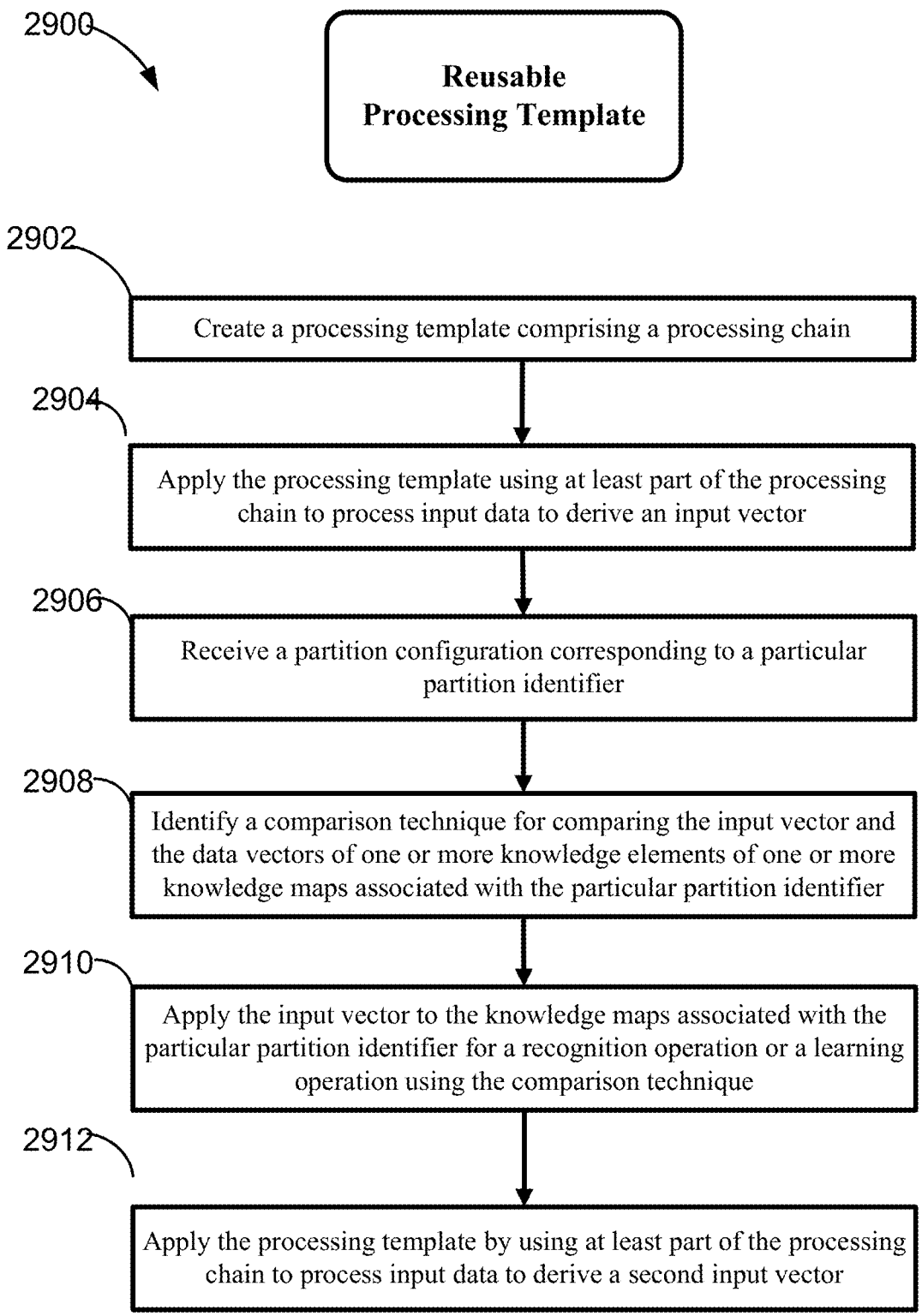
FIG. 29 is a flow chart illustrating a method for generating reusable workflow according to some implementations of the invention.

In some implementations, the pattern recognition system improves user productivity by creating reusable and configurable workflows that can be applied to various sources of data for analysis, feature extraction, and pattern recognition. FIG. 29 is a flow chart showing a method for creating and using a reusable workflow for a pattern recognition operation (2900). The method can be implemented by a pattern recognition system having one or more memories configured to maintain one or more knowledge maps, wherein each knowledge map comprises a plurality of knowledge elements and is associated with a partition identifier.

In some embodiments, the method implemented by the pattern recognition system involves creating a processing template comprising a processing chain (2902). The processing chain includes a channel filter for filtering data from one or more channels of multichannel data or other processes outlined above. The system implementing the method then applies the processing template by using at least part of the processing chain to process input data to derive an input vector (2924). The system receives a partition configuration corresponding to a particular partition identifier (2906). The system identifies a comparison technique for comparing the input vector and the data vectors of one or more knowledge elements of the one or more knowledge maps associated with the particular partition identifier (2908). Then the system applies the input vector to the particular knowledge map for a recognition operation or a learning operation using the comparison technique (2910).

In some embodiments, the pattern recognition system can apply the processing template created previously by using at least part of the processing chain to process input data to derive a second input vector (2912). In these embodiments, the system stores the processing template in a storage device, and can reuse the processing template to process different input data. In certain embodiments, the processing template comprises one or more feature extraction processes to extract features from the input data.

E.2. Intelligent Channel Selection

Various applications of pattern recognition increasingly involve a large amount of data due to the nature of the data and the advent of new technologies to easily and efficiently collect data. For instance, high throughput screening and multi-electrode array simultaneously collect an increasingly large number of channels of data as the hardware and software for data collection improve over time. Higher temporal and spatial resolution of signal leads to a larger amount of data. The lower cost, higher mobility and wider availability of sensor devices all contribute to higher volume of data. It is thus desirable to find means to quickly select data from particular candidate of data source for in-depth analysis in a pattern recognition system.

Some embodiments described below provide methods for efficiently selecting data from one or more particular channels of multi-channel data for in pattern recognition operations. Such selection allows a system to focus the computing power on data from candidate channels that likely contain patterns of interest.

Figure 30:
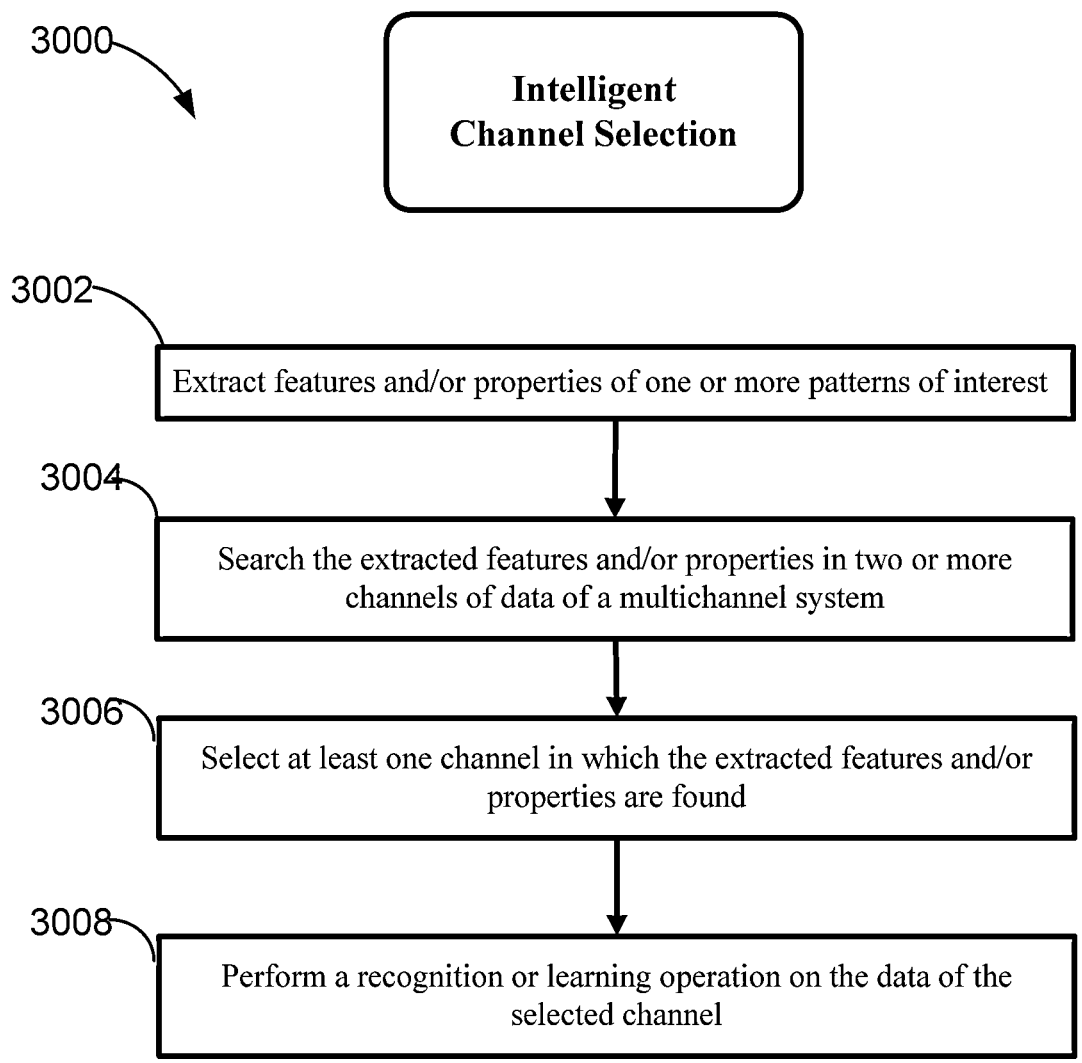
FIG. 30 is a flow chart illustrating a method for intelligently selecting one or more channels of multi-channel data for recognition analysis according to some implementations of the invention.

FIG. 30 shows a flow chart of a method for intelligently selecting a channel of data from multi-channel data for pattern recognition analysis. Similar embodiments may be generalized to other types of data with multiple comparable sources. The method first involves extracting features and/or properties of one or more patterns of interest (3002). Such features can be derived from the common characteristics among occurrences of the same pattern, and are not limited to any one specific feature. The method then involves searching the extracted features and/or properties in two or more channels of data of a multichannel system (3004). Then the method involves selecting at least one channel in which the extracted features and/or properties are found (3006), and perform a recognition or learning operation on the data of the selected channel (3008). In some embodiments, the recognition and learning operation are partition-based operation as described herein.

For a hypothetical example, take the goal of pattern recognition to be detecting a prolonged Q-T interval (a pattern) of ECG data from multiple sources, as prolonged Q-T interval is a risk factor of ventricular tachyarrhythmia and sudden death. Prolonged Q-T interval may be heralded by increased heart rates. Instead of searching through data of every channel for the whole waveform to find the prolonged Q-T interval, the intelligent channel selection method can search and detect increased heartbeats in channels. The method then entails selecting the channel having certain kinds of heart-beat modulation as the candidate channel for analysis of prolonged Q-T interval.

In some embodiments, the properties of the one or more patterns of interest comprise one or more of the following: peak amplitudes, sample width, mean, median, standard deviation, minimum, maximum, slope, intercept, QT interval, RR interval, RT interval, field potential, depolarization, repolarization, T wave peak amplitude, R wave peak amplitude, and total spike amplitude.

In some embodiments, the pattern recognition system having intelligent channel selection capability can learn one or more characteristic of waveform from training examples. Then the system can select one or more channels of a multichannel system in which the determined characteristic is found, and performs a recognition or learning operation on data from the selected channels. In some embodiments, the training examples comprise data from a channel different from the selected one or more channels.

E.3. Metrology of Patterns

Many applications of pattern recognition require the extraction of the timing, location and amplitude measurements, as well as other quantitative properties, from the detected patterns. In some embodiments of the invention, the pattern recognition systems provide metrology tools to supply these quantitative properties. Such quantitative properties or measurements include but are not limited to: peak amplitude derived from polynomial fit, sample count, pattern mean, median, standard deviation, minimum, maximum, slopes, pattern polynomial fit intercepts with baseline polynomial fit, maximum curvature elbows and widths (durations) at various relative amplitudes. In other embodiments, the quantitative measures are derived from single and multiple patterns and include but are not limited to: QT interval, RR interval, RT interval, field potential duration, T wave peak amplitude, R wave peak amplitude, and total spike amplitude. Table 3 provides some un-limiting examples of quantitative properties that a system can provide according to one implementation, and Table 4 provides un-limiting examples of quantitative properties that users can query in one implementation.

TABLE 3

Example Properties of Patterns Provided by a Pattern Recognition System of Waveform Data According to an Implementation

| Metrology Properties | Description |
|---|---|
| First Intercept | An intersection point between a baseline polynomial fit and the left maximum tangent line of the pattern polynomial fit. Location (X axis), and amplitude (Y axis) of this intercept point are computed. |
| Last Intercept | An intersection point between a baseline polynomial fit and the right maximum tangent line of the pattern polynomial fit. Location (X axis), and amplitude (Y axis) of this intercept point are computed. |
| Peak Value | The extreme value and location of the pattern polynomial fit. Location (X axis), and amplitude (Y axis) of this peak or trough point are computed. |
| MaxValue | The largest value of the waveform contained in a detected pattern. Location (X axis), and amplitude (Y axis) of this maximum point are reported. |
| MinValue | The smallest value of the waveform contained in detected pattern. Location (X axis), and amplitude (Y axis) of this minimum point are reported. |
| Mean Value | The average value of the points in the pattern. |
| Standard Deviation Value | The standard deviation from the mean of the pattern's points. |
| Left Baseline | Section of data to the left of the pattern to be used to establish a baseline. |
| Left Shift Zone | The signal transition area between the left baseline and the beginning of the Pattern. The shift zone is used in the polynomial fit of the pattern. |
| Right Shift Zone | The signal transition area between the end of the Pattern and the right baseline. |
| Right Baseline | Section of data to the right of the pattern to be used to establish a baseline. |

TABLE 3-continued

Example Properties of Patterns Provided by a Pattern Recognition System of Waveform Data According to an Implementation

| Metrology Properties | Description |
|---|---|
| Left Elbow | The leftmost point of maximum curvature |
| Right Elbow | The rightmost point of maximum curvature |
| Pattern Duration | The width of the overall pattern at baseline and widths at selected relative levels of amplitude (Peak − Baseline), e.g., pattern width at 70% of peak. |
| Data Count | Number of points that a pattern comprises. |
| Fit Metrology | Polynomial fit coefficients of the pattern. |

TABLE 4

Example Properties of Patterns Queried in a Pattern Recognition System

| Queries | Description |
|---|---|
| Field Potential Duration | Distance between marker and peak amplitude of T-Wave |
| Missing Patterns | Detection of consecutive Markers with no pattern between. |
| QT Interval | Distance between Q-Wave left elbow and Last Intercept of T-Wave |
| RR Interval | Distance between consecutive Markers |
| T Wave Peak Amplitude | The extreme of the T-Wave polynomial fit. |
| R Wave Peak Amplitude | The maximum of the R-Wave. |
| RT | Distance between peak amplitude of pattern |
| Peak-to-Peak | (R) and peak amplitude of T-Wave pattern |
| Total Spike Amplitude | Difference (Max − Min) of detected pattern (e.g. QRS complex) |
| R Markers | Reports times of markers |
| Relative Amplitude | Difference between pattern peak and average of first and last intercepts. |

In some embodiments, a pattern recognition system can provide quantitative measurements of patterns. The system includes one or more memories configured to maintain a knowledge element array comprising a plurality of knowledge elements. The system also includes logic configured to: (a) partition the knowledge element array into one or more knowledge maps, each knowledge map having an associated partition identifier and comprising one or more of the knowledge elements, each knowledge element comprising one or more operands collectively defining a data vector and a category identifier; (b) receive an input vector and a particular partition identifier; (c) receive a partition configuration corresponding to the particular partition identifier and identifying a comparison technique for comparing the input vector and the data vectors of the one or more knowledge elements of a particular one of the one or more knowledge maps associated with the particular partition identifier; and (d) process the input vector by applying the input vector to the particular knowledge map for a recognition operation or a learning operation; (e) provide one or more measurements of an occurrence of a pattern recognized or learned in (d).

In some embodiments, the system provides quantitative measurements of a plurality of patterns. The system includes logic configured to: (a) partition the knowledge element array into a plurality of knowledge maps, each knowledge map having an associated partition identifier and comprising one or more of the knowledge elements, each knowledge element comprising one or more operands collectively defining a data vector and a category identifier; (b) receive a plurality of input vectors each having an associated one of the partition identifiers; (c) receive one or more partition configurations each corresponding to one or more of the plurality of partition identifiers, each partition configuration identifying a comparison technique for comparing the input vectors and the data vectors of the one or more knowledge elements of the knowledge maps associated with the one or more partition identifiers corresponding to the partition configuration; (d) process each input vector by applying the input vector to the knowledge map for the partition identifier associated with the input vector for a recognition operation using the comparison technique; and (e) combine a plurality of measurements of a plurality of occurrences of one or more patterns recognized in the recognition operations of (d) to achieve a higher level recognition result. In some embodiments, the pattern recognition system iteratively repeats (b)-(e) to achieve a higher level recognition result by providing the combined plurality of measurements of the plurality of occurrences of the one or more patterns of (e) as input vectors to (b).

In some embodiments, the pattern recognition system can provide one or more measurements of the plurality of occurrences of one or more patterns recognized in the recognition operations of (d) upon user query.

E.4. Cross-Channel Metrology

In some embodiments involving multi-channel data, patterns found on one channel can trigger taking and/or reporting of metrology measurements on another channel. For instance, if the pattern recognition system detects an alarming pattern of a QT interval in ECG data in channel 1, the system can automatically take and/or report measurements of body temperature in channel 2, galvanic skin response in channel 3, blood pressure in channel 4. This cross-channel metrology provides a useful tool to capture and analyze different information across channels when the coincidence of the different information is meaningful.

In some embodiments, a user defined marker on one channel can trigger taking and/or reporting of metrology measurements on another channel. Note this metrology function is different from cross channel markers described under section D.2, where a pattern or feature in one channel provides a reference point for detecting a pattern on a second channel instead of taking measurements.

E.5. Link Back to Data from Results

In various embodiments, pattern recognition systems present various metrology results to user. In some embodiments, the pattern recognition systems provide a "link back" function that automatically display the underlying data when a user interacts with presented metrology measurements. In some embodiments, a mouse click on a presented result brings up or switches to a window displaying the data that underlie the result. In some embodiments, hovering a mouse over a presented result activates a display box showing the data underlying the result.

F. Extendable System Architecture

F1. General System Architecture

Figure 31:
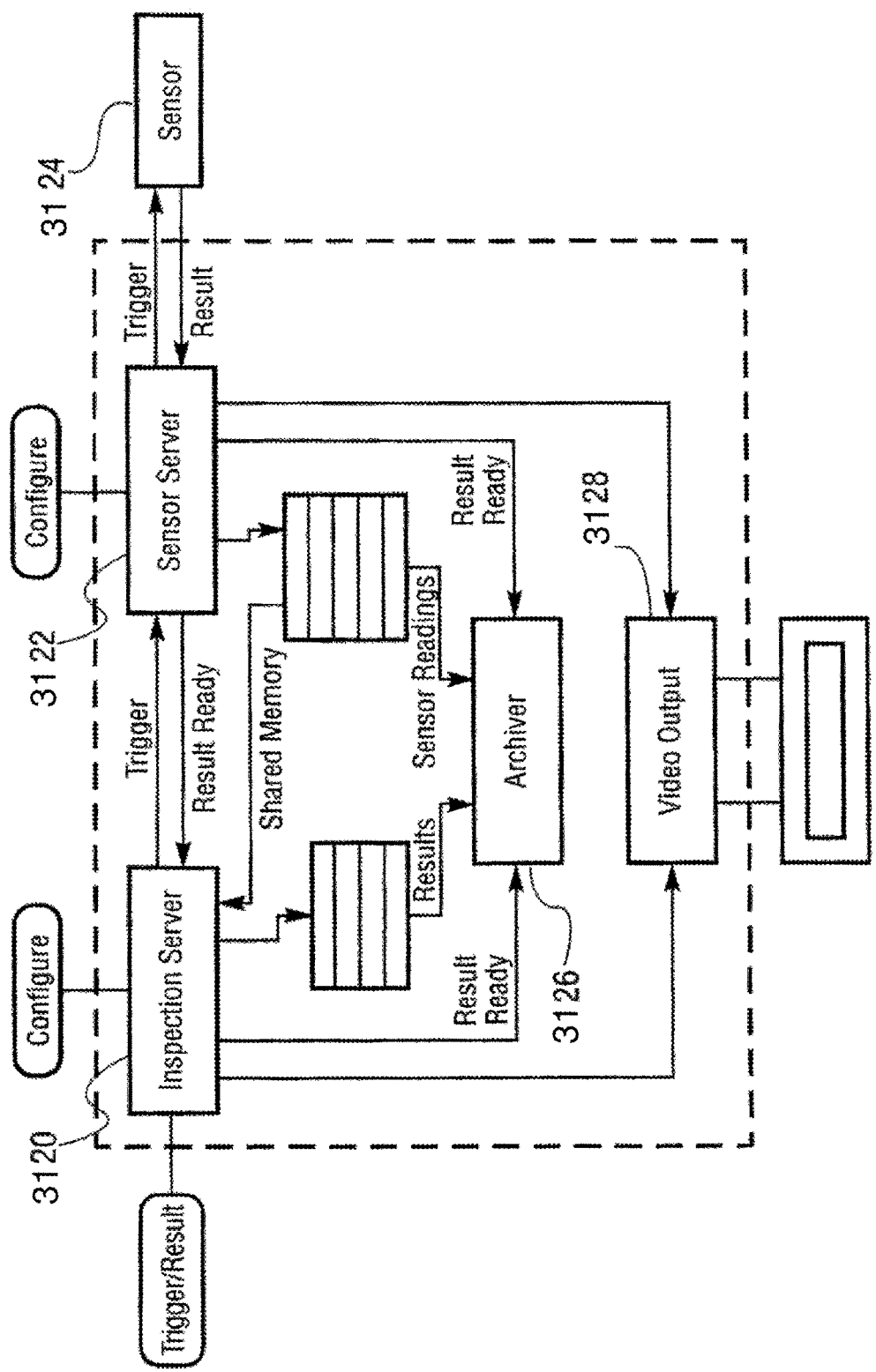
FIG. 31 is a schematic diagram illustrating an example system according to one implementation of the invention.

FIG. 31 illustrates an example of functional system architecture according to one possible implementation of the pattern recognition system. In this example implementation, the pattern recognition system includes two software-based servers that use the same shared memory. One of the servers is the sensor server 3122, which initiates a trigger and then receives sensor readings from a sensor 3124 (e.g., image, video, audio, chemical, text, binary, etc.). The other server is the inspection server 20 which triggers and receives results from the sensor server 3122. As shown in FIG. 31, both the sensor server 3122 and the inspection server 3120 can be configured by a human (using for example a USB storage device or a network) or an automated user of the pattern recognition system. In the event that the pattern recognition system includes data sensors that are sensing data of different types (e.g., image and audio, radio frequency), the pattern recognition system might include another software- or hardware-based server (not shown), on the same system or possibly connected via a network (not shown), which combines the results of individual inspection servers to create a higher level or hierarchical result, as described in greater detail earlier. In the subject pattern recognition system, this is termed "sensor fusion."

Additionally, as shown in FIG. 31, the pattern recognition system may include an archiver 3126, where the system stores, (locally or remotely) among other things, results from the inspection server 3120 and sensor readings from the sensor server 3122. Also, as shown in FIG. 31, the pattern recognition system may optionally include a video output device 3128 of some type, for display to a human user.

Figure 32:
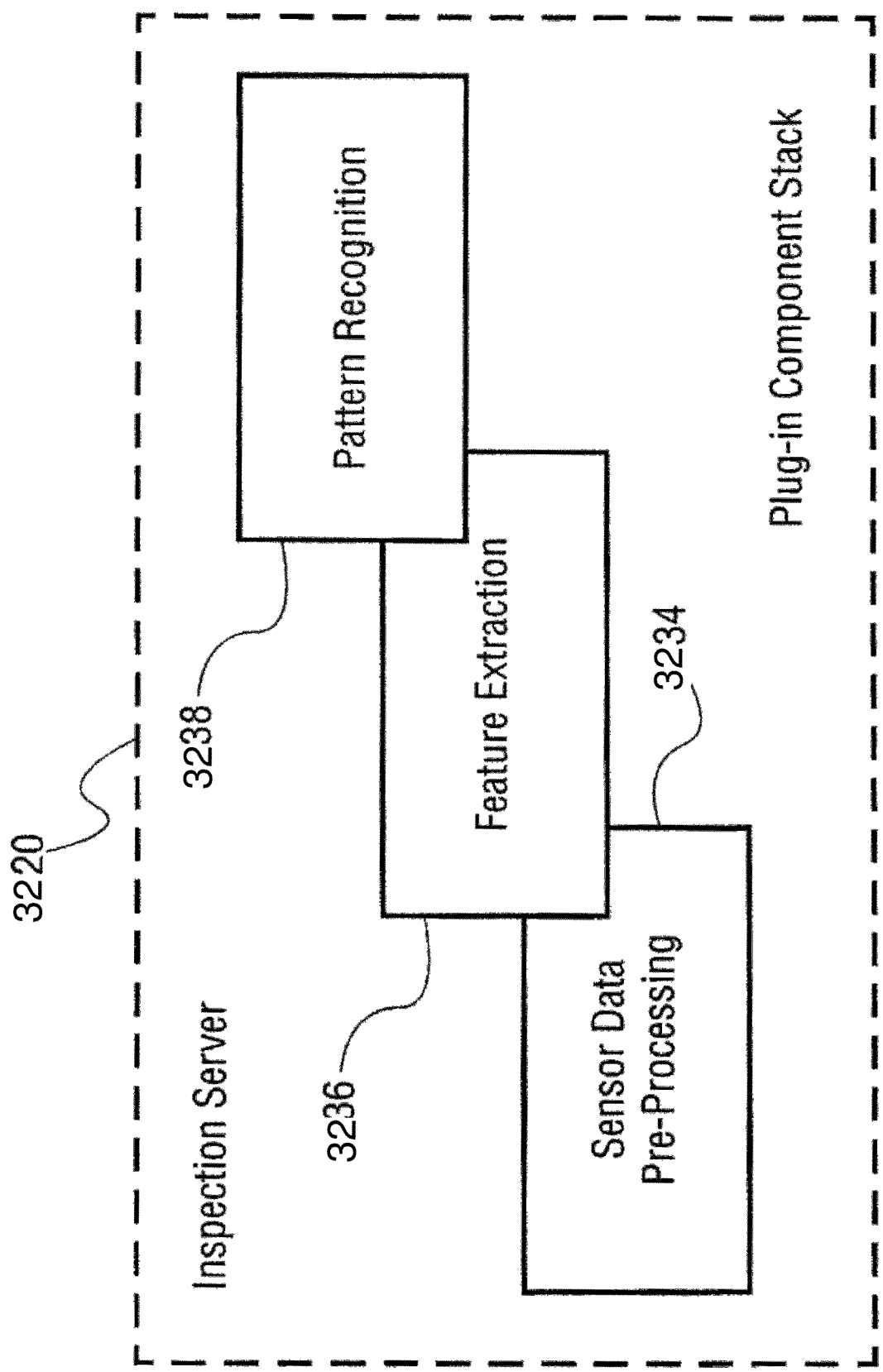
FIG. 32 is a schematic diagram illustrating the plug-in stack component of an example inspection server.

The pattern recognition system includes logic for pattern identification and pattern recognition, which logic is described in detail in this document. That logic, in one implementation, resides in the inspection server 3120 shown in FIG. 31. In some embodiments, the pattern recognition system is a scalable system whose resources can be increased as needed. Also, in some embodiments, the pattern recognition system is an extendable system, whose functionality can be readily extended via the use of general-purpose and special-purposes components. In one embodiment, the pattern recognition system is extendable using a set of plug-in components relevant to the task at hand, e.g., machine vision utilizing feature extraction. By choosing the order a particular plug-in component is used during task performance, it is possible to control when invocation occurs with respect to the system logic for pattern identification and pattern recognition. FIG. 32 illustrates an example implementation including a sensor data pre-processing component 3234, a feature extraction component 3236, and a pattern recognition component 3238. See also FIG. 3, which illustrates that the pattern recognition system may take inputs from several feature extraction components during a machine vision task. Preprocessing of the sensory data may be performed prior to attempting pattern recognition and feature extraction. For example, if the task at hand is machine vision, this preprocessing might include filtering to reduce noise, improve resolution, convert to grayscale, etc.

Figure 33:
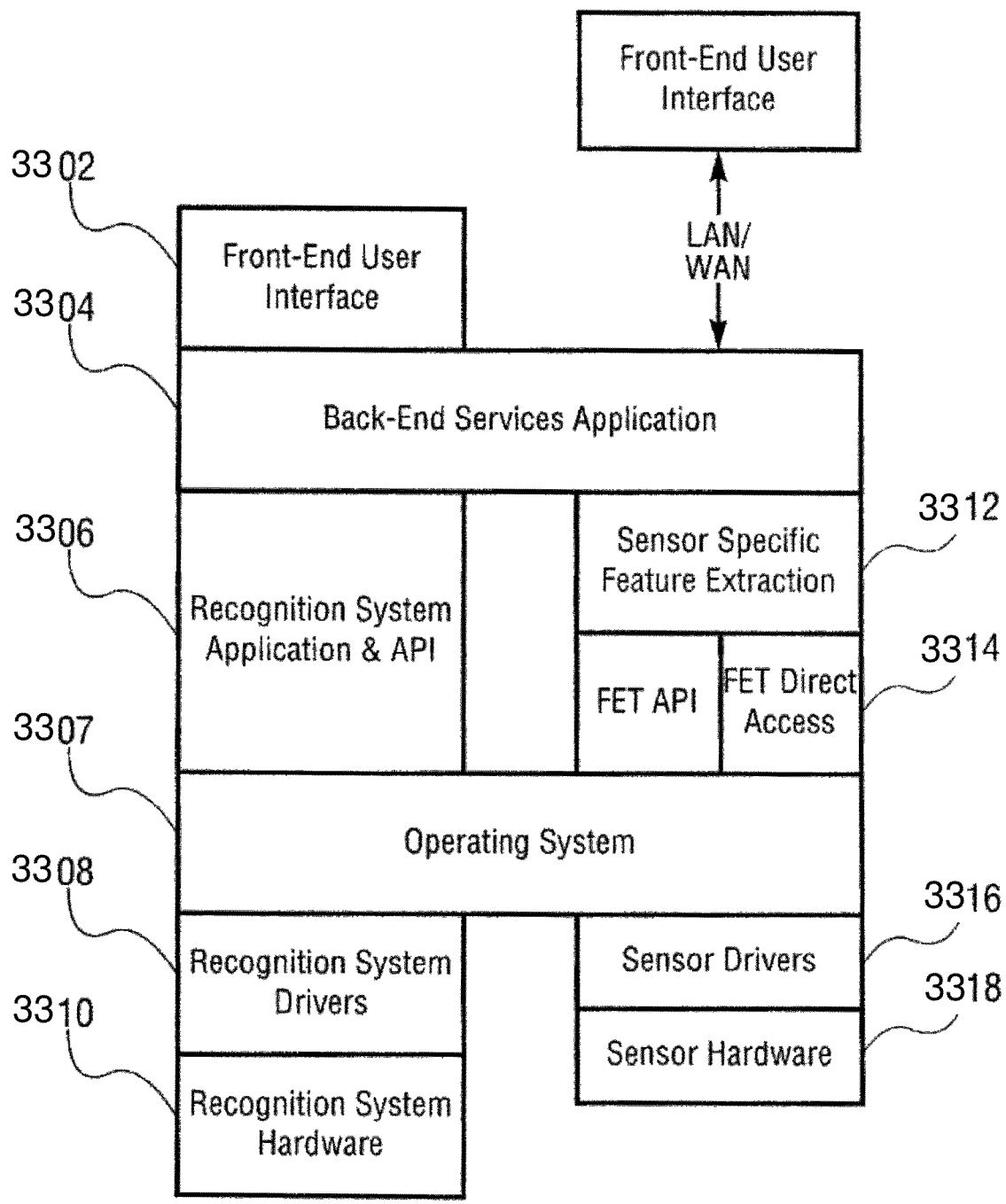
FIG. 33 is a schematic diagram illustrating a software and hardware stack architecture according to an example embodiment.

FIG. 33 is a more detailed picture of a possible component stack that includes feature extraction (FET) functionality. Operating system 3307 may be any suitable operating system, e.g. Linux®, Windows®. As FIG. 33 illustrates, sensor drivers 3316 may provide an API and command layer to sensor hardware 3318. Feature extraction and sensor specific feature extraction API layers 3312, 3314 provide an interface to sensor drivers 3316 via operating system 3307 and may include functionality operative to pre-process raw data provided by the sensor hardware 3318 to extract one or more features or attributes. As discussed below, pattern recognition processing may be offloaded to dedicated recognition system hardware 3310, which may for example be a field programmable gate array (FPGA) or other programmable logic circuit implemented on a PCI or other card. In some embodiments, commercial off-the-shelf hardware like NVIDIA's parallel computation architecture CUDA™ cores may be deployed as array and image processing engines for tasks related to pattern recognition. Recognition system drivers 3308 provide application programming interfaces to the hardware 3310, while recognition system application and application programming interface (API) layer 3306 provides interfaces to one or more pattern recognition applications (such as back-end services application 3304). Back-end user services application 3304 is operative to receive sensor input data and provide the input data, via recognition system application and API layer 3306 to the recognition system hardware 3310 for matching operations. Front-end user interfaces 3302, 3303 provide user interfaces to facilitate interaction with the pattern recognition system, such as configuration tasks, management tasks, and monitoring tasks.

A pattern recognition system can be hardware or software implementation-agnostic. That is to say, one can implement the pattern recognition system using: (1) software on an existing processor (e.g., Pentium, PowerPC, etc.), as indicated by the API in Appendix A; (2) HDL code for an FPGA (e.g., Xilinx Virtex-4, Altera Cyclone 3); (3) HDL Code in a semi-custom area of an existing generic processor (e.g., IBM Cell(REF)); and (4) full custom Application Specific Integrated Circuit (ASIC). In the case of chip-level implementations (e.g., 2-4 above), the chip might be mounted on a printed circuit board (PCB). This PCB could be on the main PCB for a computing machine or as an expansion PCB which would plug into a interconnect bus (PCI, PCI Express, etc.). In some embodiments, other general-purpose hardware like ARM processors or user-designed CPUs may be used. Some embodiments may use customized compute engines, e.g., ones made by OpenCores. In other embodiments, biological/DNA computations and quantum computers may be used for pattern recognition computation.

Figure 34:
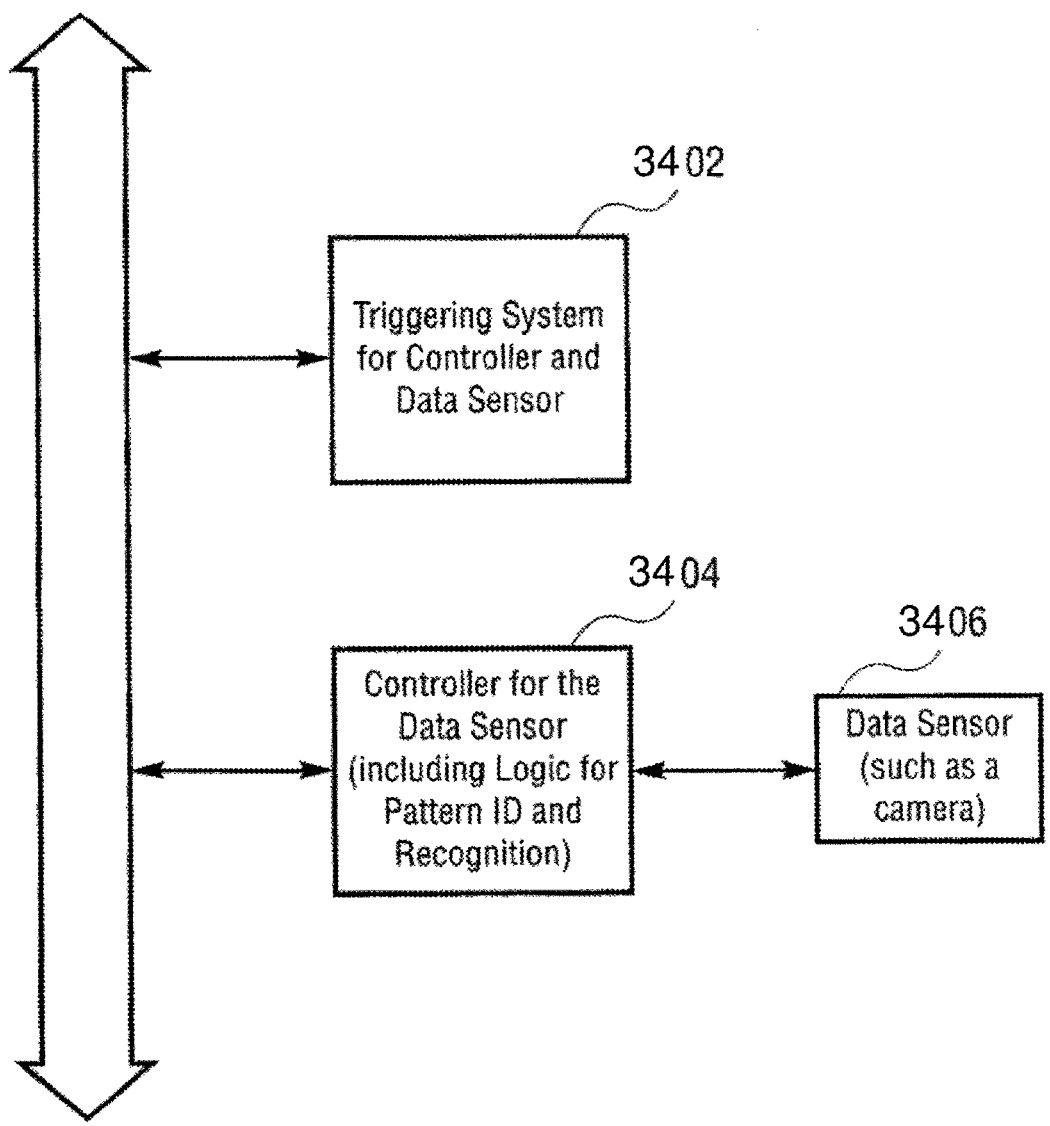
FIG. 34 is a schematic illustrating an example of system architecture according to one implementation of the invention.

FIG. 34 shows an embodiment where the pattern recognition system runs, and/or is integrated with, a controller 3404 for a data sensor 3406, which, e.g., might be a camera if the task to be performed is machine vision. More generally, a data sensor 3406 is a device that contains one or more transducers that captures observed physical phenomena, such as sounds, images, radio-frequency signals, etc., and converts them into an analog or binary representation for digital processing of the sensed data. Further, in this embodiment, there might be multiple controllers 3404 for multiple data sensors 3406, of the same or different types, e.g., a controller for a camera and a controller for a thermal imaging device, such as an infrared camera. Additionally, a triggering system 3402 may trigger operation of the data sensor 3406 and controller 3404, such as when a new part is ready for inspection on an assembly line; or results may be presented asynchronously based on sensor readings.

Figure 35:
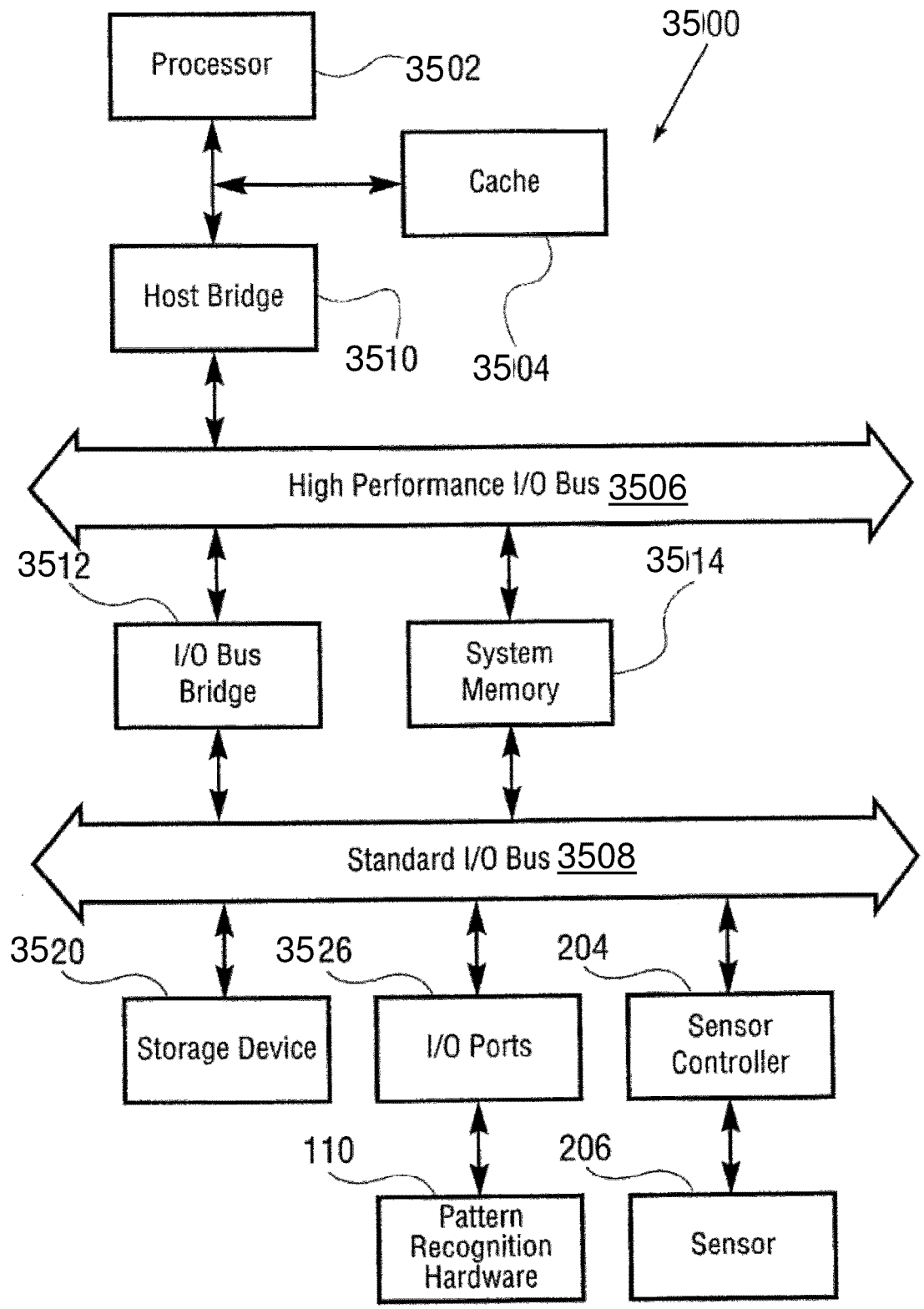
FIG. 35 is a schematic diagram illustrating an example computing system architecture according to one implementation of the invention.

FIG. 35 illustrates for didactic purposes an exemplary general-purpose computing platform, and hardware architecture, which might use the sensor controller 3404 shown in FIG. 34. In this embodiment, hardware system 3500 includes a processor 3502, a system memory 3514, sensor controller 3504, and one or more software applications and drivers enabling the functions described herein.

Further in FIG. 35, hardware system 3500 includes processor 3502 and a cache memory 3504 coupled to each other as shown. Cache memory 3504 is often of two levels, one which is contained as a part of processor 3502, and one which is external to processor 3502. Additionally, hardware system 3500 includes a high performance input/output (I/O) bus 3506 and a standard I/O bus 3508. Host bridge 3510 couples processor 3502 to high performance I/O bus 3506, whereas I/O bus bridge 3512 couples high performance I/O bus 3506 and standard I/O bus 3508 to each other.

Coupled to bus 3508 are sensor controller 204, such as a camera system controller, and system memory 3514. A sensor 206 is operably connected to sensor controller 204.

The hardware system may further include video memory (not shown) and a display device coupled to the video memory (not shown). Coupled to standard I/O bus 3508 are storage device 3520 and I/O ports 3526. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 3500 perform their conventional functions known in the art. Storage device 3520 is used to provide permanent storage for the data and programming instructions to perform the above described functions implemented in the system controller, whereas system memory 3514 (e.g., DRAM) is used to provide temporary storage for the data and programming instructions when executed by processor 3502. I/O ports 3526 are one or more serial and/or parallel communication ports used to provide communication between additional peripheral devices, which may be coupled to hardware system 3500. For example, one I/O port 3526 may be a PCI interface to which an FPGA implementation of the pattern recognition system hardware 110 is operably connected.

Hardware system 3500 may include a variety of system architectures, and various components of hardware system 3500 may be rearranged. For example, cache 3504 may be on-chip with processor 3502. Alternatively, cache 3504 and processor 3502 may be packed together as a "processor module," with processor 3502 being referred to as the "processor core." Furthermore, certain implementations of the claimed embodiments may not require nor include all of the above components. For example, storage device 3520 may not be used in some systems. Additionally, the peripheral devices shown coupled to standard I/O bus 3508 may be coupled instead to high performance I/O bus 3506. In addition, in some implementations only a single bus may exist with the components of hardware system 3500 being coupled to the single bus. Furthermore, additional components may be included in system 3500, such as additional processors, storage devices, or memories.

As noted above in connection with FIG. 33, there is a series of application and driver software routines run by hardware system 3500. These software routines comprise a plurality or series of instructions to be executed by a processor in a hardware system, such as processor 3502. Initially, the series of instructions are stored on a storage device, such as storage device 3520. However, the series of instructions can be stored on any conventional storage medium, such as a diskette, CD-ROM, ROM, EEPROM, flash memory, etc. Furthermore, the series of instructions need not be stored locally, and could be received from a remote storage device, such as a server on a network. The instructions are copied from the storage device, such as storage device 3520, into memory 3514 and then accessed and executed by processor 3502.

An operating system manages and controls the operation of hardware system 3500, including the input and output of data to and from software applications (not shown). The operating system and device drivers provide an interface between the software applications being executed on the system and the hardware components of the system. According to one embodiment of the described embodiments, the operating system is the LINUX operating system. However, the described embodiments may be used with other conventional operating systems, such as the Microsoft Windows® family of operating systems operating system, available from Microsoft Corporation of Redmond, Wash. Apple Macintosh Operating System, available from Apple Computer Inc. of Cupertino, Calif., UNIX operating systems, and the like. In addition, real-time OSes (RTOSes) used in machine control and embedded systems may also be used in some implementations, examples including QNX and Windows CE. Of course, other implementations are possible. For example, the functionality of the pattern recognition system may be implemented by a plurality of server blades communicating over a backplane in a parallel, distributed processing architecture. The embodiments discussed in this disclosure, however, are meant solely as examples, rather than an exhaustive set of possible implementations.

F2. Distributed Computing Architecture

The pattern recognition system can be implemented as a multi-tenant system on a computer system with a plurality of processing units and memories distributed over a computer network, wherein the network may include intranet on LAN and/or the Internet. In some embodiments, the distributed computing architecture involves a "cloud," which is a collection of computer systems available over a computer network for computation and data storage. In some embodiments, one or more users belonging to each tenant organization or entity can access the pattern recognition system on computers distributed over an intranet and/or the Internet.

Figure 36:
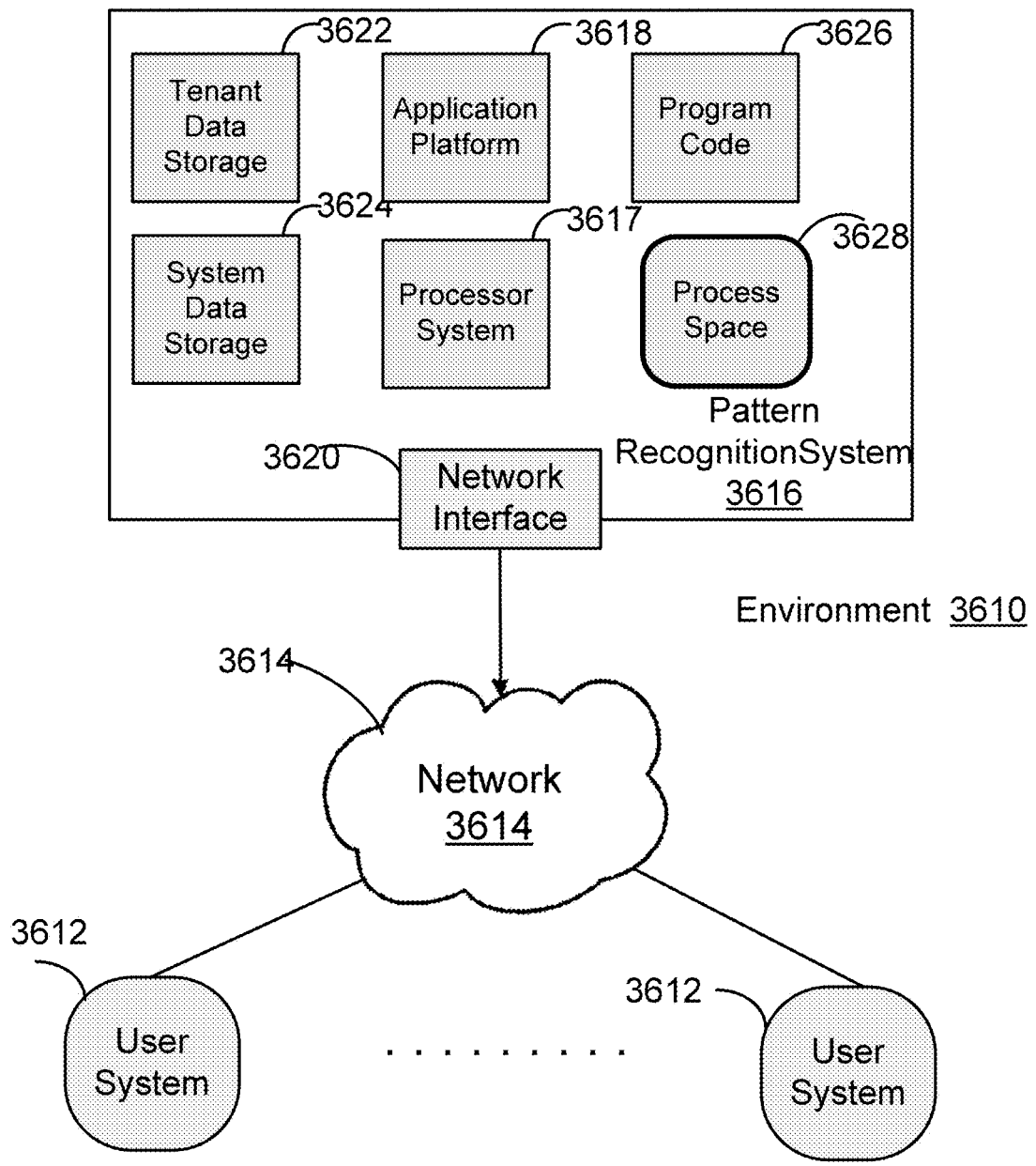
FIGS. 36, 37, and 38 are schematic diagrams illustrating examples of computing system architecture distributed over networks according to some implementations.

FIG. 36 shows a block diagram of an example of an environment 3610 in which a pattern recognition system can be used according to some implementations. In one implementation as illustrated in FIG. 36, the environment 3610 may include user systems 3612, network 3614, pattern recognition system 3616, processor system 3617, application platform 3618, network interface 3620, tenant data storage 3622, system data storage 3624, program code 3626, and process space 3628. In other implementations, environment 3610 may not have all of these components. In some implementations, environment 3610 may have additional components not shown in FIG. 36.

The pattern recognition system 3616 exists in environment 3610. The pattern recognition system 3616 is connected to user systems 3612 via network 3614. The pattern recognition system 3616 may be implemented with system architecture as described above. The pattern recognition system 3616 communicates with other devices on the network 3314 using a network interface 3620. Though not shown in FIG. 36, the user systems 3312 may also communicate through a network interface.

The pattern recognition system may be implemented in the network environment 3610 as an on-demand system, such that a user accessing the pattern recognition 3616 system remotely from user systems 3612 does not need to elevate any resources for building and/or maintaining the pattern recognition system 3616. Instead, the user may simply initiate a request on the user system 3612 to remotely access the pattern recognition system 3616 on a remote server through the network 3614.

A computer network 3614 is a telecommunications network that allows computers to exchange data. The connections (network links) between networked computing devices (network nodes) are established using either cable media or wireless media. In some embodiments, the network 3614 includes the Internet. The Internet is a global system of interconnected computer networks that use the standard Internet protocol suite (TCP/IP) to serve several users worldwide. It is a network of networks that consists of private, public, academic, business, and government networks, that are linked by a broad array of electronic, wireless and optical networking technologies. In some embodiments, network 3314 also includes an intranet, which is a computer network that uses Internet Protocol technology to share information, operational systems, or computing services within an organization.

User systems 3612 can communicate with pattern recognition system 3616 using TCP/IP or other network protocols. In an example where HTTP is used, user system 3612 might include an HTTP client, i.e. a browser, for sending and receiving HTTP signals to and from an HTTP server at system 3616. In some implementations, the network interface 3620 between pattern recognition system 3616 and network 3614 includes load sharing functionality to balance loads and distribute incoming HTTP requests over multiple servers.

In some implementations, pattern recognition system 3616 may provide access to multiple tenants, which are organizations having one or more user systems 3612. In these implementations, the pattern recognition system 3616 is multitenant pattern recognition system (MTS). The MTS stores data from different tenants on the tenant data storage 3622.

In some embodiments, distributed storage architecture may be implemented, so that a database may be divided into parts stored in different databases or at different devices. The database objects described herein can be implemented as a single database, a distributed database, a collection of distributed databases, a database with redundant online or offline backups or other redundancies.

In some embodiments, data associated with different tenants are stored separately, either on separate physical storage devices, or on separate databases on the same physical storage device. In some embodiments, data are stored separately in different database instances, different schema of the same database, different tables within the same schema, etc., such that the data from different tenants are not comingled. In other embodiments, data associated with different users of the same tenant are stored separately in ways described above.

Figure 37:
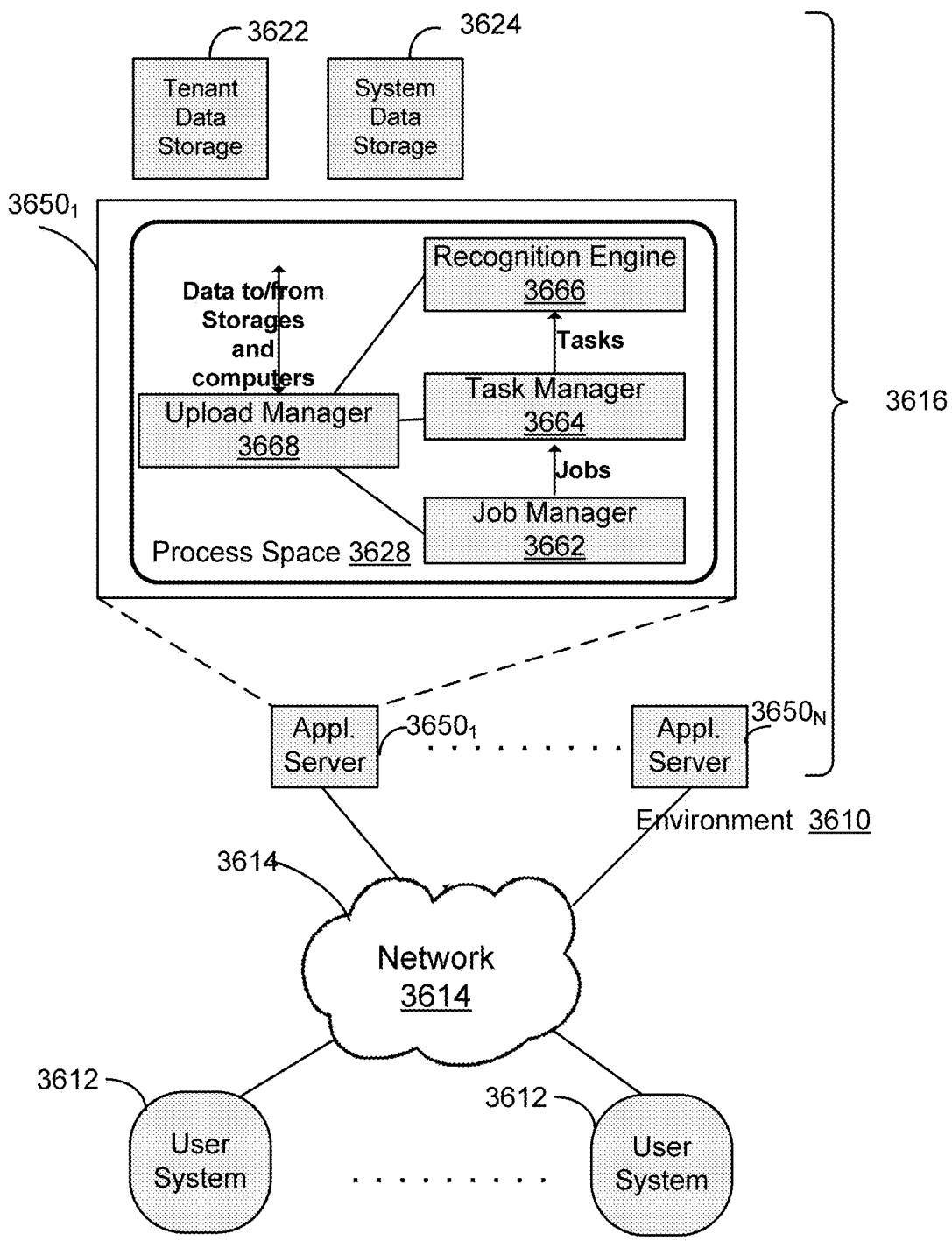

In some embodiments, the pattern recognition system 3616 includes two or more MTS implemented as two or more application servers 3650 as shown in FIG. 37. The MTS may be located in close proximity to one another (e.g., in a single building or geographical area), or they may be distributed at locations remote from one another (e.g., in different cities). As used herein, each MTS could include one or more logically and/or physically connected servers distributed locally or across one or more geographic locations.

Each user system 3612 may be implemented by various computing devices including but not limited to a personal computer, workstation, portable computer, smart phone, tablet, PDA, or any other suitable computing devices with network connection.

FIG. 37 is a diagram of the pattern recognition system 3716 comprising two or more application servers $3750_1$-$3650_N$. In some embodiments, numbers of servers used can be increased or decreased based on the load of jobs being handled. Each application server 3650 may be configured to communicate with tenant data storage 3622 and the tenant data therein, and system data storage 3624 and the system data therein to serve requests of user systems 3612. In some embodiments, the application servers 3650, tenant data storage 3622, system data storage 3624, and user system 3612 are connected through network 3614, which may be LAN or the Internet using one or more of the network protocols described above.

In the example illustrated by FIG. 37, application server $3650_1$ includes a process space 3628. In some embodiments, the process space 3628 includes job manager 3662, which receives user requests relating to processing and recognition of input vectors. Job manager 3626 converts the user requests into specific jobs and sends them to an appropriate task manager 3664. The task manager 3664 processes jobs to create various tasks, which then sends the tasks to a recognition engine 3666. The job manager 3662, task manager 3664, and recognition engine 3666 are in communication with an upload manager 3668, which sends data to and/or from storage units and computers through network of various types discussed above, including the Internet and/or intranet.

Figure 38:
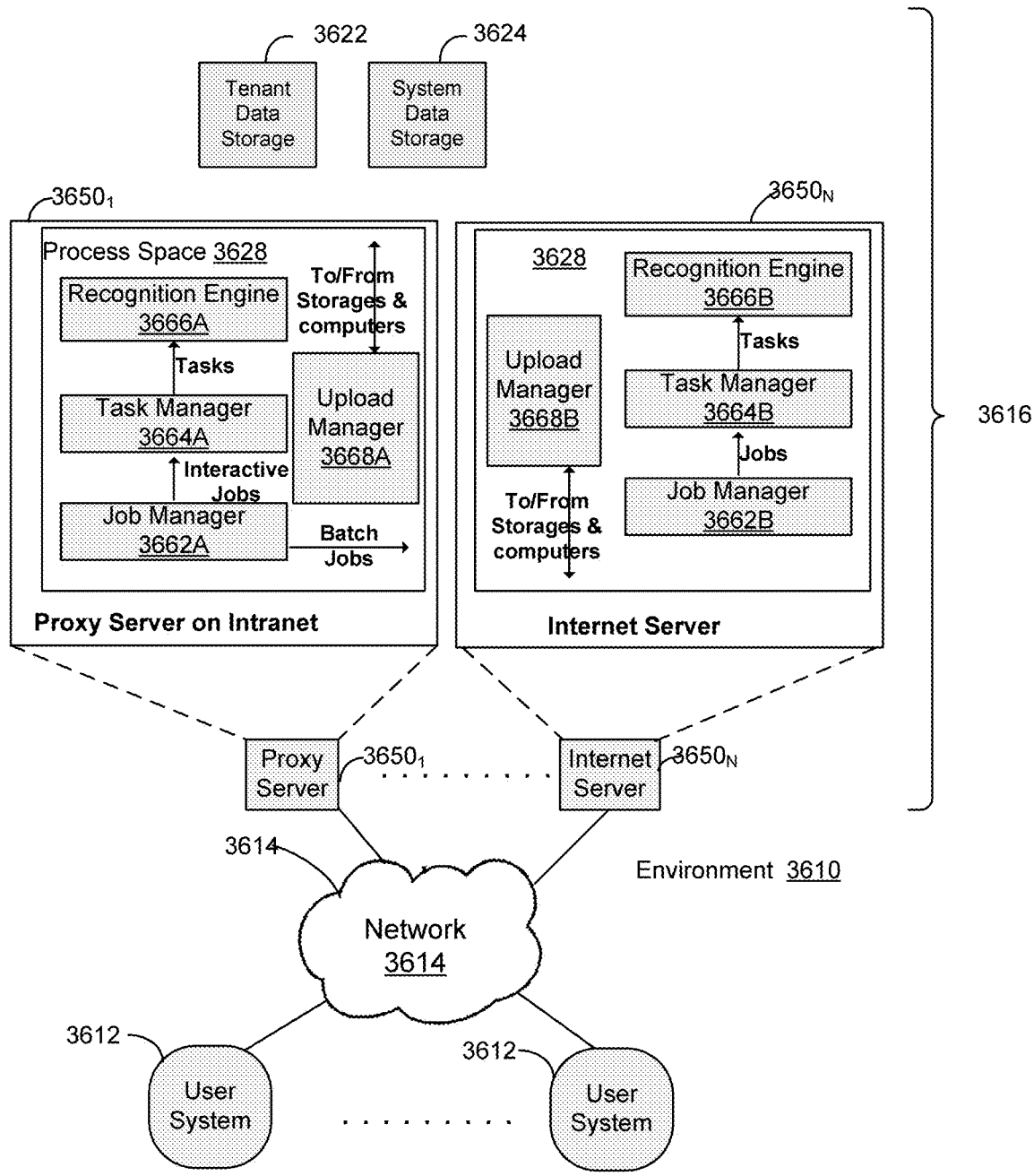

FIG. 38 is a diagram of the pattern recognition system illustrating details of application server $3650_1$ as a proxy server connected to user systems via LAN and a remote server $3650_N$ connected to user systems via the Internet. The proxy server and the Internet server have similar process space 3628 as described in FIG. 37. In some embodiments, the proxy server $3650_1$ processes interactive jobs that require immediate interaction between the server and the user. Such jobs include supervised learning and training, template set up, etc. In contrast, the Internet server $3650_N$ processes batch jobs that require low interaction with the user but high computing power. The process space 3628 of the proxy server $3650_1$ includes the job manager 3662A, which receives user requests relating to processing and recognition of input vectors. The job manager 3662A converts the user requests into specific jobs and sends interactive jobs to task manager 3664A and routes batch jobs requiring lower level of interaction and higher computational power to the Internet Server $3650_N$. The task manager 3664A processes jobs to create various tasks, which then sends the tasks to a recognition engine 3666A. The job manager 3662A, task manager 3664A, and recognition engine 3666A are in communication with an upload manager 3668A, which sends data to and/or from storage units and other computers through LAN, and optionally through the Internet as well. The upload manager 3668B receives batch jobs from the proxy server's job manager 3662A. In some embodiments, the upload manager 3668B exchanges information to/from storages or other computers. The job manager 3662B of the Internet Server $3650_N$ sends batch jobs to the task manager 3664B, which then creates batch tasks to be processed by recognition engine 3666B. The pattern recognition system 3616 shown in FIG. 38 efficiently distributes different kinds of tasks between a proxy server near the user and an Internet server having batch processing power.

In some implementations, the system 3616 comprises one or more job routers that are configured to route jobs submitted to the proxy server on a LAN to another server on the intranet or internet. In some embodiments, user system 3612 can submit a job to the proxy server $3650_1$ and the proxy server's job manager 3662A decides if the job is to run in the local server $3650_1$ or to be routed to the Internet Server $3650_N$. In some embodiments, such job routing can be implemented as a separate mechanism (not shown in the diagram).

In some implementations of the invention, the pattern recognition system receives and processes input data from sensors distributed over a computer network. In some implementations, the pattern recognition system stores and distributes the knowledge map, the partition configuration, or the processing template over a computer network.

In some implementations, the pattern recognition system is configured to channelize data by sending multichannel data to a plurality of processing units. The data of each channel is sent along with a processing template to an individual processing unit for recognition or learning operations.

In a distributed computing architecture, a pattern recognition system can perform recognition operations on a plurality of servers, processors, processor cores, or threads of processes simultaneously in a parallel manner. Under such circumstances, a continuous range of waveform data can be divided into multiple parts for parallel processing. If data are divided in ways that break up a pattern of interest into multiple files, the pattern of interest may be missed by the pattern recognition operations. To avoid this problem, some implementations of the pattern recognition systems and methods disclosed herein provide mechanisms to detect milestones in the waveform data that likely do not coincide with patterns of interest. The pattern recognition systems and methods can divide waveform data at the milestones to generate multiple data files to be distributed to different processes. For instance, in some implementations involving ECG amplitude vs. time data, a milestone can include a continuous range of data having an amplitude range smaller than 5% of the maximum range of amplitude or a slope range of −0.05 to +0.05 over a specified time duration. Various other criteria may also be used to detect milestones, such as quantities indicating statistical regularity of data.

In some implementations, the pattern recognition system comprises a plurality of processing units distributed over a computer network, and the logic of the system is configured to: detect milestones in input data from which an input vector is derived; divide the input data at the milestones into multiple files; send the multiple files along with a processing template comprising a processing chain to multiple processing units distributed over a computer network for a pattern recognition operation. In preferred embodiments, the milestones are located outside of a pattern of interest and/or a feature to be extracted by the pattern recognition operation. In some embodiments, the system is configured to assemble results of the operation on the multiple processing units, and process data near the milestones looking for any potential missed patterns and/or patterns of patterns.

In some embodiments, the pattern recognition system is configured to provide meta-data describing the channelization and milestones. In some embodiments, input data can be restricted and associated meta-data can be defined such that it is easy to "seek" data at a given point in time, a marker or a milestone. This makes an interactive job efficient as the user is fast-forwarding or rewinding on input data.

In some embodiments, the pattern recognition system determines the milestones based on the processes to be applied to the input data or the input vector, which processes include one or more of the following: filtering, feature extraction, and region of search.

In some embodiments in a distributed computing environment, a user can request a virtual machine (VM) from a cloud, the VM including the pattern recognition engine. In some embodiments, the pattern recognition system can provision a VM based on the user request. In some embodiments a VM may exist in a previously stored VM image, which can be stored in an image repository. The pattern recognition system can search and transfer the image to a server or a user system. The system can then boot the image on the server or user system.

A VM is a software-based emulation of a computer. Virtual machines may be based on specifications of a hypothetical computer or emulate the computer architecture and functions of a real world computer. The structure and functions of VMs are well known in the art. Typically, a VM is installed on a host platform that includes system hardware, and the VM itself includes virtual system hardware and guest software.

The host system hardware for a VM includes one or more Central Processing Units (CPUs), memory, one or more hard disks and various other devices. The VM's virtual system hardware includes one or more virtual CPUs, virtual memory, one or more virtual hard disks and one or more virtual devices. The VM's guest software includes guest system software and guest applications. In some implementations, guest system software includes a guest operating system with drivers for virtual devices. In some implementations herein for pattern recognition systems, the VM's guest applications include at least one instance of a pattern recognition engine as described above.

G. Implementation Using Programmable Logic Circuit

As indicated above, the pattern recognition engine can be implemented as software on a standard processor or in connection with a semiconductor circuit including a programmable logic circuit, such as a field programmable gate array. In such an implementation, a driver layer (see FIG. 33, above) allows an application to pass commands (e.g., learn, recognize, etc.) to the FPGA, which implements the pattern recognition engine that maintains the knowledge maps and partitions. The benefits of the semiconductor version is the speed of pattern identification for larger knowledge maps (real-time or near real-time) and to off load the host processor. Also in some cases the semiconductor implementation can be used for embedded applications where a standard processor could not. In some embodiments, commercial off-the-shelf hardware like NVIDIA's parallel computation architecture CUDA™ cores may be deployed as array and image processing engines for operations normally performed by the FPGA.

In one possible FPGA implementation, the pattern recognition engine is installed on a printed circuit board or PCB (which will normally be connected via an interconnect bus, e.g., PCI, PCI-Express, etc.). In one implementation, the FPGA unit is operative to receive an input or test vector, and return an identifier corresponding to a matching knowledge element or a category (and possibly opaque user data) associated with the matching knowledge element. In one implementation, each FPGA pattern recognition unit is a PCI device connected to a PCI bus of a host system.

Sensor reading or polling, sensor data processing and feature extraction operations could be offloaded to a co-processor or developed as an FPGA (or other programmable logic circuit) implementation and installed on a programmable logic circuit. Feature extraction is discussed above. Sensor data processing may involve one or more operations performed prior to feature extraction to condition the data set prior to feature extraction, such as pixel smoothing, peak shaving, frequency analysis, de-aliasing, and the like.

Furthermore, as discussed above, the comparison techniques (RBF, KNN, etc.), distance calculation algorithms ($L_1$, $L_{sup}$, Euclidian, etc.) can be user configurable and plugged in at runtime. In one programmable logic circuit implementation, the selected pluggable algorithms can be stored as a set of FPGA instructions (developed using VERILOG or other suitable SDK) and dynamically loaded into one or more logic units.

Figure 39:
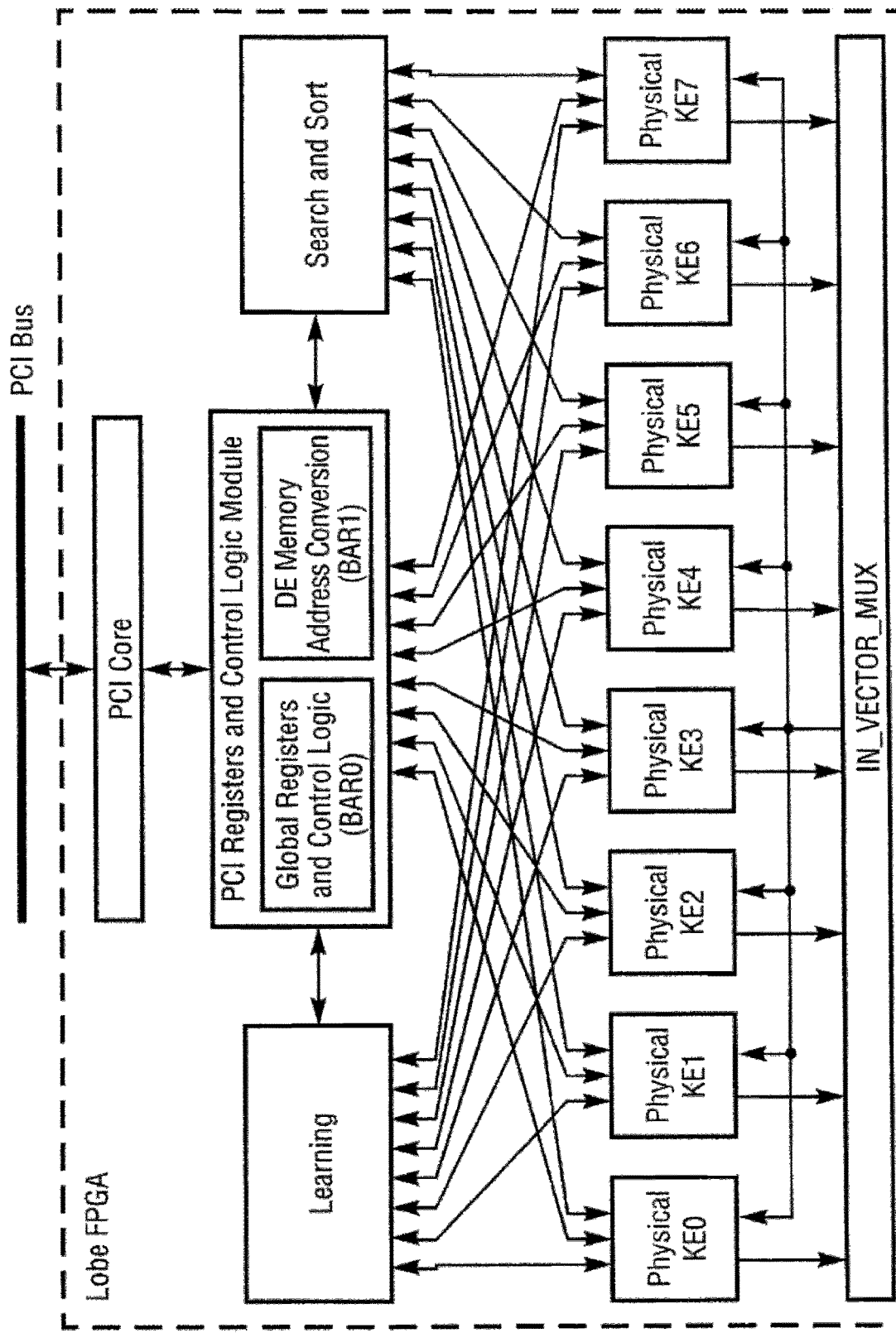
FIG. 39 is a schematic diagram showing an example programmable logic circuit according to one implementation of the invention.

FIG. 39 below shows such an implementation. In this implementation, a Xilinx Spartan-3 family xc3s400 FPGA is configured to implement eight (8) physical knowledge element (KE) engines which interface with block memory to implement the total knowledge element count for the various vector widths. In this regard, the pattern recognition system could incorporate multiple FPGAs, similar to the FPGA described above, and control logic, possibly embodied in hardware or software, to coordinate operation of the multiple FPGAs.

The PCI Registers and control logic module includes registers that are used to configure the chip, and return the status of the chip. The module, in one implementation, includes a memory space for storing data (such as knowledge maps) and configuration information (such as partition information). In one implementation, the memory space is divided or allocated for different aspects of the pattern recognition system. A first memory space includes a set of registers, used in the learning and recognition phases, for the input vector, status information, configuration information, as well as information on matched knowledge elements (or setting of a newly created knowledge element in a learning operation). The matching knowledge element information can include a knowledge element identifier, an actual influence field, a minimum influence field, knowledge element status information (including whether it fired relative to an input vector), a category identifier, a partition, a distance value, and the like.

A second memory space provides for a knowledge element (KE) memory space, for virtual decision elements, allocated among the physical knowledge element engines. In one implementation, a second memory space is for knowledge element information. In one implementation, this memory space is divided into banks. Each bank is further divided into areas for knowledge element registers, and knowledge element vectors. One to all the banks may also include an area for storing one or more input vectors or portions of input vectors. Each virtual knowledge element, in one implementation, has its own set of registers in the knowledge element register, including for example, knowledge element identifiers, actual influence field, minimum influence field, partition identifier, category identifier, one or more distance field register that indicates the distance between an input vector and the corresponding learned vector of the virtual knowledge element. Each bank of the second memory space also stores the learned vectors for each of the virtual knowledge elements allocated to it. The maximum number of learned vectors and knowledge elements in each bank is determined by the vector width. The control module, in one implementation, provides a memory address conversion for the knowledge element memory, as well as the de-multiplexer for read back. In one implementation, the second memory space also provides for storage of one or more input/test vectors. Of course, the memory space may be divided and arranged in a variety of configurations.

In one implementation, a learning module performs various learning operations, such as scanning all the existing knowledge elements, adjusting the existing knowledge element influence fields, setting category identifiers, finding the minimum distance to different category knowledge elements, and creating a new knowledge element if needed. In one implementation, the learning module can implement the learning functionality described above. The circuit may also include a multiplexer that provides a given test vector to the respective physical knowledge element engines. In one implementation, a physical knowledge element includes logic to compute the distance between a test vector and the learned vectors corresponding to the virtual knowledge elements to which the physical knowledge element has been assigned. In one implementation, each physical knowledge element engine is further operative to search for the minimum computed distance among the virtual knowledge elements to which it has been assigned. In one implementation, each physical knowledge element operates on an input vector to identify an assigned virtual knowledge element having the minimum distance to the input vector. In one implementation, the FPGA is a parallel processor in that the physical knowledge elements operate in parallel. In one implementation, each physical knowledge element computes a distance using an input vector and writes the computed distance to a distance register of the corresponding virtual knowledge element. The logic of the physical knowledge element is operative to return the knowledge element information corresponding to the virtual knowledge element having the minimum distance to the input vector. In one implementation, the control logic is operative to identify the virtual knowledge element having the overall minimum distance identified across the multiple physical knowledge element engines. In one implementation, the pattern recognition system provides results at each interconnect bus cycle. That is, on one interconnect bus clock cycle the input data vector or vectors are loaded across the bus and on the next bus cycle results are ready.

Given this bus clock cycle overhead, 100% parallelism in the knowledge elements is no longer required. Rather the pattern recognition system leverages the limited FPGA resources to implement the virtual knowledge elements. Using a virtual knowledge element approach, a plurality of physical knowledge element engines are implemented in the FPGA, each of which may relate to multiple virtual decision elements. Specific knowledge element contents would be stored in the FPGA memory to allow many hundreds of virtual knowledge elements to be implemented across a lesser number of physical knowledge element engines. These virtual KEs operate in a daisy chain or round-robin approach on the FPGA memory blocks to implement the total KE count coupled with the real, physical knowledge elements that are constructed in the FPGA's gate array area. Each virtual knowledge element has its own influence field. When learning causes a new virtual knowledge element to be allocated, the allocated virtual knowledge element number is returned. When a match occurs in the recognition phase, the firing virtual knowledge element number is returned. A 32-bit register can be implemented in each virtual knowledge element. This register can be written in learning phase. The value will be returned in the recognition phase unchanged. An application has full access to the virtual knowledge element memory space. The application can save the knowledge element network to hard disk and later reload the knowledge element network into the FPGA. The user can modify the knowledge element network according to their special need at any time except while a learning or recognition operation is in process. Through this interface knowledge elements can also be deleted if desired.

Figure 40:
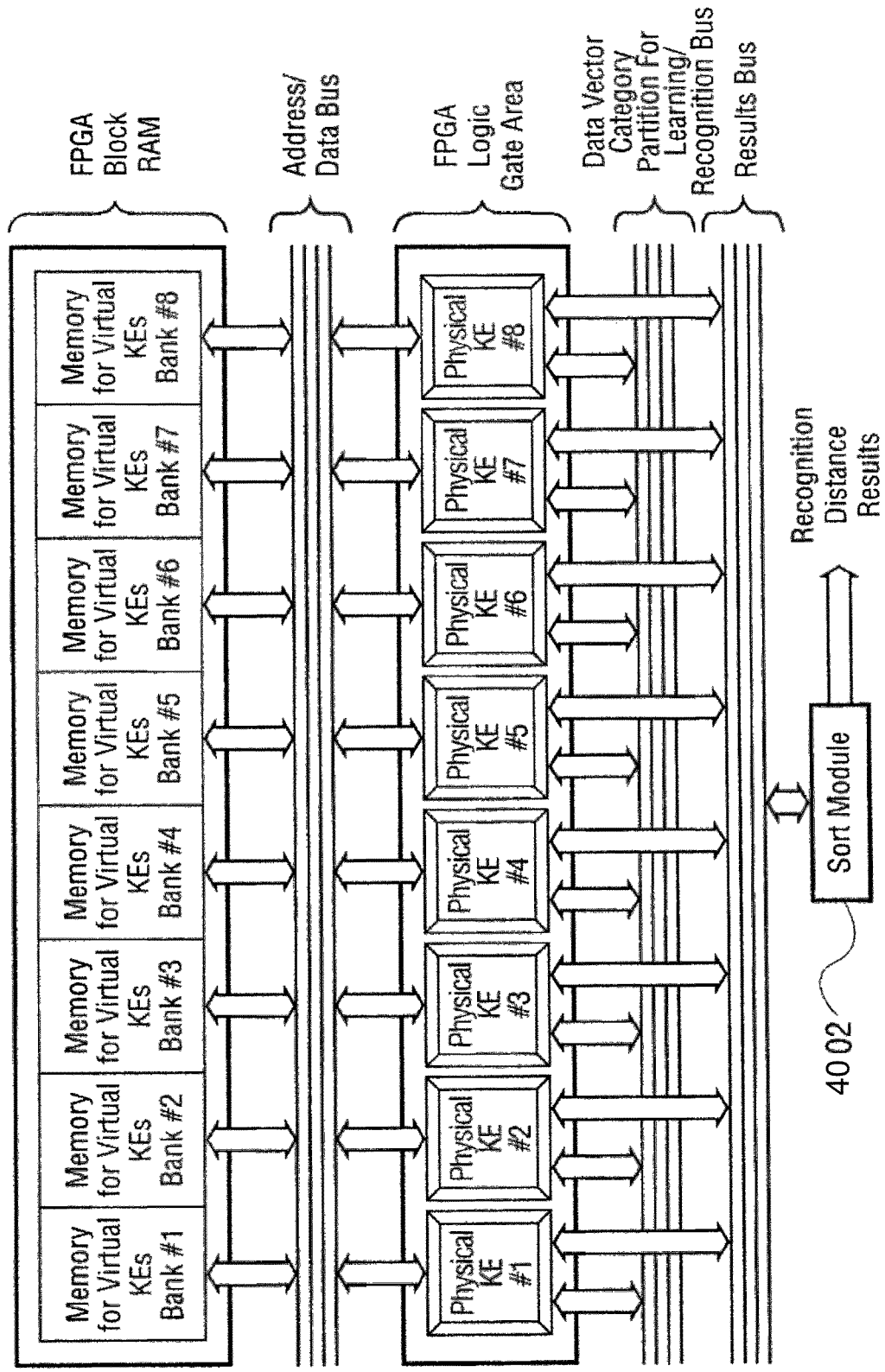
FIG. 40 is a schematic diagram showing an example programmable logic circuit according to one implementation of the invention.

FIG. 40 below shows how these virtual knowledge elements relate to their physical counterparts in one possible FPGA implementation. FIG. 40 depicts a sort module 3702 used in some implementations of the FPGA. In a recognition operation, each physical knowledge element engine (Physical KE) measures the distance of all the matches for the virtual knowledge elements (Virtual KE) that it controls, and rank orders them by distance. This information is made available to a higher level functional circuit which combines the results of the physical knowledge element engines to create the final overall result.

Additionally, in the FPGA implementation, the pattern recognition system can be implemented using a pipeline approach as many data vectors can be loaded in a single interconnect bus clock cycle thus further speeding the overall result time for many data vectors needing identification. That is, the pipeline may increase the effective speed of recognition performed by the FPGA.

Figure 41:
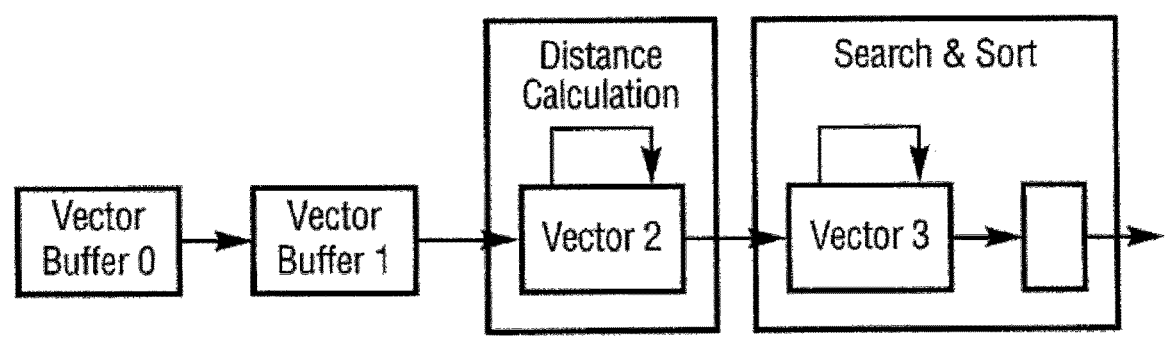
FIGS. 41, 42, 43 and 44 illustrate how an example implementation may process input vectors in a pipelining mechanism.

As shown in FIG. 41, the pipeline has 3 stages: 1) search and sort; 2) distance calculation and 3) vector buffers. Four input vectors can be stored in the FPGA. The vectors are processed first in-first out. When the Buffer Ready flag is set, it means that vector buffer 0 is empty. The user (e.g., the programmer) can write a vector into the FPGA. The input vector written into the FPGA, in one implementation, is written into buffer 0. After the last byte of the vector is written, vector buffer 0 will be locked (not ready). When the next stage is empty, the vector will move forward, and Buffer 0 will be empty (ready) again. Writing a vector into the FPGA while buffer 0 is not ready will cause an error. Setting NEXT_VECTOR flag will push the vector at the search and sort stage out of the pipeline. The other vectors in the pipeline will move forward.

The RESET flag can be used to remove all the vectors in the FPGA. With this mechanism, two vectors can be processed at same time, where a distance calculation is performed relative to one input vector, while a search and sort operation can be performed relative to a second input vector. In addition, while waiting for the result, software can write other vectors into the FPGA. In addition, while waiting for the minimum distance to be read out, a next minimum distance can be searched.

Figure 42:
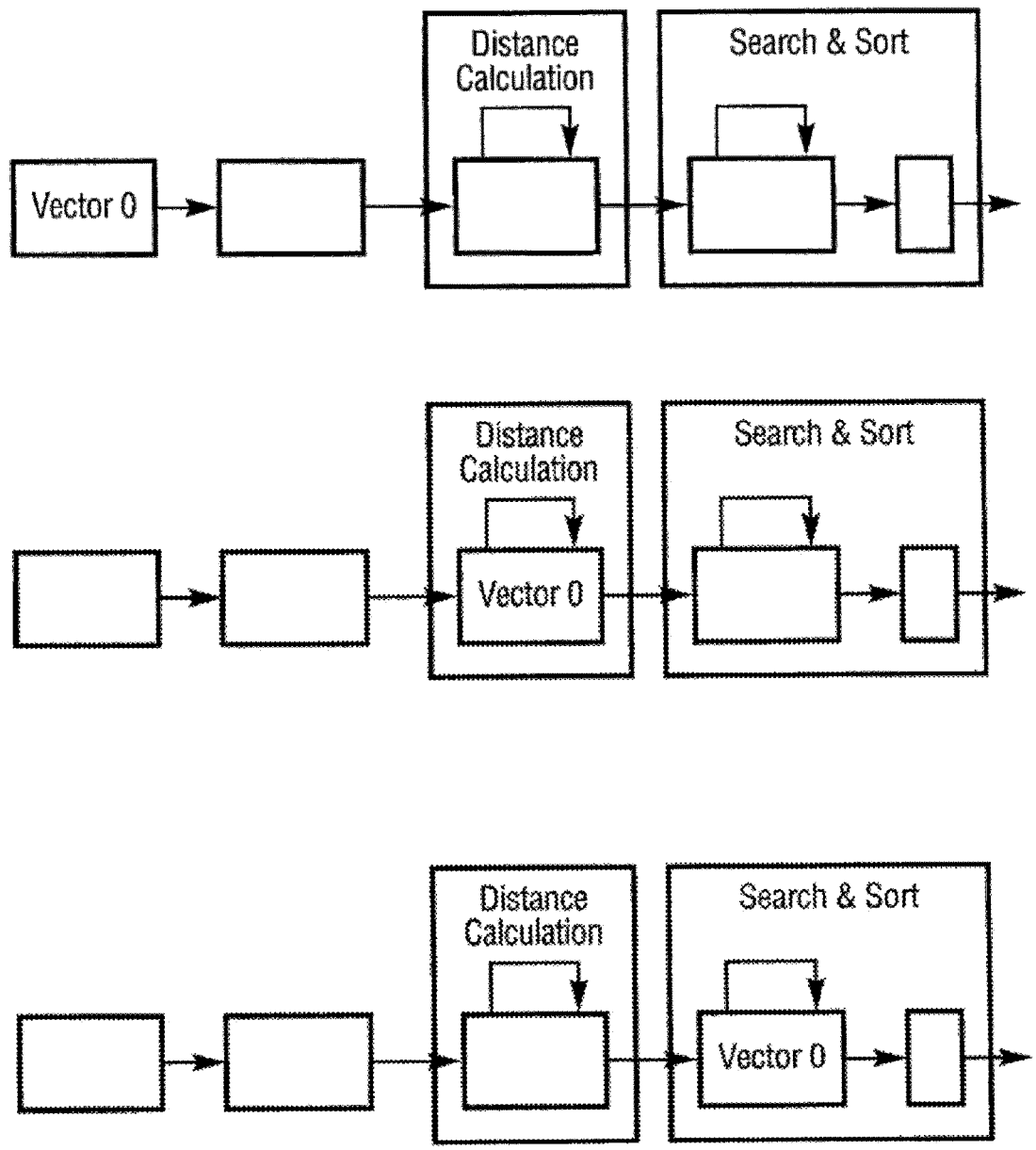

For the application software, reading results and writing vectors can be performed in two separate threads. When the Buffer Ready is set, the application can write a vector into the FPGA. When the Ready flag is set, the application can read the result out. Read knowledge element number and distance will trigger hardware to search for the next matched knowledge element. To process the next vector, the application can set the NEXT_VECTOR flag. The first input vector just flows through to the end and sets the status flag when the results are ready. This is shown in FIG. 42.

Figure 43:
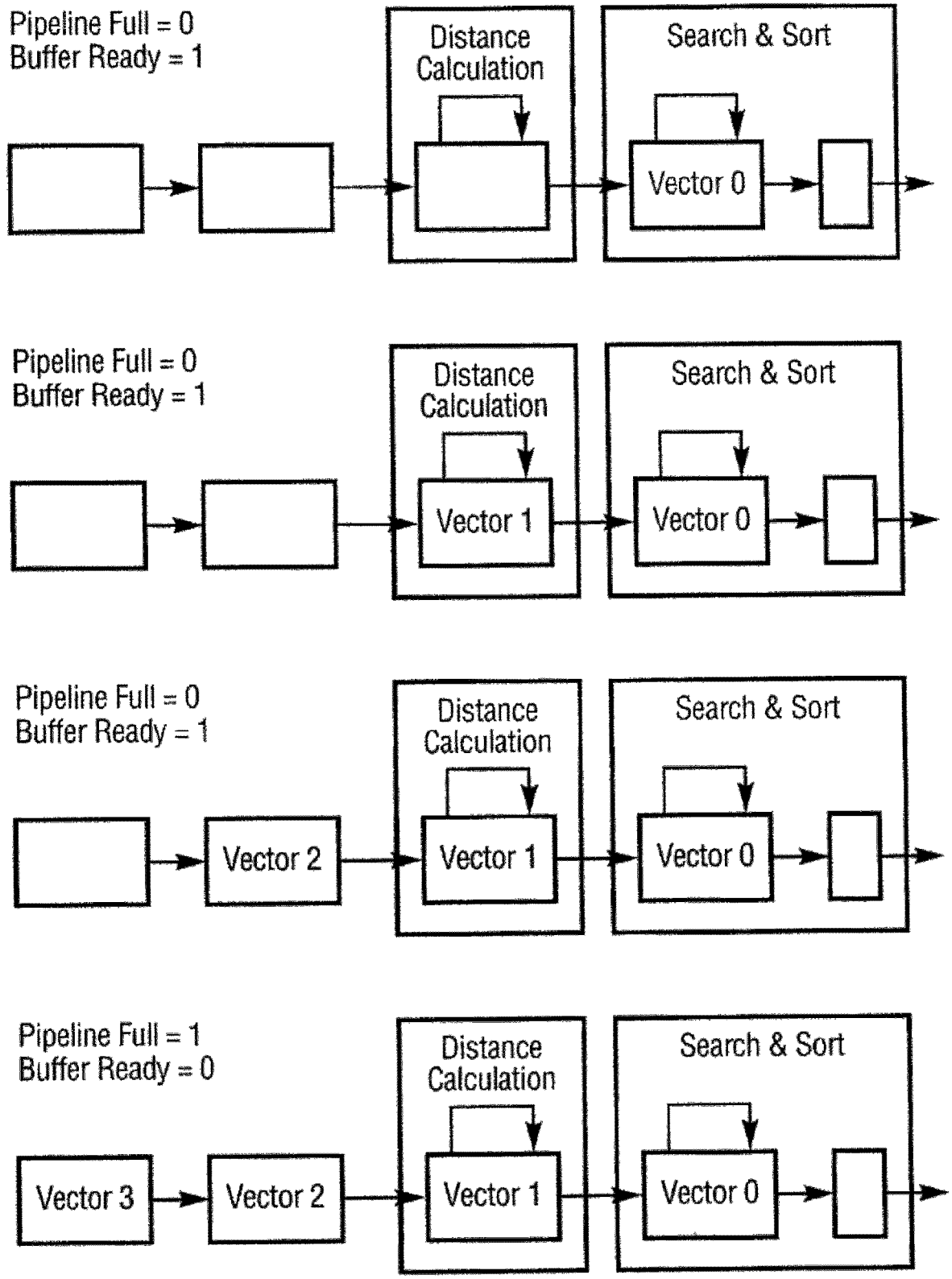

When the application needs to process vectors one by one, the user can write the vector in, and wait for the result. After this vector has been processed, the application can set the NEXT_VECTOR flag to remove this vector from the pipeline, and then write the next vector in. The next vector will flow through to the end just like the first vector. If the user doesn't set the NEXT_VECTOR flag to remove the front end vector, the second input vector will flow through to the distance calculation stage, and the third vector will wait in the vector buffer 1. They will not push the first vector out, as illustrated in FIG. 43.

Figure 44:
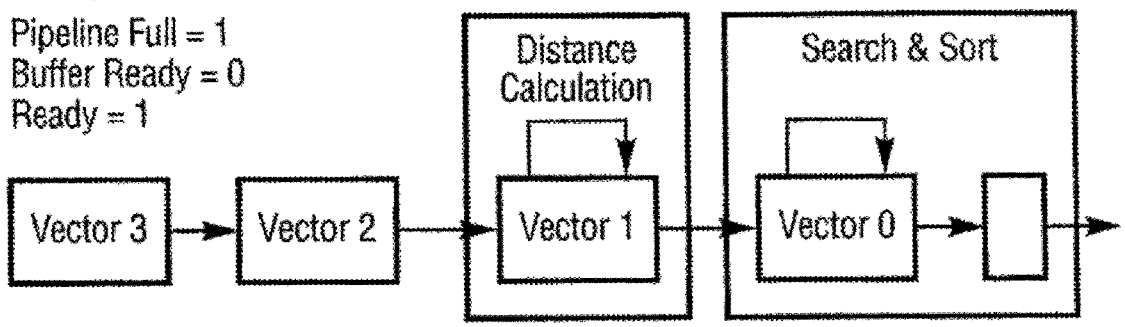
Figure 44:
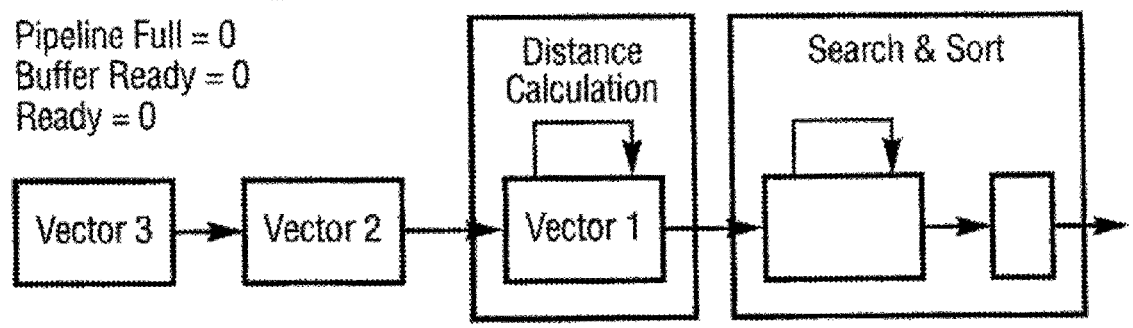
Figure 44:
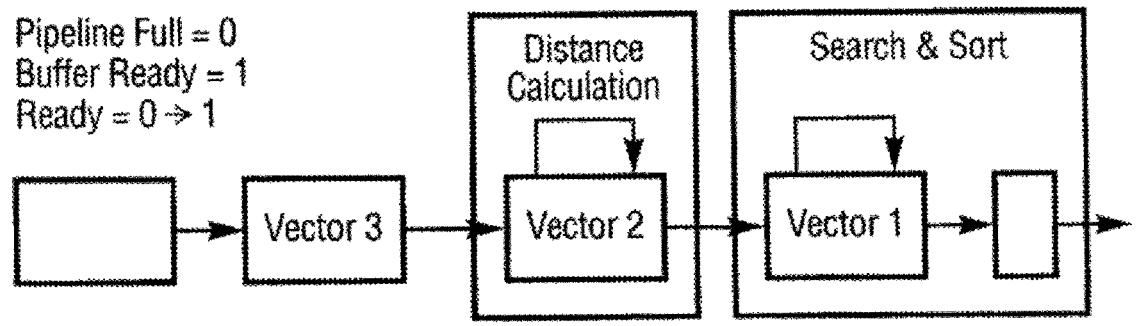

When the pipeline is full, the application sets the NEXT_CONFIG flag to remove the front end vector out of the pipeline before writing another vector in. All the other vectors will move forward. For example, as shown in FIG. 44, vector 0 will be pushed out, vector 1 will move into search and sort stage, the vector in buffer 1 will move to the distance calculation stage. Buffer 0 will be empty. The Buffer Ready flag will be set again.

To recapitulate with respect to pipelining, vectors can be written into the vector buffer when vector buffer is empty. When the distance calculation stage is free, the vector in the vector buffer 1 will be moved forward, and vector buffer 1 will be left free for next vector. When the distance calculation is finished, and the search & sort stage is free, the vector will be moved forward (actually it will be discarded). The minimum distance will be searched, and copied to the output buffer. Next the minimum distance will be searched while waiting for the minimum distance to be read. The vector at Search & Sort stage will be discarded when software writes another vector into the FPGA.

As is relevant to the partitions discussed above, given the structure of the FPGA block RAM according to one possible implementation, four different vector widths (32/64/128/256-bytes) can be supported, which in turn, result in four different virtual KE counts (672/400/224/112). Thus, an application can choose the width and count most appropriate to the task at hand. Of course, other FPGA implementation may allow for different vector widths.

Finally, physical knowledge elements might be loaded with different distance calculation algorithms for different requirements. Thus, the FPGA can be configured to allow all physical knowledge elements to use the same recognition math or algorithm. Alternatively, each physical knowledge element can be configured to use a different math, e.g., $L_1$ or $L_{sup}$. Or further still, the math for the physical knowledge elements can be swapped in/out based on the partition chosen for pattern identification and the partition's associated "math" requirements.

While a number of exemplary aspects and embodiments have been discussed above, those of skill in the art will recognize certain modifications, permutations, additions and sub-combinations thereof. It is therefore intended that the scope of the invention includes all such modifications, permutations, additions and sub-combinations. For example, the use of virtual knowledge elements in connection with physical engines can be implemented in other programmable logic circuits and in application specific integrated circuits (ASICs). An additional example would be where external memories (host based or local to the pattern recognition machine) are used to supplement the FPGA or ASIC "on-chip" memory to provide for larger numbers of knowledge elements. It is therefore not intended that the invention be limited except as indicated by the appended claims.

What is claimed is:

1. A pattern recognition system comprising:
  one or more memories configured to maintain a knowledge element array; and logic configured to:
  present a graphical user interface (GUI) in which waveform data are depicted, the waveform data being a digital representation of a waveform;
  provide a tool accessible via the GUI by which a user may graphically select portions of the waveform data;
  receive input representing use of the tool in the GUI to graphically select a portion of the waveform data having a pattern of interest;
  responsive to the input, automatically extract one or more waveform characteristics from the portion of the waveform data;
  create a pattern definition based on the one or more waveform characteristics; generate one or more knowledge elements based on the pattern definition for inclusion in the knowledge element array, each knowledge element comprising i) one or more operands collectively defining a data vector representing the pattern of interest and ii) a category identifier;
  define a region of search relative to an occurrence in the waveform data of at least one of the waveform characteristics, each occurrence of the region of search representing a data range within the waveform data in which to search for the pattern of interest;
  identify a dithered pattern that falls entirely outside the region of search;
  generate a dithered knowledge element based on the dithered pattern;
  identify an occurrence of the region of search based on a corresponding occurrence of the at least one of the waveform characteristics;
  select a portion of the waveform data based on the occurrence of the region of search;
  generate input vectors from the portion of the waveform data;
  search for the pattern of interest by performing a pattern recognition operation on the input vectors generated from the portion of the waveform data by comparing the input vectors to the one or more knowledge elements of the knowledge element array, and by comparing the input vectors to the dithered knowledge element, wherein one or more portions of the waveform data are excluded from the pattern recognition operation based on the occurrence of the region of search;
  identify an occurrence of the pattern of interest based on the pattern recognition operation; and
  present a representation of the identified occurrence of the pattern of interest in the GUI.

2. The pattern recognition system of claim 1, wherein the logic is further configured to define the region of search by: creating a marker definition for a marker, wherein each occurrence of the marker provides a reference for a corresponding occurrence of the region of search.

3. The pattern recognition system of claim 2, wherein the range of waveform data represented by each occurrence of the region of search is defined by two consecutive occurrences of the marker.

4. The pattern recognition system of claim 2, wherein the logic is configured to prevent detection of an occurrence of the marker in a user definable suppression interval.

5. The pattern recognition system of claim 2, wherein the logic is configured to prevent detection of a new occurrence of the marker with reference to a user definable hysteresis threshold.

6. The pattern recognition system of claim 1, wherein the logic is configured to perform the pattern recognition operation by determining a match between each of the input vectors and the one or more knowledge elements of the knowledge element array if the input vector falls in any influence fields of the one or more knowledge elements.

7. The pattern recognition system of claim 1, wherein the logic is further configured to generate a new knowledge element corresponding to a first input vector, store the new knowledge element in the knowledge element array, and adjust one or more influence fields of other knowledge elements where the first input vector is not recognized by the recognition operation.

8. The pattern recognition system of claim 1, wherein the logic is further configured to adjust one or more influence fields of the knowledge elements, where a first input vector does not represent the pattern of interest.

9. The pattern recognition system of claim 1, wherein the logic is further configured to obtain one or more measurements from the occurrence of the pattern of interest identified in the pattern recognition operation.

10. The pattern recognition system of claim 9, wherein the logic is further configured to present the obtained measurements in the GUI.

11. The pattern recognition system of claim 1, wherein the one or more waveform characteristics comprise one or more of the following: peak amplitude derived from polynomial fit, sample count, pattern mean, median, standard deviation, minimum, maximum, slopes, pattern polynomial fit intercepts with baseline polynomial fit, maximum curvature elbows and widths at various relative amplitudes, QT interval, RR interval, RT interval, field potential duration, T wave peak amplitude, R wave peak amplitude, and total spike amplitude.

12. The pattern recognition system of claim 1, wherein the logic is further configured to perform the pattern recognition operation by:
  initially performing a macro-search that compares macro-search input vectors to a first knowledge element of the one or more knowledge elements and one or more additional knowledge elements of the knowledge element array; and
  if a first one of the macro-search input vectors matches one of the additional knowledge elements, performing a micro-search that compares micro-search input vectors to only the first knowledge element;
  wherein
  the micro-search input vectors are derived from a range of the test data defined with reference to a range from which the first one of the macro-search input vectors is derived, and
  the micro-search uses a smaller step size than the macro-search.

13. The pattern recognition system of claim 12, wherein the logic is further configured to perform the pattern recognition operation by recognizing the occurrence of the pattern of interest when one of the micro-search input vector falls within an influence field of the one or more knowledge elements.

14. The pattern recognition system of claim 13, wherein the logic is further configured to generate a new knowledge element corresponding to a first one of the micro-search input vectors and adjust one or more influence fields of one or more other knowledge elements where the first micro-search input vector is not recognized by the pattern recognition operation.

15. The pattern recognition system of 14, wherein the logic is further configured to adjust one or more influence fields of one or more of the knowledge elements where a second one of the micro-search input vectors does not represent the pattern of interest.

16. The pattern recognition system of claim 1, wherein the waveform data are derived from a first channel of a multi-channel system, and wherein the logic is further configured to:
  in response to identification of the occurrence of the pattern of interest, process corresponding data associated with a second channel of the multichannel system.

17. The pattern recognition system of claim 16, wherein the logic is further configured for processing data corresponding to different data types.

18. The pattern recognition system of claim 17, wherein the logic is further configured to process data corresponding to data of one or more of the following types: biological, financial, marketing, machine control, industrial control system, software system, economic, epidemiological, audio, sonographic, electro-magnetic, radiographic, radiological, chromatographic, agricultural, astronomic, atmospheric, oceanographic, geologic, and geophysical data.

19. The pattern recognition system of claim 17, wherein the different data types are derived from a plurality of different sensor types.

20. The pattern recognition system of claim 17 wherein the plurality of different data types comprise any of image data, video data, audio data, waveform data, chemical data, text data, temperature data, or biological data.

21. The pattern recognition system of any of claim 16, wherein the logic is configured to process input vectors corresponding to data of one or more of the following: electrocardiogram (ECG), electroencephalogram (EEG), multielectrode array, electromyogram (EMG), mechano-myogram (MMG), muscle tonus, muscle spasimus, electrooculograph (EOG), pressure and volume change (plethysmography), galvanic skin response, magnetoencephalogram (MEG), polymerase chain reaction, gas exchange, nutrient absorption, salt and chemical concentrations inside/outside cells, chemical exchange in media/reagents, ion exchange across ion channels, temperature, blood pressure, hydraulic pressure and water concentration, cell adhesion, cytometry, fluorescent signals, optogenetic signals, radionucleotide marker uptake/decay, functional and structural magnetic resonance imaging, and patterns of signals based on sensing diffusion in media (solid, liquid, gas, and plasma) and across osmotic membranes.

22. The pattern recognition system of claim 1, wherein, prior to performing the pattern recognition operation on the input vectors, the logic is further configured to:
  create a processing template comprising a processing chain, and
  apply the processing template by using at least part of the processing chain to process the waveform data to derive each input vector.

23. The pattern recognition system of claim 22, wherein the logic is further configured to store and reuse the processing template.

24. The pattern recognition system of claim 22, wherein the processing template comprises a channel filter for filtering data from one or more channels of multichannel data.

25. The pattern recognition system of claim 22, wherein the processing template comprises a global filter for filtering data from all channels of multichannel data including multielectrode array data.

26. The pattern recognition system of claim 22, wherein the processing template comprises one or more feature extraction processes configured to extract the one or more waveform characteristics from the waveform data.

27. The pattern recognition system of claim 16, wherein the logic is configured to process the corresponding data in the second channel of the multichannel system by taking or reporting metrology measurements associated with the second channel.

28. The pattern recognition system of claim 16, wherein the logic is configured to process the corresponding data in the second channel of the multichannel system by using the occurrence of the pattern of interest as a reference point for detecting a second pattern of interest in the second channel.

29. The pattern recognition system of claim 16, wherein the logic is configured to process the corresponding data in the second channel of the multichannel system by using the occurrence of the pattern of interest to define a marker for waveform data in the second channel.

30. The pattern recognition system of claim 1 wherein the dithered pattern occurs before or after the pattern of interest corresponding to the region of search.

* * * * *